(12) United States Patent
Wang et al.

(10) Patent No.: US 11,979,568 B2
(45) Date of Patent: May 7, 2024

(54) BOUNDARY LOCATION FOR ADAPTIVE LOOP FILTERING

(71) Applicants: Beijing Bytedance Network Technology Co., Ltd., Beijing (CN); Bytedance Inc., Los Angeles, CA (US)

(72) Inventors: Yang Wang, Beijing (CN); Hongbin Liu, Beijing (CN); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/090,681

(22) Filed: Dec. 29, 2022

(65) Prior Publication Data

US 2023/0156186 A1    May 18, 2023

Related U.S. Application Data

(63) Continuation of application No. PCT/CN2021/102938, filed on Jun. 29, 2021.

(30) Foreign Application Priority Data

Jun. 30, 2020 (WO) ................ PCT/CN2020/099604

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/167* (2014.11); *H04N 19/186* (2014.11)

(58) Field of Classification Search
CPC ... H04N 19/117; H04N 19/167; H04N 19/186
See application file for complete search history.

(56) References Cited

U.S. PATENT DOCUMENTS 7,991,236 B2    8/2011    Guo
9,077,998 B2    7/2015    Wang
(Continued)

FOREIGN PATENT DOCUMENTS

CN    107750459 A    3/2018
CN    109219958 A    1/2019
(Continued)

OTHER PUBLICATIONS

Document: JVET-P2001-vE, Bross, B,, et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.

(Continued)

*Primary Examiner* — Zhihan Zhou
(74) *Attorney, Agent, or Firm* — Conley Rose, P.C.

(57) ABSTRACT

Techniques for implementing adaptive loop filtering are described. One example method of video processing includes making a first determination, for a conversion between a video unit of a video and a bitstream of the video, a first luma adaptive loop filter, ALF, boundary across which a luma adaptive loop filter is selectively applied to a luma component of the video unit and a second luma ALF boundary; making a second determination, from the second luma ALF boundary, a chroma ALF boundary across which a chroma adaptive loop filter is selectively applied for a chroma component of the video unit; and performing the conversion based on the first determination and the second determination.

18 Claims, 37 Drawing Sheets

(51) Int. Cl.
H04N 19/167 (2014.01)
H04N 19/186 (2014.01)

(56) References Cited

U.S. PATENT DOCUMENTS

| | | |
|---|---|---|
| 9,247,258 B2 | 1/2016 | Coban |
| 9,473,779 B2 | 10/2016 | Rapaka |
| 9,591,325 B2 | 3/2017 | Li |
| 9,628,792 B2 | 4/2017 | Rapaka |
| 9,807,406 B2 | 10/2017 | Ramasubramonian |
| 10,057,574 B2 | 8/2018 | Li |
| 10,200,700 B2 | 2/2019 | Zhang |
| 10,321,130 B2 | 6/2019 | Dong |
| 10,404,999 B2 | 9/2019 | Liu |
| 10,419,757 B2 | 9/2019 | Chen |
| 10,469,847 B2 | 11/2019 | Xiu |
| 10,506,230 B2 | 12/2019 | Zhang |
| 10,531,111 B2 | 1/2020 | Li |
| 10,708,592 B2 | 7/2020 | Dong |
| 10,721,469 B2 | 7/2020 | Zhang |
| 10,728,573 B2 | 7/2020 | Sun |
| 10,764,576 B2 | 9/2020 | Li |
| 10,778,974 B2 | 9/2020 | Karczewicz |
| 10,855,985 B2 | 12/2020 | Zhang |
| 10,939,128 B2 | 3/2021 | Zhang |
| 10,965,941 B2 | 3/2021 | Zhao |
| 10,979,717 B2 | 4/2021 | Zhang |
| 2015/0350648 A1 | 12/2015 | Fu |
| 2016/0241880 A1* | 8/2016 | Chao .............. H04N 19/86 |
| 2016/0241881 A1* | 8/2016 | Chao .............. H04N 19/182 |
| 2017/0238020 A1 | 8/2017 | Karczewicz |
| 2017/0244975 A1 | 8/2017 | Huang |
| 2018/0014017 A1 | 1/2018 | Li |
| 2018/0041778 A1 | 2/2018 | Zhang |
| 2018/0041779 A1 | 2/2018 | Zhang |
| 2018/0063527 A1 | 3/2018 | Chen |
| 2018/0184127 A1 | 6/2018 | Zhang |
| 2019/0215532 A1 | 7/2019 | He |
| 2019/0230353 A1 | 7/2019 | Gadde |
| 2019/0238845 A1 | 8/2019 | Zhang |
| 2019/0306502 A1 | 10/2019 | Gadde |
| 2020/0092574 A1 | 3/2020 | Li |
| 2020/0120359 A1 | 4/2020 | Hanhart |
| 2020/0228843 A1* | 7/2020 | Lin .............. H04N 19/70 |
| 2020/0236353 A1 | 7/2020 | Zhang |
| 2020/0252619 A1 | 8/2020 | Zhang |
| 2020/0260120 A1 | 8/2020 | Hanhart |
| 2020/0267381 A1 | 8/2020 | Vanam |
| 2020/0314418 A1 | 10/2020 | Wang |
| 2020/0322632 A1 | 10/2020 | Hanhart |
| 2020/0359016 A1 | 11/2020 | Li |
| 2020/0359017 A1 | 11/2020 | Li |
| 2020/0359018 A1 | 11/2020 | Li |
| 2020/0359051 A1 | 11/2020 | Zhang |
| 2020/0366910 A1 | 11/2020 | Zhang |
| 2020/0366933 A1 | 11/2020 | Zhang |
| 2020/0374540 A1 | 11/2020 | Wang |
| 2020/0382769 A1 | 12/2020 | Zhang |
| 2020/0413038 A1 | 12/2020 | Zhang |
| 2021/0076034 A1 | 3/2021 | Misra |
| 2021/0092395 A1 | 3/2021 | Zhang |
| 2021/0092396 A1 | 3/2021 | Zhang |
| 2021/0136413 A1 | 5/2021 | He |
| 2021/0152837 A1 | 5/2021 | Zhang |
| 2021/0152841 A1* | 5/2021 | Hu .............. H04N 19/82 |
| 2021/0185353 A1 | 6/2021 | Xiu |
| 2021/0211662 A1 | 7/2021 | Wang |
| 2021/0211681 A1 | 7/2021 | Zhang |
| 2021/0235109 A1 | 7/2021 | Liu |
| 2021/0258571 A1 | 8/2021 | Zhang |
| 2021/0258572 A1 | 8/2021 | Zhang |
| 2021/0297694 A1 | 9/2021 | Zhang |
| 2021/0314595 A1 | 10/2021 | Zhang |
| 2021/0314628 A1 | 10/2021 | Zhang |
| 2021/0321095 A1 | 10/2021 | Zhang |
| 2021/0321121 A1 | 10/2021 | Zhang |
| 2021/0321131 A1 | 10/2021 | Zhang |
| 2021/0337228 A1 | 10/2021 | Wang |
| 2021/0337239 A1 | 10/2021 | Zhang |
| 2021/0344902 A1 | 11/2021 | Zhang |
| 2021/0368171 A1 | 11/2021 | Zhang |
| 2021/0377524 A1 | 12/2021 | Zhang |
| 2021/0385446 A1 | 12/2021 | Liu |
| 2021/0392381 A1 | 12/2021 | Wang |
| 2021/0400260 A1 | 12/2021 | Zhang |
| 2021/0409703 A1 | 12/2021 | Wang |
| 2022/0007014 A1 | 1/2022 | Wang |
| 2022/0007053 A1 | 1/2022 | Hanhart |
| 2022/0132104 A1 | 4/2022 | Zhang |
| 2022/0141461 A1 | 5/2022 | Zhang |
| 2022/0217331 A1 | 7/2022 | Li |
| 2022/0217407 A1* | 7/2022 | Bang .............. H04N 19/117 |
| 2022/0377326 A1* | 11/2022 | Kotra .............. H04N 19/176 |

FOREIGN PATENT DOCUMENTS

| | | |
|---|---|---|
| CN | 109600611 A | 4/2019 |
| EP | 4042685 A1 | 8/2022 |
| JP | 2020017970 A | 1/2020 |
| WO | 2013058876 A1 | 4/2013 |
| WO | 2016204531 A1 | 12/2016 |
| WO | 2020094154 A1 | 5/2020 |

OTHER PUBLICATIONS

Document: JVET-S2001, Bross, B,, et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 538 pages.

Document: JVET-P2025-v4, Chen, C-Y., et al., "Description of Core Experiment 5 (CE5): Cross Component Adaptative Loop Filtering," Joint Video Experts Team (JVET) of IU-T SG 16 WP 3 and ISO/IEC JTC 1/SC 29/WG 11 16th Meeting: Geneva, CH, Oct. 1-11, 2019, 7 pages.

Document: JVET-P0106-v2, Kotra, A., et al. "AHG16/CE5-Related: Simplifications for Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019,18 pages.

Document: JVET-P0173-v2, Li, J., etal. "AHG16/Non-CE5: Cross Component ALF Simplification," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.

Document: JVET-O0636 r1, Misra, K., et al. "Cross-Component Adaptive Loop Filter for Chroma," Joint Video Experts Team (JVET) of ITU-T SG 16 WP 3 and ISO/IEC JTC 1/SC 29/WG 11 15th Meeting: Gothenburg, SE, Jul. 3-12, 2019, 9 pages.

Document: JVET-P0080, Misra, K,, et al. "CE5-2.1, CE5-2.2: Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Document: JVET-R0069-v1, Zhang, L., et al. "AHG12: Control of Loop Filtering Across Subpicture/Tile/Slice Boundaries," Joint Video Experts Team (JVET) of ITU-T SG 16 WP 3 and ISO/IEC JTC 1/SC 29/WG 11 18th Meeting: by teleconference, Apr. 15-24, 2020, 7 pages.

Document: JVET-P0251-v4, Zhao, Y,, et al., "CE5-related: Simplified CCALF with 6 Filter Coefficients," Joint Video Experts Team (JVET) of ITU-T SG 16 WP 3 and ISO/IEC JTC 1/SC 29/WG 11 16th Meeting: Geneva, CH, Oct. 1-11, 2019, 11 pages.

Document: JVET-P2002-v1, Chen, J., et al., "Algorithm description for Versatile Video Coding and Test Model 7 (VTM7)," Joint Video Experts Team (JVET) of ITU-T SG 16 WP 3 and ISO/IEC JTC 1/SC 29/WG 11 16th Meeting: Geneva, CH, Oct. 1-11, 2019, 90 pages.

Document: JVET-P1008-v2, Misra, K., et al., "CE5-related: On the design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.

(56) References Cited

OTHER PUBLICATIONS

Document: JVET-O0625, Liu, H., et al., "Non-CE5: Padding method for samples at variant boundaries in ALF," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-P0053-v1, Zhou, M., et al., "AHG16/HLS: A clean-up for the ALF sample padding," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Suehring, K., Retrieved from the Internet: https://vcgit.hhi.fraunhofer.de/jvet/VVCSoftware_VTM/-/tags/VTM-7.0, Jan. 31, 2023, 2 pages.
International Search Report and Written Opinion from International Patent Application No. PCT/CN2020/135134 dated Mar. 3, 2021 (9 pages).
International Search Report and Written Opinion from International Patent Application No. PCT/CN2021/102938 dated Sep. 30, 2021 (9 pages).
Notice of Allowance from U.S. Appl. No. 17/837,216 dated Jul. 28, 2022 (9 pages).
Extended European Search Report from European Application No. 20900340.9 dated Jan. 31, 2023 (9 pages).
Office Action from Indian Patent Application No. 202227077244 dated May 26, 2023, 6 pages.
Hu, N., "Wrong chroma ALF virtual boundary position for 4 : 2 : 2 and 4 : 4 : 4 sequences," Ticket #1030, XP093104722, Apr. 28, 2020, 1 page.
Hu, N., "Wrong chroma ALF virtual boundary position for 4 : 2 : 2 and 4 : 4 : 4 sequences," Timeline (Ticket *1030), Apr. 29, 2020, XP093104724, 1 page.
Hu, N., "Wrong chroma ALF virtual boundary position for 4 : 2 : 2 and 4 : 4 : 4 sequences," Ticket *1030: JVET-R2001-v3-8.8.5.docx, Apr. 29, 2020, XP093104725, 14 pages.
Document: JVET-R0322-v4, Meng, X., et al., "CCALF virtual boundary issue for 4 : 4 : 4 and 4 : 2 : 2 format," XP030286496, Retrieved from the Internet: URL:http://phenix.int-evry.fr/mpeg/doc_end_user/documents/130_Alpbach/wg11/m53306-JVET-R0322-v4-JVET-R0322-v4.zip[retrieved on Apr. 19, 2020], Joint Video Experts Team (JVET) of ITU-T SG 16 WP 3 and ISO/IEC JTC 1/SC 29/WG 11 18th Meeting: by teleconference, Apr. 15-24, 2020, 8 pages.
Extended European Search Report from European Application No. 21834662.5 dated Dec. 11, 2023, 9 pages.
Document: JVET-R0233-v3, Hu, N., et al., "AHGi6: Line buffer problem of CC-ALF for 4:2:2 and 4:4:4 sequences," Joint Video Experts Team (JVET) of ITU-T SG 16 WP 3 and ISO/IEC JTC 1/SC 29/WG 11 18th Meeting: by teleconference, Apr. 15-24, 2020, 9 pages.
Document: JVET-R0312-v2, Wang, Y., et al., "AHGZ/AHGl6: A fix on chroma ALF virtual boundary position," Joint Video Experts Team (JVET) of ITU-T SG 16 WP 3 and ISO/IEC JTC 1/SC 29/WG 11 18th Meeting: by teleconference, Apr. 15-24, 2020, 7 pages.
Document: JVET-R2001-VB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 19 pages.

* cited by examiner

BOUNDARY LOCATION FOR ADAPTIVE LOOP FILTERING

CROSS REFERENCE TO RELATED APPLICATIONS

This application is a continuation of International Application No. PCT/CN2021/102938, filed on Jun. 29, 2021, which claims the priority to and benefit of International Patent Application No. PCT/CN2020/099604, filed on Jun. 30, 2020. For all purposes under the law, the entire disclosure of the aforementioned application is incorporated by reference as part of the disclosure of this application.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform adaptive loop filtering during video encoding or decoding.

In one example aspect, a method of video processing is disclosed. The method includes making a first determination, for a conversion between a video unit of a video and a bitstream of the video, a first luma adaptive loop filter, ALF, boundary across which a luma adaptive loop filter is selectively applied to a luma component of the video unit and a second luma ALF boundary; making a second determination, from the second luma ALF boundary, a chroma ALF boundary across which a chroma adaptive loop filter is selectively applied for a chroma component of the video unit; and performing the conversion based on the first determination and the second determination.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIG. 7A— CTBs crossing the bottom picture border; FIG. 7B— CTBs crossing the right picture border; and FIG. 7C— CTBs crossing the right bottom picture border.

FIG. 12A— subsampled positions for vertical gradient, FIG. 12B—Subsampled positions for horizontal gradient; FIG. 12C— subsampled positions for diagonal gradient; and FIG. 12D— subsampled positions for diagonal gradient.

FIG. 17A—one required line above/below VB need to be padded (per side); FIG. 17B— 2 required lines above/below VB need to be padded (per side); FIG. 17C-3 required lines above/below VB need to be padded (per side).

DETAILED DESCRIPTION

Figure 2:
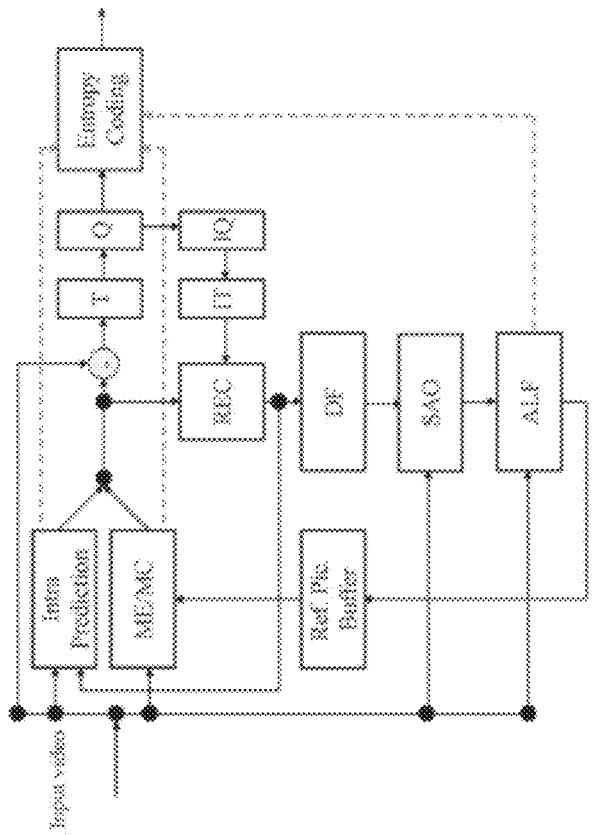
FIG. 2 is an example of encoder block diagram.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Brief Introduction

This document is related to video coding technologies. Specifically, it is related picture/subpicture/slice/tile boundary, and 360-degree video virtual boundary and ALF virtual boundary coding especially for cross component adaptive loop filter (CC-ALF) and other coding tools in image/video coding. It may be applied to the existing video coding standard like HEVC, or the standard (Versatile Video Coding) to be finalized. It may be also applicable to future video coding standards or video codec. 2. Video Coding Introduction Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 7) could be found at:
http://phenix.it-sudparis.eu/jvet/doc_end_user/documents/16_Geneva/wg11/JVET-P2001-v14.zip The latest reference software of VVC, named VTM, could be found at:
https://vcgit.hhi.fraunhofer.de/jvet/VVCSoftware_VTM/-/tags/VTM-7.0

2.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

Figure 1:
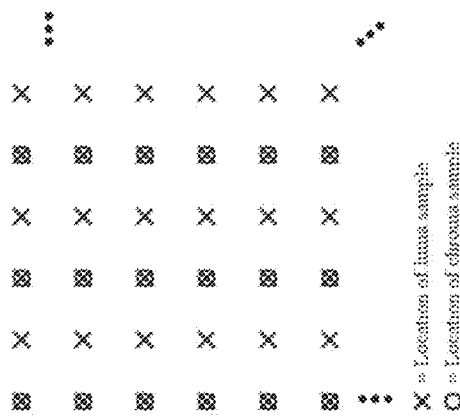
FIG. 1 shows nominal vertical and horizontal locations of 4:2:2 luma and chroma samples in a picture.

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 1 in VVC working draft.

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

TABLE 2-1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |

TABLE 2-1-continued

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 3 | 0 | 4:4:4 | 1 | 1 |
| 3 | 1 | 4:4:4 | 1 | 1 |

2.2. Coding Flow of a Typical Video Codec

FIG. 2 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.3. Example Definitions of Video Units

A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 3:
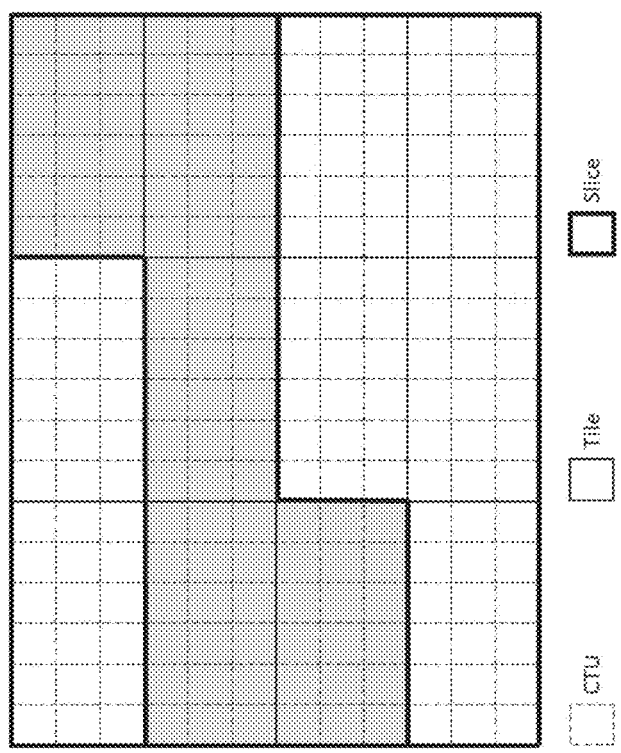
FIG. 3 shows a picture with 18 by 12 luma CTUs that is partitioned into 12 tiles and 3 raster-scan slices.

FIG. 3 shows an example of raster-scan slice partitioning of a picture, where the picture is divided into 12 tiles and 3 raster-scan slices.

Figure 4:
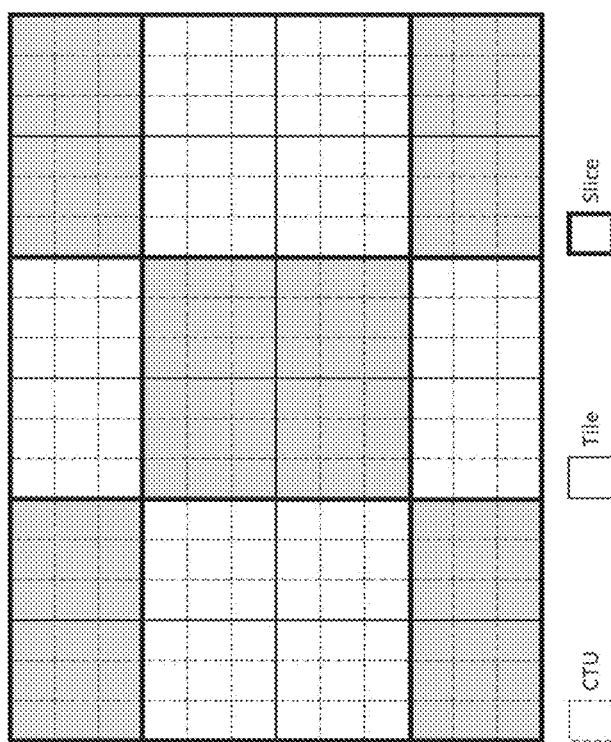
FIG. 4 shows a picture with 18 by 12 luma CTUs that is partitioned into 24 tiles and 9 rectangular slices.

FIG. 4 in the VVC specification shows an example of rectangular slice partitioning of a picture, where the picture is divided into 24 tiles (6 tile columns and 4 tile rows) and 9 rectangular slices.

FIG. 4 A picture with 18 by 12 luma CTUs that is partitioned into 24 tiles and 9 rectangular slices (informative)

Figure 5:
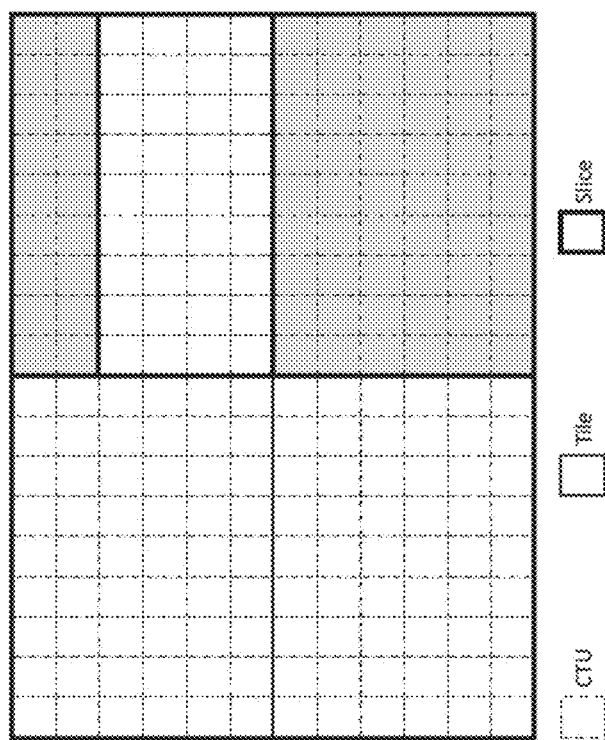
FIG. 5 shows a picture that is partitioned into 4 tiles and 4 rectangular slices.

FIG. 5 shows an example of a picture partitioned into tiles and rectangular slices, where the picture is divided into 4 tiles (2 tile columns and 2 tile rows) and 4 rectangular slices.

Figure 6:
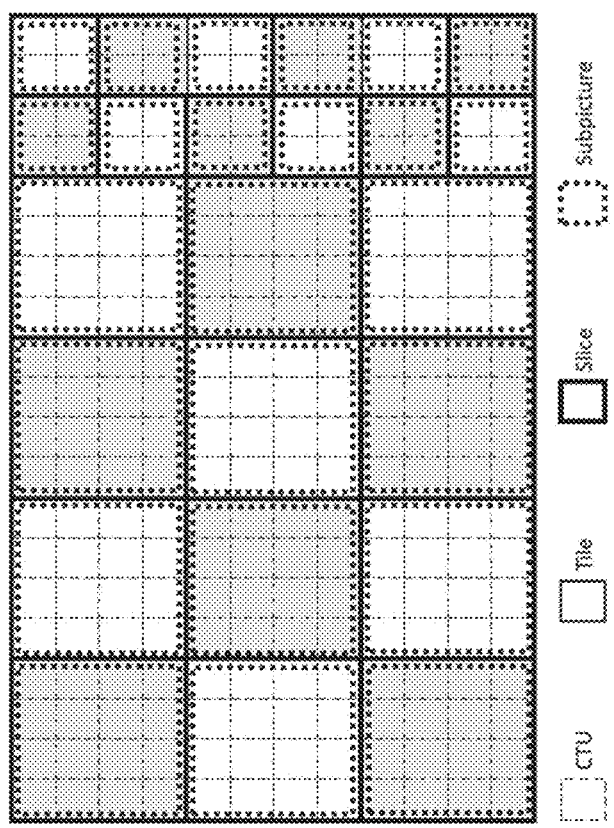
FIG. 6 shows a picture that is partitioned into 15 tiles, 24 slices and 24 subpictures.

FIG. 6 shows an example of subpicture partitioning of a picture, where a picture is partitioned into 15 tiles covering 4 by 4 CTUs, 24 slices and 24 subpictures of varying dimensions.

2.3.1. CTU/CTB Sizes

In VVC, the CTU size, signaled in SPS by the syntax element log2_ctu_size_minus2, could be as small as 4×4.

| 7.3.2.3 Sequence parameter set RBSP syntax | |
|---|---|
| seq_parameter_set_rbsp( ) { | Descriptor |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |

7.3.2.3 Sequence parameter set RBSP syntax

| seq_parameter_set_rbsp( ) { | Descriptor |
|---|---|
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
| num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
| ... | |
|   rbsp_trailing_bits( ) | |
| } | | log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

| | |
|---|---|
| CtbLog2SizeY = log2_ctu_size_minus2 + 2 | (7-9) |
| CtbSizeY = 1 << CtbLog2SizeY | (7-10) |
| MinCbLog2SizeY = log2_min_luma_coding_block_size_minus2 + 2 | (7-11) |
| MinCbSizeY = 1 << MinCbLog2SizeY | (7-12) |
| MinTbLog2SizeY = 2 | (7-13) |
| MaxTbLog2SizeY = 6 | (7-14) |
| MinTbSizeY = 1 << MinTbLog2SizeY | (7-15) |
| MaxTbSizeY = 1 << MaxTbLog2SizeY | (7-16) |
| PicWidthInCtbsY = Ceil( pic_width_in_luma_samples ÷ CtbSizeY ) | (7-17) |
| PicHeightInCtbsY = Ceil( pic_height_in_luma_samples ÷ CtbSizeY ) | (7-18) |
| PicSizeInCtbsY = PicWidthInCtbsY * PicHeightInCtbsY | (7-19) |
| PicWidthInMinCbsY = pic_width_in_luma_samples / MinCbSizeY | (7-20) |
| PicHeightInMinCbsY = pic_height_in_luma_samples / MinCbSizeY | (7-21) |
| PicSizeInMinCbsY = PicWidthInMinCbsY * PicHeightInMinCbsY | (7-22) |
| PicSizeInSamplesY = pic_width_in_luma_samples * pic_height_in_luma_samples | (7-23) |
| PicWidthInSamplesC = pic_width_in_luma_samples / SubWidthC | (7-24) |
| PicHeightInSamplesC = pic_height_in_luma_samples / SubHeightC | (7-25) |

2.3.2. CTUs in a Picture

Figure 7B:
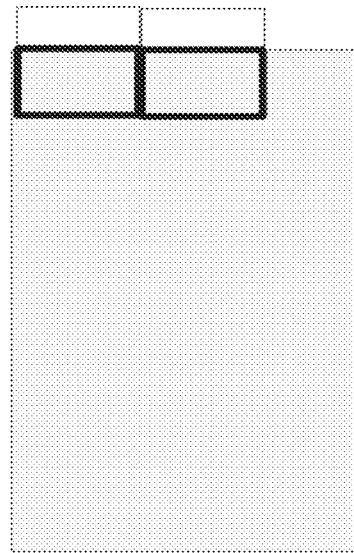
FIG. 7A-7C show.
Figure 7C:
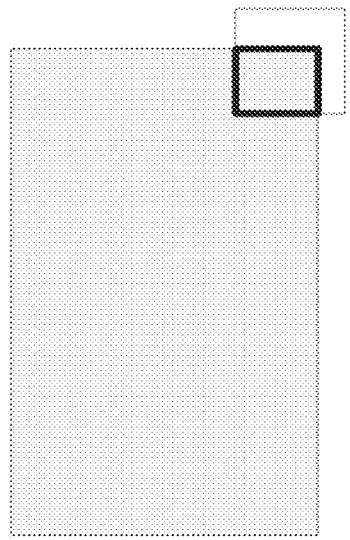
Figure 7A:
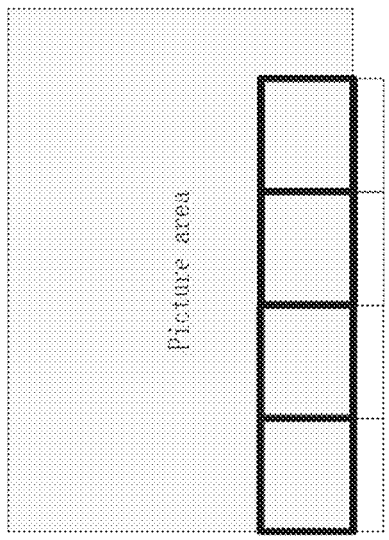

Suppose the CTB/LCU size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs as depicted in FIG. 7A-7C, the CTB size is still equal to M×N, however, the bottom boundary/right boundary of the CTB is outside the picture.

FIG. 7 shows examples of CTBs crossing picture borders, (a) K=M, L<N; (b) K<M, L=N; (c) K<M, L<N. Also, (a)

CTBs crossing the bottom picture border (b) CTBs crossing the right picture border, (c) CTBs crossing the right bottom picture border 2.4. Deblocking Filter (DB)

The input of DB is the reconstructed samples before in-loop filters.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 8:
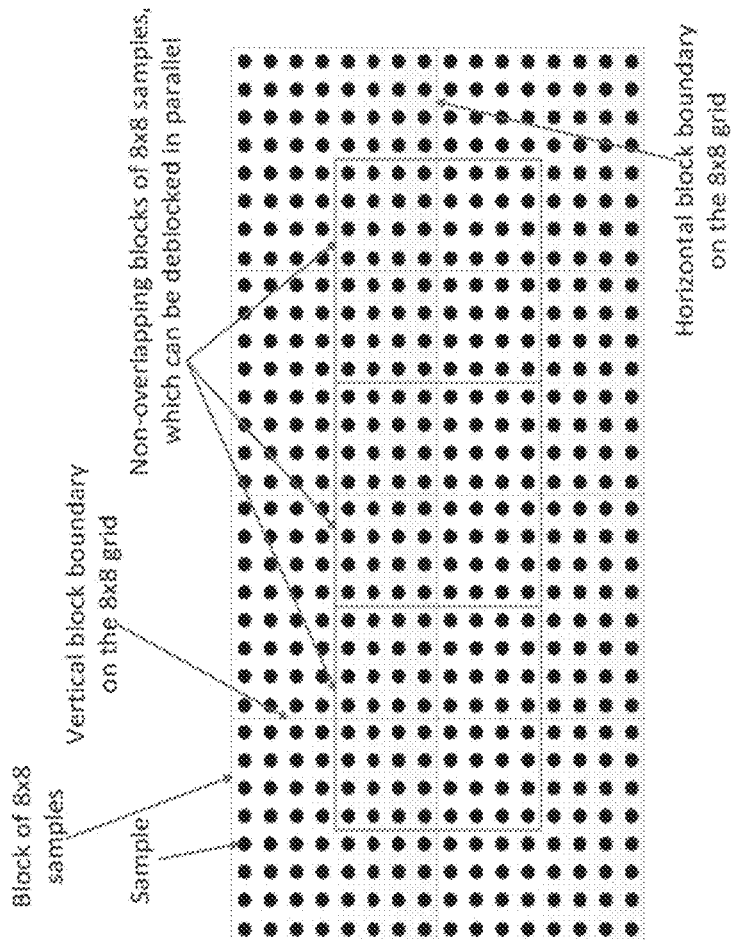
FIG. 8 is an illustration of picture samples and horizontal and vertical block boundaries on the 8×8 grid, and the nonoverlapping blocks of the 8×8 samples, which can be deblocked in parallel.
Figures 9, 10:
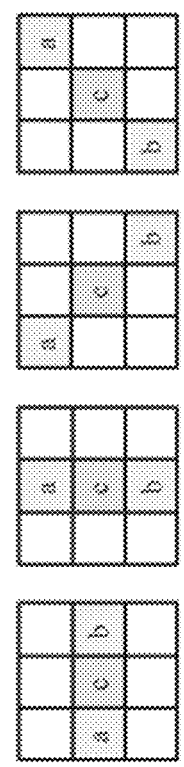
FIG. 9 shows pixels involved in filter on/off decision and strong/weak filter selection.
FIG. 10 shows four 1-D directional patterns for EO sample classification: horizontal (EO class=0), vertical (EO class=1), 135° diagonal (EO class=2), and 45° diagonal (EO class=3)

FIG. 8 is an Illustration of picture samples and horizontal and vertical block boundaries on the 8×8 grid, and the nonoverlapping blocks of the 8×8 samples, which can be deblocked in parallel.

2.4.1. Boundary Decision

Filtering is applied to 8×8 block boundaries. In addition, it must be a transform block boundary or a coding subblock boundary (e.g., due to usage of Affine motion prediction, ATMVP).

For those which are not such boundaries, filter is disabled.

2.4.2. Boundary Strength Calculation

For a transform block boundary/coding subblock boundary, if it is located in the 8×8 grid, it may be filtered and the setting of bS[xDi][yDj] (wherein [xDi][yDj] denotes the coordinate) for this edge is defined in Table 2-2 and Table 2-3, respectively.

TABLE 2-2

| Boundary strength (when SPS IBC is disabled) | | | | |
|---|---|---|---|---|
| Priority | Conditions | Y | U | V |
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2-3

| Boundary strength (when SPS IBC is enabled) | | | | |
|---|---|---|---|---|
| Priority | Conditions | Y | U | V |
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |

TABLE 2-3-continued

| Boundary strength (when SPS IBC is enabled) | | | | |
|---|---|---|---|---|
| Priority | Conditions | Y | U | V |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.4.3. Deblocking Decision for Luma Component

The deblocking decision process is described in this sub-section.

Wider-stronger luma filter is filters are used only if all the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width >=32)| (edge type is horizontal and $p_0$ belongs to CU with height >=32))? TRUE: FALSE bSideQisLargeBlk=((edge type is vertical and $q_0$ belongs to CU with width >=32)| (edge type is horizontal and $q_0$ belongs to CU with height >=32))? TRUE: FALSE Based on bSidePisLargeBlk and bSideQisLargeBlk, the condition 1 is defined as follows.

Condition1=(bSidePisLargeBlk|| bSidePisLargeBlk)? TRUE: FALSE

Next, if Condition 1 is true, the condition 2 will be further checked. First, the following variables are derived:

dp0, dp3, dq0, dq3 are first derived as in HEVC if (p side is greater than or equal to 32)

$$dp0=(dp0+\text{Abs}(p5_0-2*p4_0+p3_0)+1)>>1$$

$$dp3=(dp3+\text{Abs}(p5_3-2*p4_3+p3_3)+1)>>1$$

if (q side is greater than or equal to 32)

$$dq0=(dq0+\text{Abs}(q5_0-2*q4_0+q3_0)+1)>>1$$

$$dq3=(dq3+\text{Abs}(q5_3-2*q4_3+q3_3)+1)>>1$$

Condition2=(d<R)? TRUE: FALSE where d=dp0+dq0+dp3+dq3.

If Condition1 and Condition2 are valid, whether any of the blocks uses sub-blocks is further checked:

If (bSidePisLargeBlk)
{
  If (mode block P==SUBBLOCKMODE)
    Sp=5
  else
    Sp=7
}
else
  Sp=3
If (bSideQisLargeBlk)
{
  If (mode block Q==SUBBLOCKMODE)
    Sq=5 else
    Sq=7
}
else
    Sq=3

Finally, if both the Condition 1 and Condition 2 are valid, the proposed deblocking method will check the condition 3 (the large block strong filter condition), which is defined as follows.

In the Condition3 StrongFilterCondition, the following variables are derived:

dpq is derived as in HEVC.
$sp_3=Abs(p_3-p_0)$, derived as in HEVC
if (p side is greater than or equal to 32)
    if(Sp==5)
        $sp_3=(sp_3+Abs(p_5-p_3)+1)>>1$
    else
        $sp_3=(sp_3+Abs(p_7-p_3)+1)>>1$
$sq_3=Abs(q_0-q_3)$, derived as in HEVC
if (q side is greater than or equal to 32)
    If(Sq==5)
        $sq_3=(sq_3+Abs(q_5-q_3)+1)>>1$
    else
        $sq_3=(sq_3+Abs(q_7-q_3)+1)>>1$ As in HEVC, StrongFilterCondition=(dpq is less than ($\beta$>>2), $sp_3+sq_3$ is less than (3*$\beta$>>5), and $Abs(p_0-q_0)$ is less than (5*$t_0$+1)>>1)? TRUE: FALSE.

2.4.4. Stronger Deblocking Filter for Luma (Designed for Larger Blocks)

Bilinear filter is used when samples at either one side of a boundary belong to a large block. A sample belonging to a large block is defined as when the width >=32 for a vertical edge, and when height >=32 for a horizontal edge.

The bilinear filter is listed below.

Block boundary samples $p_i$ for i=0 to Sp-1 and $q_i$ for j=0 to Sq-1 (pi and qi are the i-th sample within a row for filtering vertical edge, or the i-th sample within a column for filtering horizontal edge) in HEVC deblocking described above) are then replaced by linear interpolation as follows:

$p_i'=(f_i*Middle_{s,t}+(64-f_i)*P_s+32)>>6)$, clipped to $p_i \pm tcPD_i$ $q_i'=(g_j*Middle_{s,t}+(64-g_j)*Q_s+32)>>6)$, clipped to $q_j \pm tcPD_j$ where $tcPD_i$ and $tcPD_j$ term is a position dependent clipping described in Section 2.4.7 and $g_j$, $f_i$, $Middle_{s,t}$, $P_s$ and $Q_S$ are given below:

2.4.5. Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition:
    d is then derived as in HEVC luma deblocking.
    The second condition will be TRUE when d is less than $\beta$.

In the third condition StrongFilterCondition is derived as follows:
    dpq is derived as in HEVC.
    $sp_3=Abs(p_3-p_0)$, derived as in HEVC
    $sq_3=Abs(q_0-q_3)$, derived as in HEVC
    As in HEVC design, StrongFilterCondition=(dpq is less than ($\beta$>>2), $sp_3+sq_3$ is less than ($\beta$>>3), and $Abs(p_0-q_0)$ is less than (5*$t_c$+1)>>1)

2.4.6. Strong Deblocking Filter for Chroma

The following strong deblocking filter for chroma is defined:

$P_2'=(3*p_3+2*p_2+p_1+p_0+q_0+4)>>3$ $p_1'=(2*p_3+p_2+2*p_1+p_0+q_0+q_1+4)>>3$ $P_0'=(p_3+p_2+p_1+2*p_0+q_0+q_1+q_2+4)>>3$

The proposed chroma filter performs deblocking on a 4×4 chroma sample grid.

2.4.7. Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.4.2, position dependent threshold table is selected from two tables (i.e., Tc7 and Tc3 tabulated below) that are provided to decoder as a side information: Tc7={6, 5, 4, 3, 2, 1, 1}; Tc3={6, 4, 2};

tcPD=(Sp==3)?Tc3: Tc7;

tcQD=(Sq==3)?Tc3: Tc7;

For the P or Q boundaries being filtered with a short symmetrical filter, position dependent threshold of lower magnitude is applied:

Tc3={3,2,1};

Following defining the threshold, filtered $p'_i$ and $q'_i$ sample values are clipped according to tcP and tcQ clipping values:

$p''_i=Clip3(p'_i+tcP_i, p'_i-tcP_i, p'_i)$;

$q''_j=Clip3(q'_j+tcQ_j, q'_j-tcQ_j, q'_j)$;

where $p'_i$ and $q'_i$ are filtered sample values, $p''_j$ and $q'_j$ are output sample value after the clipping and $tcP_i$, $tcP_i$ are clipping thresholds that are derived from the VVC tc parameter and tcPD and tcQD. The function Clip3 is a clipping function as it is specified in VVC.

2.4.8. Sub-Block Deblocking Adjustment

To enable parallel friendly deblocking using both long filters and sub-block deblocking the long filters is restricted to modify at most 5 samples on a side that uses sub-block deblocking (AFFINE or ATMVP or DMVR) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

If (mode block Q==SUBBLOCKMODE && edge !=0) {
   if (!(implicitTU && (edge==(64/4))))
     if (edge==2|| edge==(orthogonalLength−2) 11 edge==(56/4) 11 edge==(72/4))
       Sp=Sq=2;
     else
       Sp=Sq=3;
   else
     Sp=Sq=bSideQisLargeBlk? 5:3
}

Where edge equal to 0 corresponds to CU boundary, edge equal to 2 or equal to orthogonalLength-2 corresponds to sub-block boundary 8 samples from a CU boundary etc.

Where implicit TU is true if implicit split of TU is used.

2.5. Sample Adaptive Offset (SAO)

The input of SAO is the reconstructed samples after DB. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

FIG. 10A-10D show four 1-D directional patterns for EO sample classification: horizontal (EO class=0), vertical (EO class=1), 135° diagonal (EO class=2), and 45° diagonal (EO class=3)

For a given EO class, each sample inside the CTB is classified into one of five categories. The current sample value, labeled as "c," is compared with its two neighbors (labeled as "a" and "b") along the selected 1-D pattern. The classification rules for each sample are summarized in Table 2-4. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 2-4

Sample Classification Rules for Edge Offset

| Category | Condition |
| --- | --- |
| 1 | c < a and c < b |
| 2 | ( c < a && c == b) \|\|(c == a && c < b) |
| 3 | ( c > a && c == b) \|\|(c == a && c > b) |
| 4 | c > a && c > b |
| 5 | None of above |

2.6. Adaptive Loop Filter (ALF)

In VVC, an Adaptive Loop Filter (ALF) with block-based filter adaption is applied. For the luma component, one among 25 filters is selected for each 4×4 block, based on the direction and activity of local gradients.

2.6.1. Filter Shape

Figure 11:
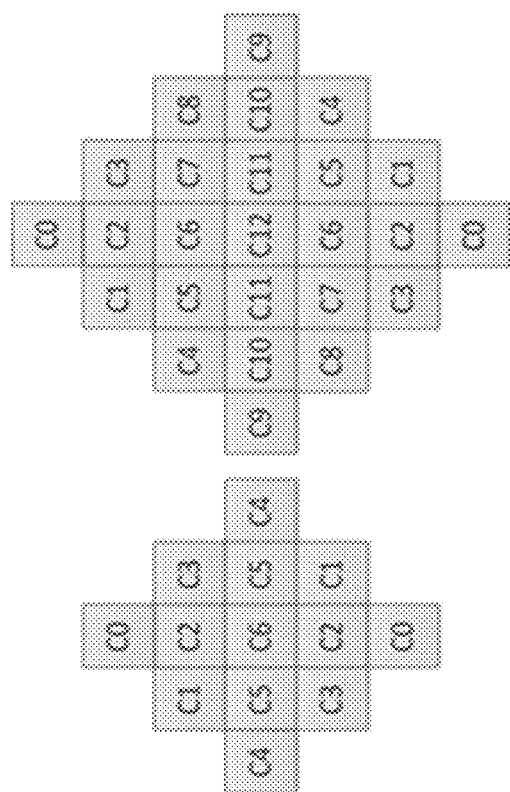
FIG. 11 shows examples of ALF filter shapes (chroma: 5×5 diamond, luma: 7×7 diamond).
Figure 12B:
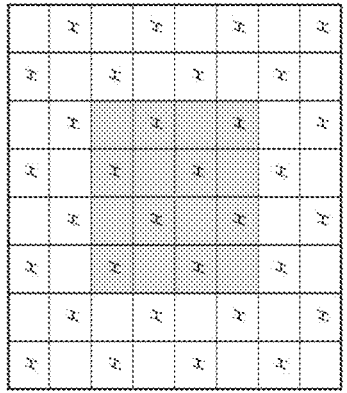
FIG. 12A-12D show.
Figure 12D:
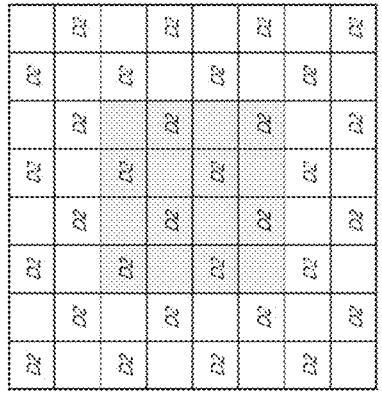
Figure 12A:
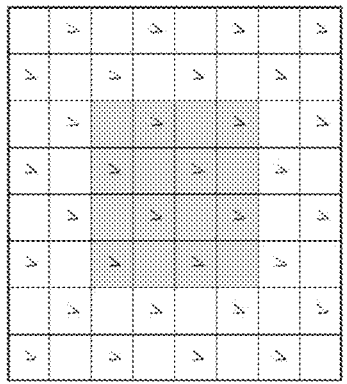
Figure 12C:
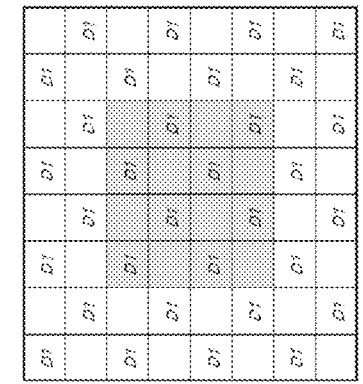

Two diamond filter shapes (as shown in FIG. 11) are used. The 7×7 diamond shape is applied for luma component and the 5×5 diamond shape is applied for chroma components.

FIG. 11 shows ALF filter shapes (chroma: 5×5 diamond, luma: 7×7 diamond).

2.6.2. Block Classification

For luma component, each 4×4 block is categorized into one out of 25 classes. The classification index C is derived based on its directionality D and a quantized value of activity A, as follows:

$$C = 5D + \hat{A} \quad (2\text{-}1)$$

To calculate D and A, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k,l) - R(k, l-1) - R(k, l+1)| \quad (2\text{-}2)$$

$$g_h = \sum_{k=i-2}^{i+3} \sum_{l=j-2}^{j+3} H_{k,l}, \quad H_{k,l} = |2R(k,l) - R(k-1, l) - R(k+1, l)| \quad (2\text{-}3)$$

$$g_{d1} = \sum_{k=i-2}^{i+3} \sum_{l=j-3}^{j+3} D1_{k,l}, \quad (2\text{-}4)$$

$$D1_{k,l} = |2R(k,l) - R(k-1, l-1) - R(k+1, l+1)|$$

$$g_{d2} = \sum_{k=i-2}^{i+3} \sum_{j=j-2}^{j+3} D2_{k,l}, \quad (2\text{-}5)$$

$$D2_{k,l} = |2R(k,l) - R(k-1, l+1) - R(k+1, l-1)|$$

Where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As shown in FIG. 2-1, the same subsampled positions are used for gradient calculation of all directions.

(a) Subsampled positions for vertical (b) Subsampled positions for horizontal gradient gradient (c) Subsampled positions for diagonal (d) Subsampled positions for diagonal gradient gradient FIG. 2-1. Subsampled Laplacian calculation Then D maximum and minimum values of the gradients of horizontal and vertical directions are set as:

$$g_{h,v}^{max} = \max(g_h, g_v), g_{h,v}^{min} = \min(g_h, g_v) \quad (2\text{-}6)$$

The maximum and minimum values of the gradient of two diagonal directions are set as:

$$g_{d0,d1}^{max} = \max(g_{d0}, g_{d1}), g_{d0,d1}^{min} = \min(g_{d0}, g_{d1}) \quad (2\text{-}7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3}\sum_{l=j-2}^{j+3}(V_{k,l} + H_{k,l}) \quad (2\text{-}8)$$

A is further quantized to the range of 0 to 4, inclusively, and the quantized value is denoted as Â.

For chroma components in a picture, no classification method is applied, i.e. a single set of ALF coefficients is applied for each chroma component.

2.6.3. Geometric Transformations of Filter Coefficients and Clipping Values

Before filtering each 4×4 luma block, geometric transformations such as rotation or diagonal and vertical flipping are applied to the filter coefficients f(k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l)=f(l,k), C_D(k,l)=c(l,k),$ (2-9)

Vertical flip: $f_V(k,l)=f(k,K-l-1), c_V(k,l)=c(k,K-l-1)$ (2-10)

Rotation: $f_R(k,l)=f(K-l-1,k), c_R(k,l)=c(K-l-1,k)$ (2-11)

where K is the size of the filter and 0≤k, l≤K−1 are coefficients coordinates, such that location (0,0) is at the upper left corner and location (K−1, K−1) is at the lower right corner. The transformations are applied to the filter coefficients f (k, f) and to the clipping values c(k, l) depending on gradient values calculated for that block. The relationship between the transformation and the four gradients of the four directions are summarized in the following table.

TABLE 2-5

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.6.4. Filter Parameters Signalling

ALF filter parameters are signalled in Adaptation Parameter Set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signaled.

Clipping value indexes, which are decoded from the APS, allow determining clipping values using a table of clipping values for both luma and Chroma components. These clipping values are dependent of the internal bitdepth. More precisely, the clipping values are obtained by the following formula:

AlfClip={round($2^{B-a*n}$)for n∈ [0.. N−1]} (2-12)

with B equal to the internal bitdepth, a is a pre-defined constant value equal to 2.35, and N equal to 4 which is the number of allowed clipping values in VVC.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

2.6.5. Filtering Process

At decoder side, when ALF is enabled for a CTB, each sample R(i,j) within the CU is filtered, resulting in sample value R'(i,j) as shown below, $$R'(i,j)=R(i,j)+((\Sigma_{k\neq 0}\Sigma_{l\neq 0}f(k,l)\times K(R(i+k,j+l)-R(i,j),c(k,l))+64)\gg 7) \quad (2\text{-}13)$$

where f(k, l) denotes the decoded filter coefficients, K(x, y) is the clipping function and c(k, l) denotes the decoded clipping parameters. The variable k and I varies between −Z and Z where L denotes the filter length. The clipping function K(x, y)=min(y, max(−y, x)) which corresponds to the function Clip3 (−y, y, x).

2.6.6. Virtual Boundary Filtering Process for Line Buffer Reduction

In hardware and embedded software, picture-based processing is practically unacceptable due to its high picture buffer requirement. Using on-chip picture buffers is very expensive and using off-chip picture buffers significantly increases external memory access, power consumption, and data access latency. Therefore, DF, SAO, and ALF will be changed from picture-based to LCU-based decoding in real products. When LCU-based processing is used for DF, SAO, and ALF, the entire decoding process can be done LCU by LCU in a raster scan with an LCU-pipelining fashion for parallel processing of multiple LCUs. In this case, line buffers are required for DF, SAO, and ALF because processing one LCU row requires pixels from the above LCU row. If off-chip line buffers (e.g. DRAM) are used, the external memory bandwidth and power consumption will be increased; if on-chip line buffers (e.g. SRAM) are used, the chip area will be increased. Therefore, although line buffers are already much smaller than picture buffers, it is still desirable to reduce line buffers.

Figure 13:
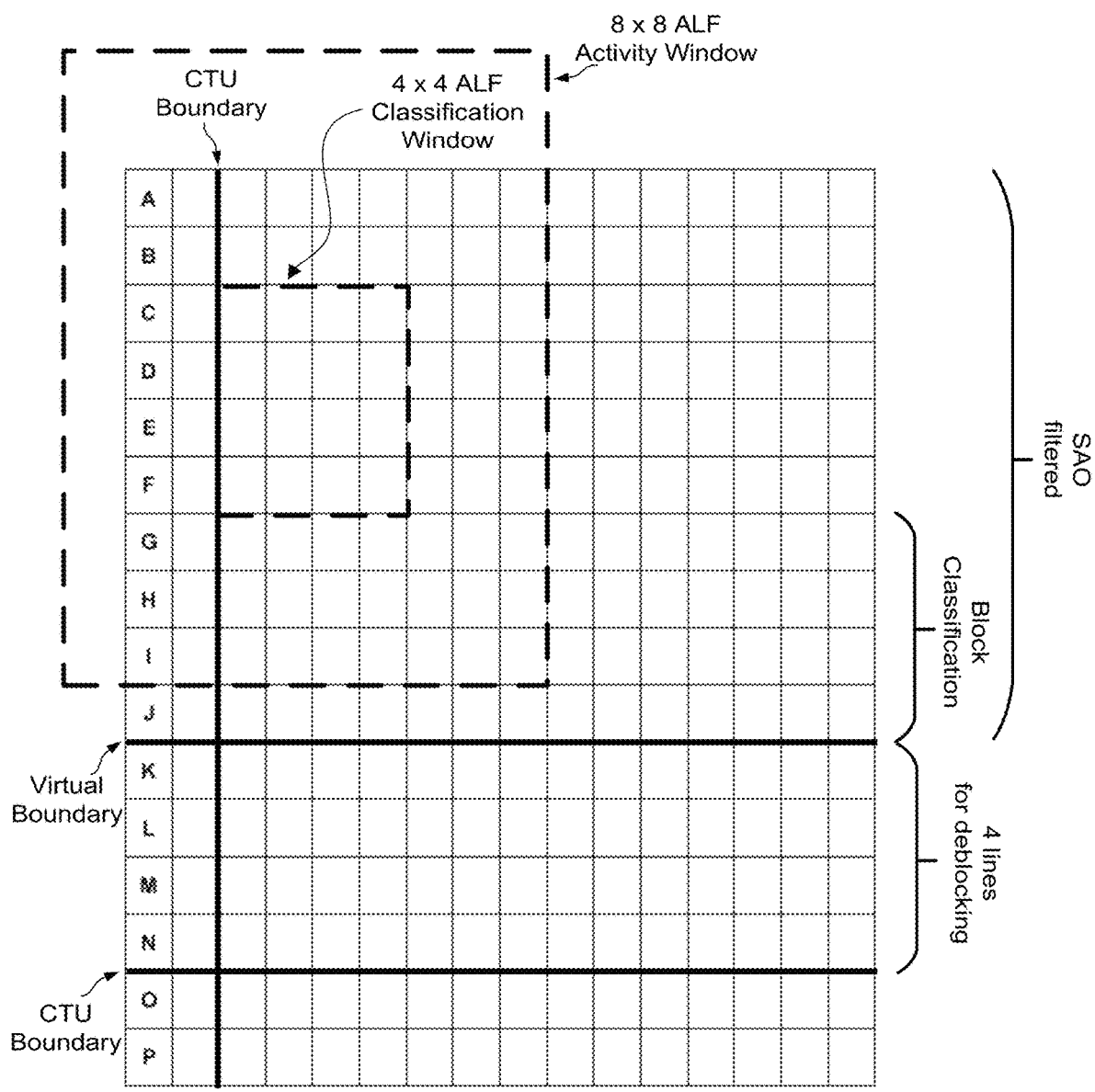
FIG. 13 shows an example of Loop filter line buffer requirement in VTM-4.0 for Luma component.

In VTM-4.0, as shown in FIG. 13, the total number of line buffers required is 11.25 lines for the Luma component. The explanation of the line buffer requirement is as follows: The deblocking of horizontal edge overlapping with CTU edge cannot be performed as the decisions and filtering require lines K, L, M, M from the first CTU and Lines O, P from the bottom CTU. Therefore, the deblocking of the horizontal edges overlapping with the CTU boundary is postponed until the lower CTU comes. Therefore, for the lines K, L, M, N reconstructed luma samples have to be stored in the line buffer (4 lines). Then the SAO filtering can be performed for lines A till J. The line J can be SAO filtered as deblocking does not change the samples in line K. For SAO filtering of line K, the edge offset classification decision is only stored in the line buffer (which is 0.25 Luma lines). The ALF filtering can only be performed for lines A-F. As shown in FIG. 13, the ALF classification is performed for each 4×4 block. Each 4×4 block classification needs an activity window of size 8×8 which in turn needs a 9×9 window to compute the 1d Laplacian to determine the gradient.

Therefore, for the block classification of the 4×4 block overlapping with lines G, H, I, J needs, SAO filtered samples below the Virtual boundary. In addition, the SAO filtered samples of lines D, E, F are required for ALF classification. Moreover, the ALF filtering of Line G needs three SAO filtered lines D, E, F from above lines. Therefore, the total line buffer requirement is as follows:

Lines K-N(Horizontal DF pixels): 4 lines
Lines D-J (SAO filtered pixels): 7 lines
SAO Edge offset classifier values between line J and line K: 0.25 line Therefore, the total number of luma lines required is 7+4+0.25=11.25.

Figure 14:
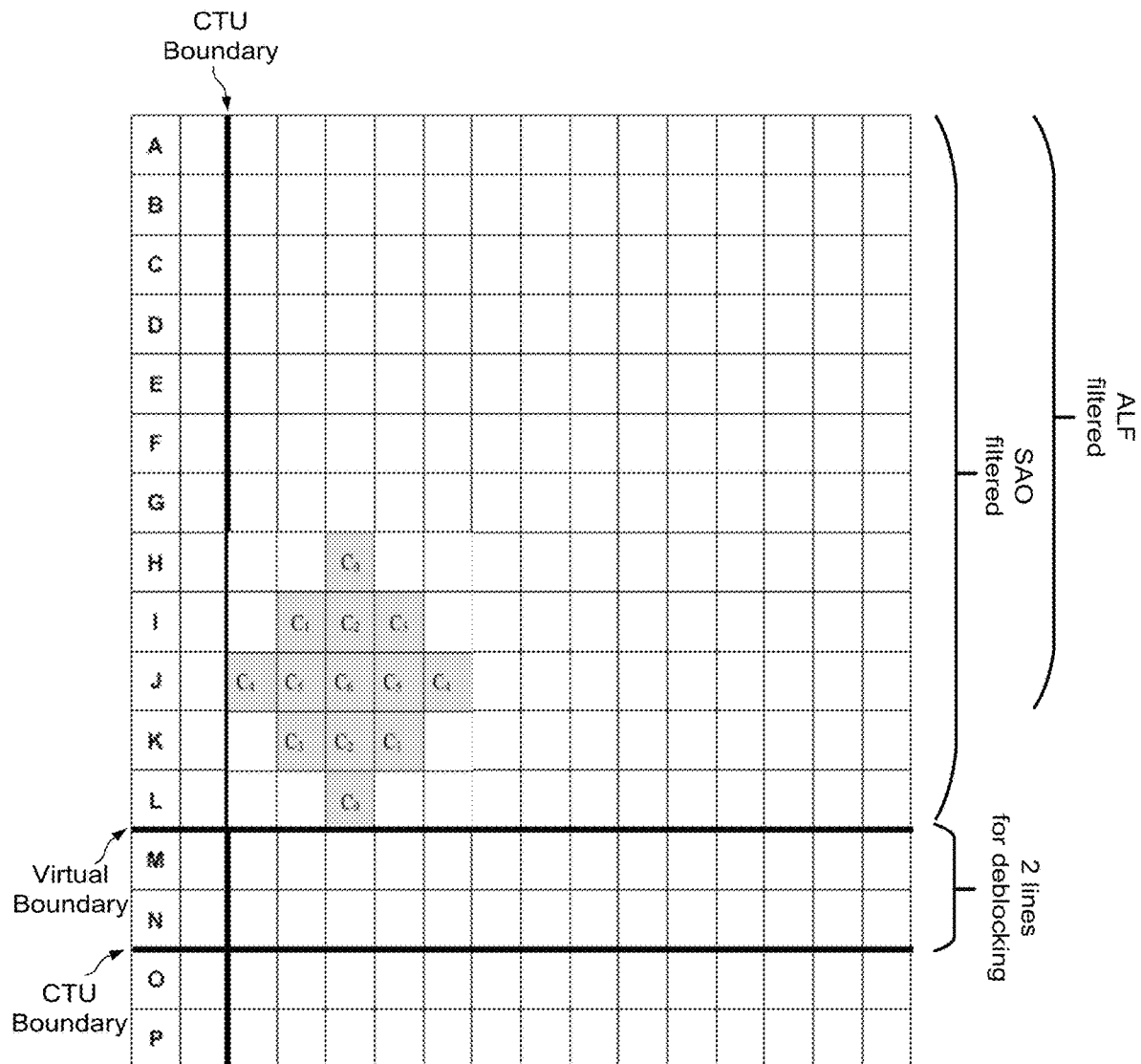
FIG. 14 illustrates an example of loop filter line buffer requirement in VTM-4.0 for Chroma component.

Similarly, the line buffer requirement of the Chroma component is illustrated in FIG. 14. The line buffer requirement for Chroma component is evaluated to be 6.25 lines.

FIG. 13 shows a loop filter line buffer requirement in VTM-4.0 for Luma component.

FIG. 14 shows a Loop filter line buffer requirement in VTM-4.0 for Chroma component.

In order to eliminate the line buffer requirements of SAO and ALF, the concept of virtual boundary (VB) is introduced to reduce the line buffer requirement of ALF in the latest VVC. Modified block classification and filtering are employed for the samples near horizontal CTU boundaries. As shown in FIG. 13, VBs are upward shifted horizontal LCU boundaries by N pixels. For each LCU, SAO and ALF can process pixels above the VB before the lower LCU comes but cannot process pixels below the VB until the lower LCU comes, which is caused by DF. With consideration of the hardware implementation cost, the space between the proposed VB and the horizontal LCU boundary is set as four pixels for luma component (i.e. N=4 in FIG. 13 or FIG. 15) and two pixels for chroma component (i.e. N=2).

Figure 15:
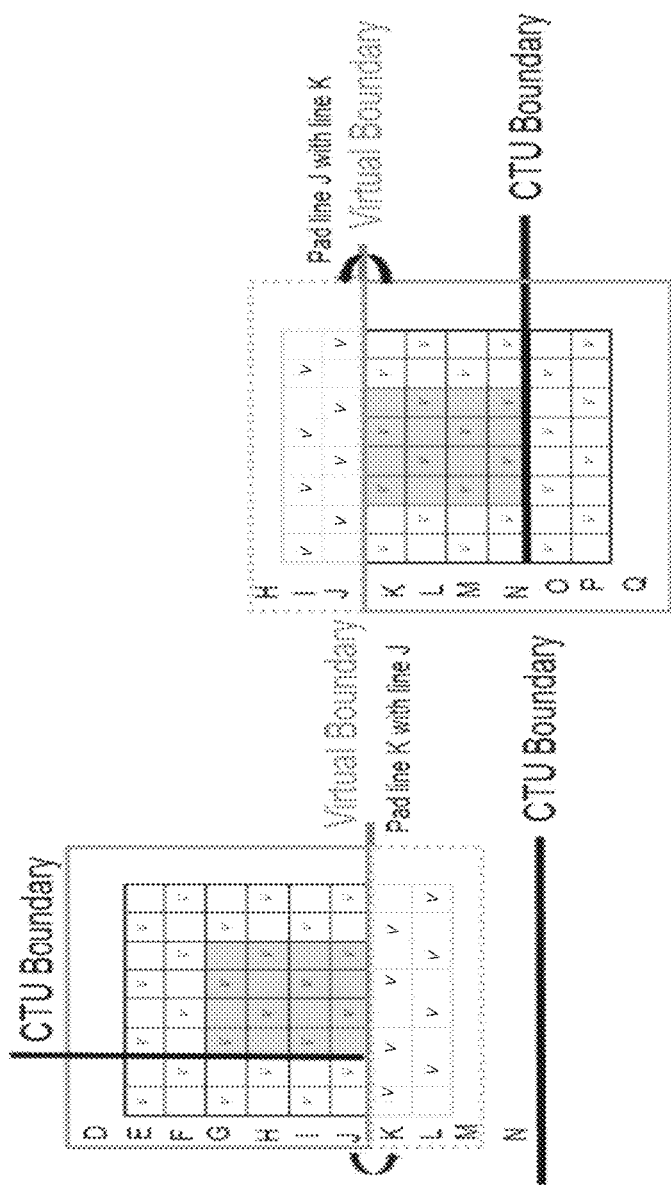
FIG. 15 shows an example of modified block classification at virtual boundaries.

FIG. 15 shows a modified block classification at virtual boundaries

Figure 16:
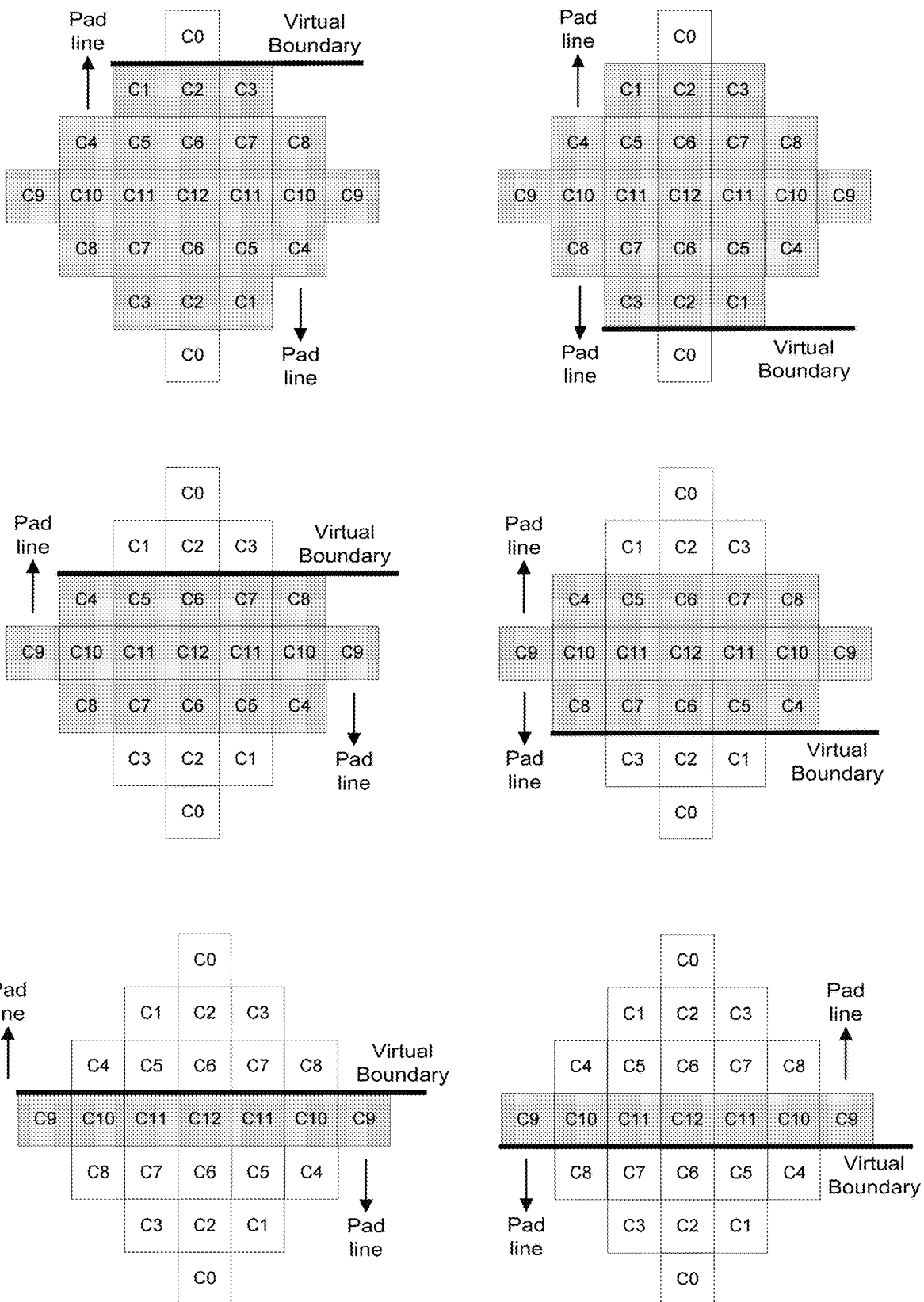
FIG. 16 shows an example of modified ALF filtering for Luma component at virtual boundaries.

Modified block classification is applied for the Luma component as depicted in FIG. 16. For the 1D Laplacian gradient calculation of the 4×4 block above the virtual boundary, only the samples above the virtual boundary are used. Similarly, for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

For filtering processing, mirrored (symmetric) padding operation at the virtual boundaries are used for both Luma and Chroma components. As shown in FIG. 16 when the sample being filtered is located below the virtual boundary, the neighboring samples that are located above the virtual boundary are padded. Meanwhile, the corresponding samples at the other sides are also padded, symmetrically.

Figure 17A:
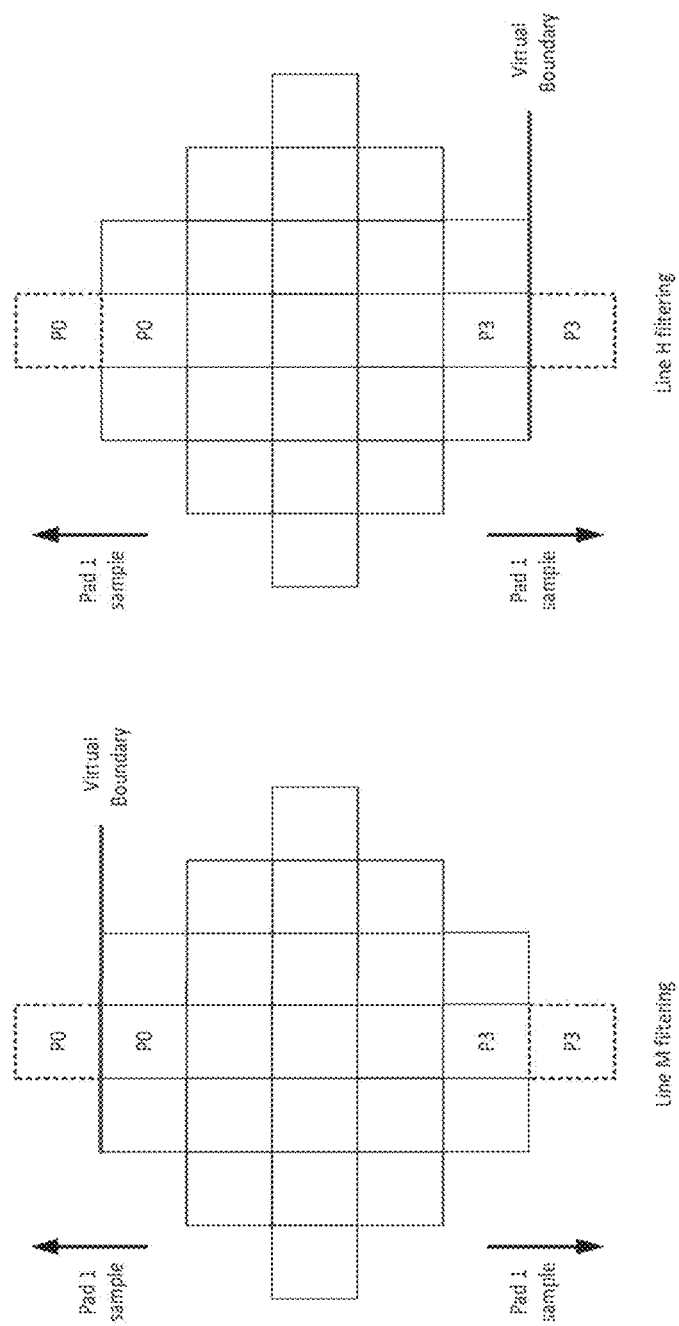
FIG. 17A-17C show.
Figure 17B:
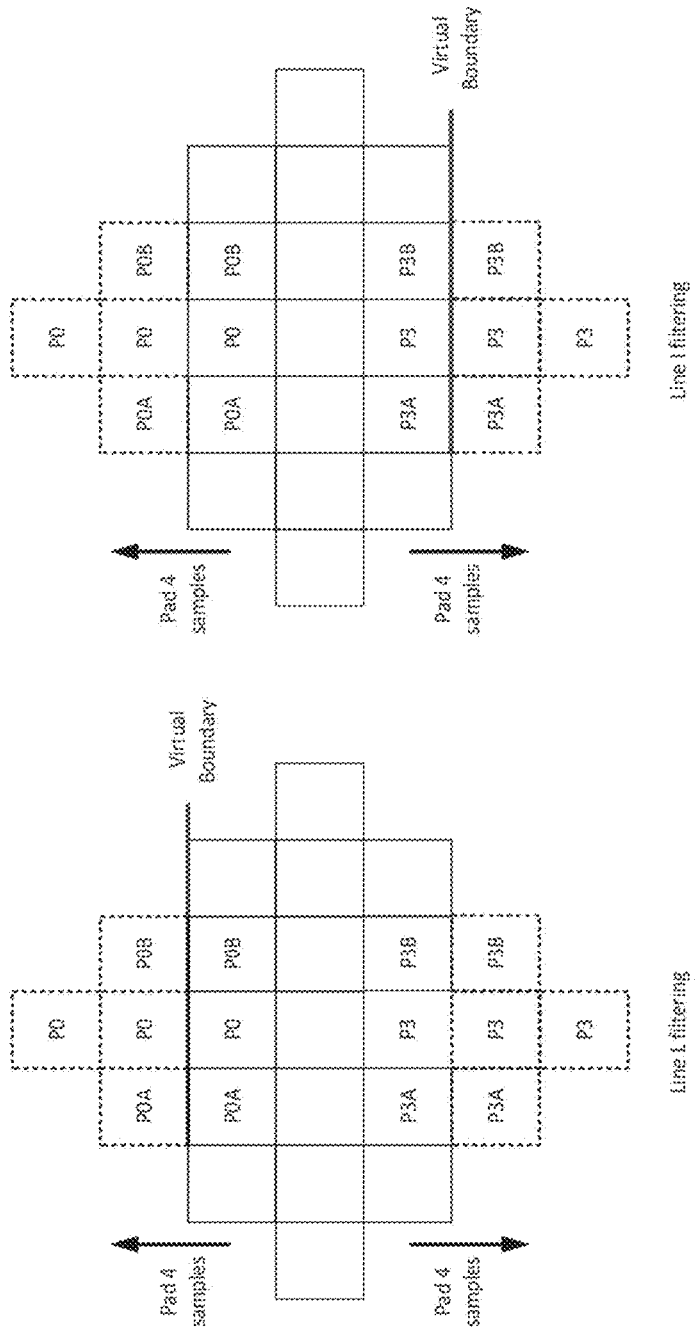
Figure 17C:
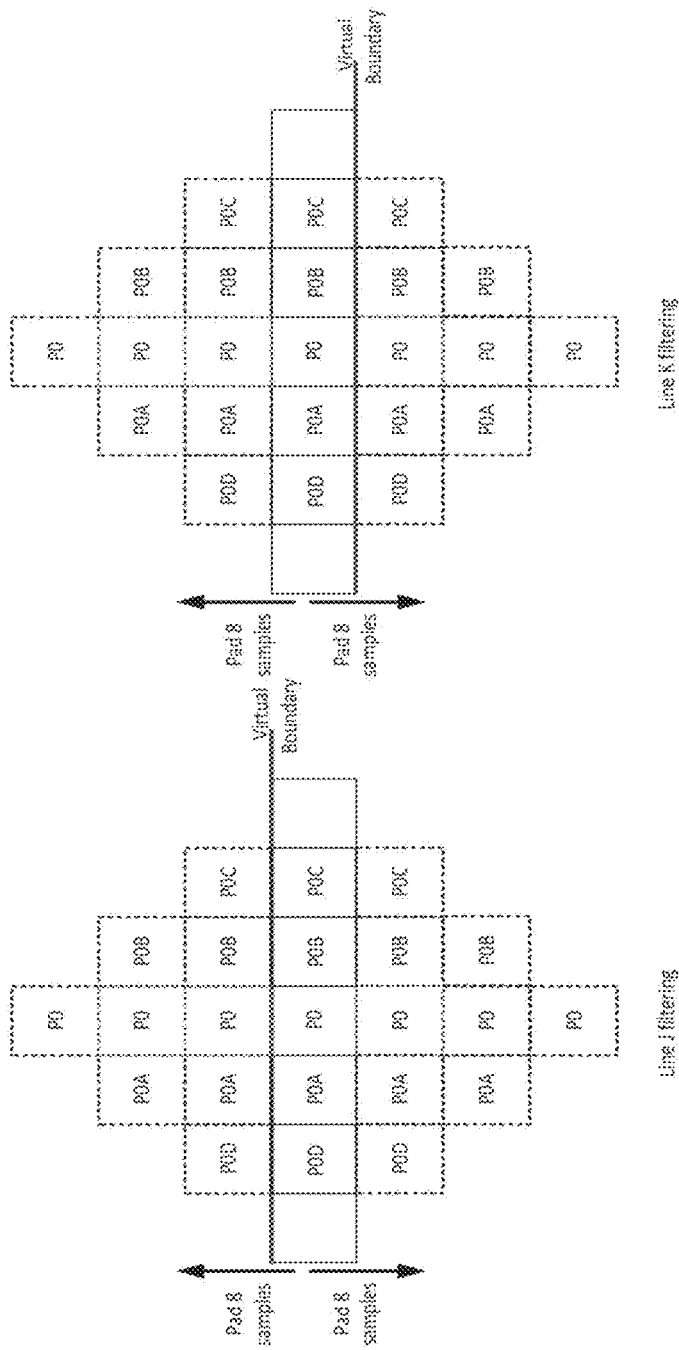

FIG. 16 shows a modified ALF filtering for Luma component at virtual boundaries For another example, if one sample located at (i, j) (e.g., the POA with dash line in FIG. 17B is padded, then the corresponding sample located at (m, n) (e.g., the P3B with dash line in FIG. 17B which share the same filter coefficient is also padded even the sample is available, as depicted in FIGS. 17A-17C.

FIG. 17A shows one required line above/below VB need to be padded (per side).

FIG. 17B shows 2 required lines above/below VB need to be padded (per side).

FIG. 17C shows 3 required lines above/below VB need to be padded (per side).

Figure 27:
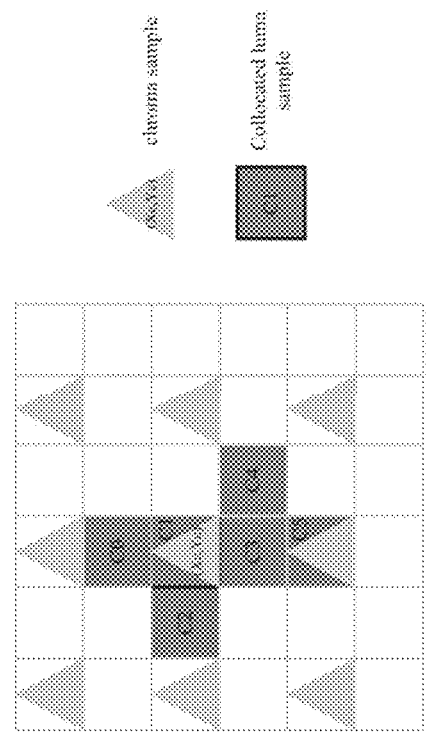
FIG. 27 shows CC-ALF filter shape of 6 coefficients in JVET-P0251.

FIG. 27 shows examples of modified luma ALF filtering at virtual boundary

Figure 18:
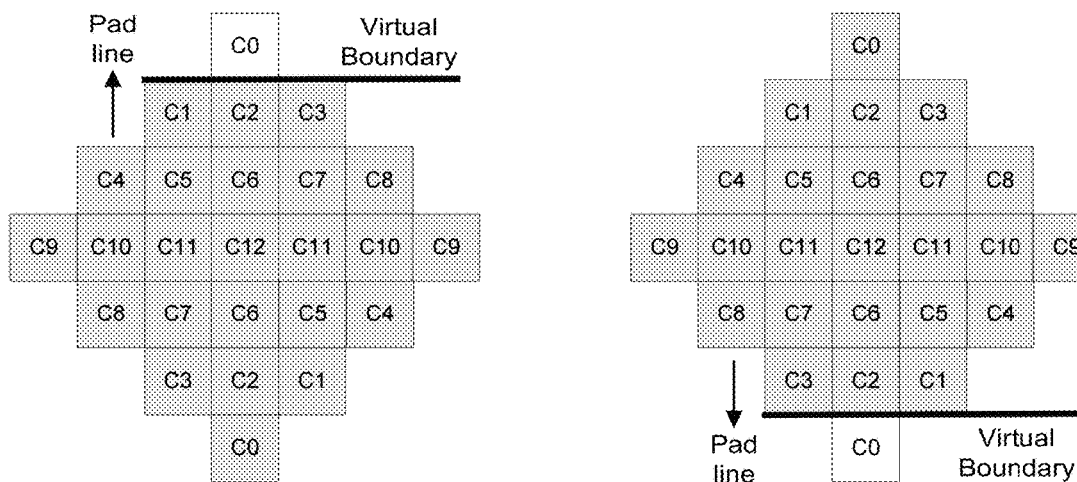
FIG. 18 shows examples of repetitive padding for luma ALF filtering at picture/subpicture/slice/tile boundary.
Figure 18:
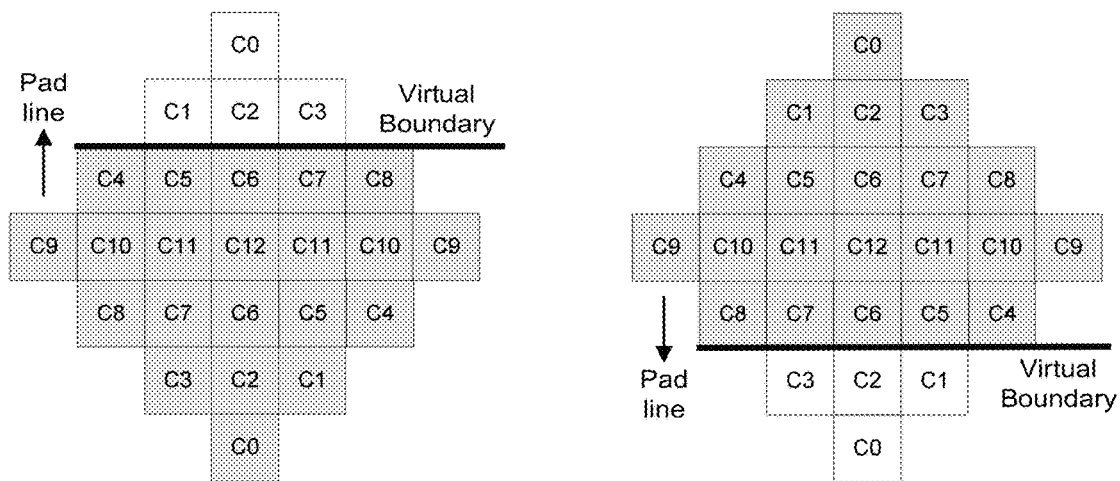
Figure 18:
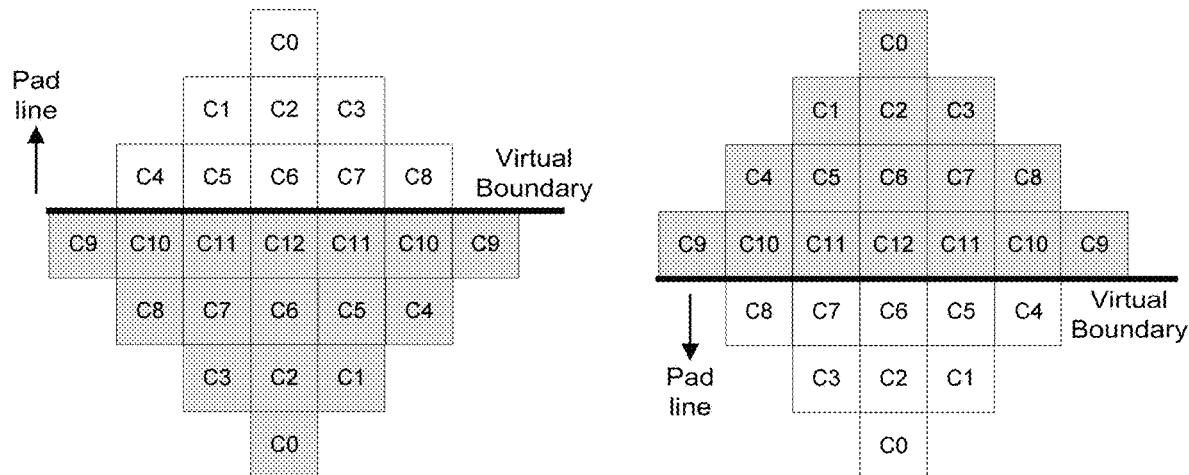

Different to the mirrored (symmetric) padding method used at horizontal CTU boundaries, repetitive (one-side) padding process is applied for slice, tile and subpicture boundaries when filter across the boundaries is disabled. The repetitive (one-side) padding process is also applied at picture boundary. The padded samples are used for both classification and filtering process. FIG. 18 depicts an example of repetitive padding method for luma ALF filtering at picture/subpicture/slice/tile boundary.

Figure 19:
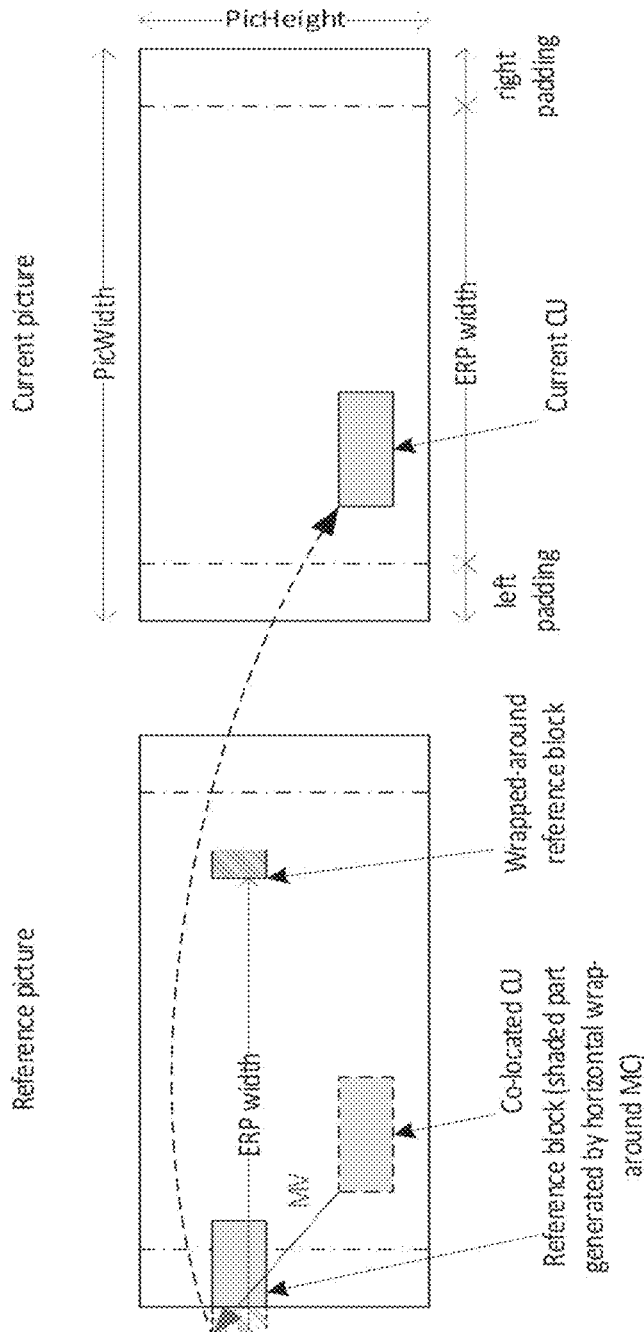
FIG. 19 shows an example of a Horizontal wrap around motion compensation in VVC.

FIG. 18 shows examples of repetitive padding for luma ALF filtering at picture/subpicture/slice/tile boundary 2.7. 360-Degree Video Coding The horizontal wrap around motion compensation in the VTM5 is a 360-specific coding tool designed to improve the visual quality of reconstructed 360-degree video in the equi-rectangular (ERP) projection format. In conventional motion compensation, when a motion vector refers to samples beyond the picture boundaries of the reference picture, repetitive padding is applied to derive the values of the out-of-bounds samples by copying from those nearest neighbors on the corresponding picture boundary. For 360-degree video, this method of repetitive padding is not suitable, and could cause visual artefacts called "seam artefacts" in a reconstructed viewport video. Because a 360-degree video is captured on a sphere and inherently has no "boundary," the reference samples that are out of the boundaries of a reference picture in the projected domain can always be obtained from neighboring samples in the spherical domain. For a general projection format, it may be difficult to derive the corresponding neighboring samples in the spherical domain, because it involves 2D-to-3D and 3D-to-2D coordinate conversion, as well as sample interpolation for fractional sample positions. This problem is much simpler for the left and right boundaries of the ERP projection format, as the spherical neighbors outside of the left picture boundary can be obtained from samples inside the right picture boundary, and vice versa. FIG. 19 shows an example of horizontal wrap around motion compensation in VVC The horizontal wrap around motion compensation process is as depicted in FIG. 19 When a part of the reference block is outside of the reference picture's left (or right) boundary in the projected domain, instead of repetitive padding, the "out-of-boundary" part is taken from the corresponding spherical neighbors that are located within the reference picture toward the right (or left) boundary in the projected domain. Repetitive padding is only used for the top and bottom picture boundaries. As depicted in FIG. 19, the horizontal wrap around motion compensation can be combined with the non-normative padding method often used in 360-degree video coding. In VVC, this is achieved by signaling a high-level syntax element to indicate the wrap-around offset, which should be set to the ERP picture width before padding; this syntax is used to adjust the position of horizontal wrap around accordingly. This syntax is not affected by the specific amount of padding on the left and right picture boundaries, and therefore naturally supports asymmetric padding of the ERP picture, i.e., when left and right padding are different. The horizontal wrap around motion compensation provides more meaningful information for motion compensation when the reference samples are outside of the reference picture's left and right boundaries.

For projection formats composed of a plurality of faces, no matter what kind of compact frame packing arrangement is used, discontinuities appear between two or more adjacent faces in the frame packed picture. For example, considering the 3×2 frame packing configuration depicted in FIG. 20, the three faces in the top half are continuous in the 3D geometry, the three faces in the bottom half are continuous in the 3D geometry, but the top and bottom halves of the frame packed picture are discontinuous in the 3D geometry. If in-loop filtering operations are performed across this discontinuity, face seam artifacts may become visible in the reconstructed video.

To alleviate face seam artifacts, in-loop filtering operations may be disabled across discontinuities in the frame-packed picture. A syntax was proposed to signal vertical and/or horizontal virtual boundaries across which the in-loop filtering operations are disabled. Compared to using two tiles, one for each set of continuous faces, and to disable in-loop filtering operations across tiles, the proposed signaling method is more flexible as it does not require the face size to be a multiple of the CTU size.

Figure 20:
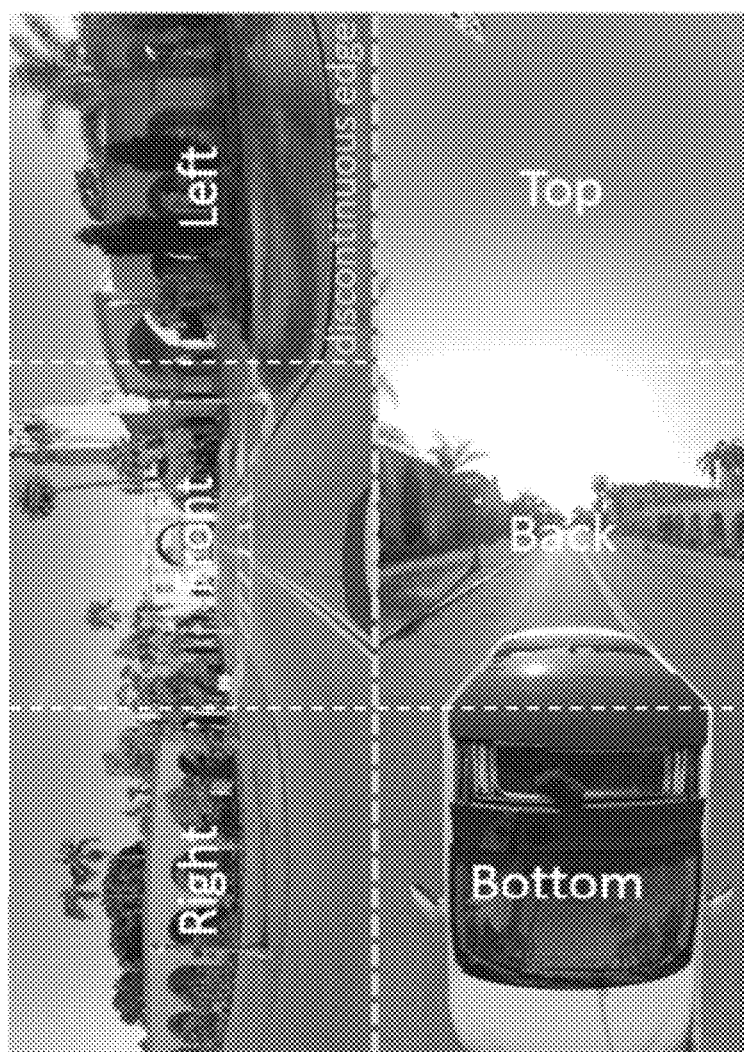
FIG. 20 shows an image of HEC in 3×2 layout.

FIG. 20 shows an in image of HEC in 3×2 layout.

2.8. JVET-P0080: CE5-2.1, CE5-2.2: Cross Component Adaptive Loop Filter

Figure 21B:
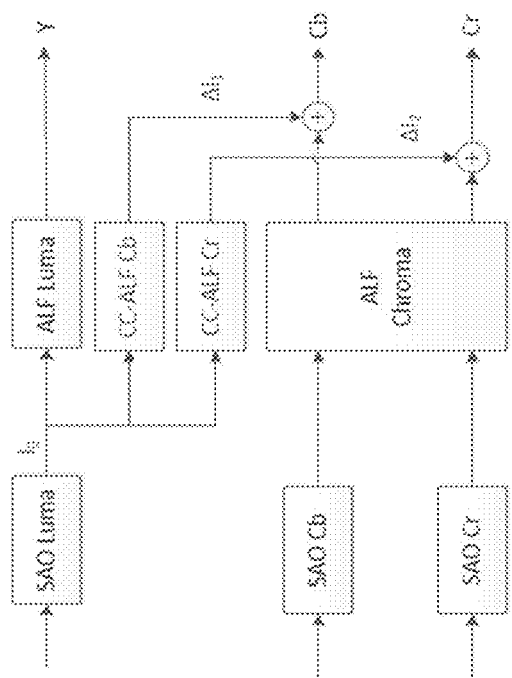
FIG. 21B shows a diamond shaped filter.
Figure 21A:
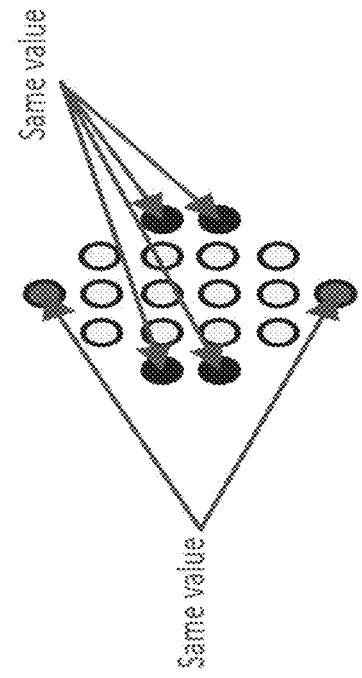
FIG. 21A shows a placement of CC-ALF with respect to other loop filters.

FIG. 21A illustrates the placement of CC-ALF [1] with respect to the other loop filters. CC-ALF operates by applying a linear, diamond shaped filter FIG. 21B to the luma channel for each chroma component, which is expressed as $$\Delta I_i(x, y) = \sum_{(x_0, y_0) \in S_i} I_0(x_C + x_0, y_C + y_0) c_i(x_0, y_0),$$

where
(x, y) is chroma component i location being refined
$(x_c, y_c)$ is the luma location based on (x, y)
$S_i$ is filter support in luma for chroma component i
$c_i(x_0, y_0)$ represents the filter coefficients (2-14)

FIG. 21A shows an example placement of CC-ALF with respect to other loop filters. FIG. 21B shows a Diamond shaped filter.

The luma location $(x_c, y_c)$, around which the support region is centered, is computed based on the spatial scaling factor between the luma and chroma planes. All filter coefficients are transmitted in the APS and have 8-bit dynamic range. An APS may be referenced in the slice header. CC-ALF coefficients used for each chroma component of a slice are also stored in a buffer corresponding to a temporal sublayer. Reuse of these sets of temporal sublayer filter coefficients is facilitated using slice-level flags. The application of the CC-ALF filters is controlled on a variable block size (i.e. 16×16, 32×32, 64×64, 128×128) and signalled by a context-coded flag received for each block of samples. The block size along with an CC-ALF enabling flag is received at the slice-level for each chroma component. Boundary padding for the horizontal virtual boundaries makes use of repetition. For the remaining boundaries the same type of padding is used as for regular ALF.

2.8.1. Specification on CC-ALF in JVET-P0080
x.x.x.x Cross component filtering process for block of chroma samples Inputs of this process are:
a reconstructed luma picture sample array recPicture$_L$ prior to the luma adaptive loop filtering process,
a filtered reconstructed chroma picture sample array alfPicture$_c$,
a chroma location ($x_C$, $y_C$) specifying the top left sample of the current block of chroma samples relative to the top left sample of the current picture,
a width ccAlfWidth of block of chroma samples
a height ccAlfHeight of block of chroma samples
cross component filter coefficients CcAlfCoeff[j], with j=0..13

Output of this process is the modified filtered reconstructed chroma picture sample array ccAlfPicture.
The coding tree block luma location (xCtb, yCtb) is derived as follows:

xCtb=((($x_C$*SubWidthC)>>Ctb Log2SizeY)<<Ctb Log2SizeY (8-1229)

yCtb=((($y_C$*SubHeightC)>>Ctb Log2SizeY)<<Ctb Log2SizeY (8-1229)

For the derivation of the filtered reconstructed chroma samples ccAlfPicture[$x_C$+x] [$y_C$+y], each reconstructed chroma sample inside the current chroma block of samples alfPicturec[$x_C$+x] [$y_C$+y] with x=0..ccAlfWidth−1, y=0..ccAlfHeight−1, is filtered as follows:
The luma location (xL, yL) corresponding to the current chroma sample at chroma location ($x_C$+x, $y_C$+y) is set equal to (($x_C$+x)*SubWidthC, ($y_C$+y)*SubHeightC)
The luma locations ($h_{xL+i}$, $v_{yL+j}$) with i=−2..2, j=−2..3 inside the array recPicture$_L$ are derived as follows:
If pps_loop_filter_across_virtual_boundaries_disabled_flag is equal to 1, and PpsVirtualBoundariesPosX[n] % CtbSizeY is not equal to 0, and xL−PpsVirtualBoundariesPosX[n] is greater than or equal to 0 and less than 3 for any n=0..pps_num_ver_virtual_boundaries−1, the following applies:
$h_{xL+i}$=Clip3(PpsVirtualBoundariesPosX[n], pic_width_in_luma_samples−1, xL+i) (8-1229)
Otherwise, if pps_loop_filter_across_virtual_boundaries_disabled flag is equal to 1, and PpsVirtualBoundariesPosX[n] % CtbSizeY is not equal to 0, and PpsVirtualBoundariesPosX[n]−xL is greater than 0 and less than 4 for any n=0..pps_num_ver_virtual_boundaries−1, the following applies:
$h_{x+i}$=Clip3(0, PpsVirtualBoundariesPosX[n]−1, xL+i) (8-1230)
Otherwise, the following applies:
$h_{x+i}$=Clip3(0, pic_width_in_luma_samples−1, xL+i) (8-1231)
If pps_loop_filter_across_virtual_boundaries_disabled flag is equal to 1, and PpsVirtualBoundariesPosY[n] % CtbSizeY is not equal to 0, and yL −PpsVirtualBoundariesPosY[n] is greater than or equal to 0 and less than 3 for any n=0..pps_num_hor_virtual_boundaries−1, the following applies:
$v_{y+j}$=Clip3(PpsVirtualBoundariesPosY[n], pic_height_in_luma_samples−1, yL+j) (8-1232)
Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0..pps_num_hor_virtual_boundaries−1, the following applies:
    $v_{y+j}$=Clip3(0,     PpsVirtualBoundariesPosY[n]−1, yL+j) (8-1233)
Otherwise, the following applies:
    $v_{y+j}$=Clip3(0,    pic_height_in_luma_samples−1, yL+j) (8-1234)
The variables clipLeftPos, clipRightPos, clipTopPos and clipBottomPos are derived by invoking the ALF boundary position derivation process as specified in clause 8.8.5.5 with (xCtb, yCtb) and (xL−xCtb, yL−yCtb) as inputs.
The vertical sample position offsets yM2, yM1, yP1, yP2 and yP3 are specified in Table 2-6 according to the vertical luma sample position yL, clipLeftPos and clipRightPos.
The horizontal sample position offsets xM1, xM2, xP1 and xP2 are specified in Table 2-7 according to the horizontal luma sample position xL, clipLeftPos and clipRightPos.
The variable curr is derived as follows:
    curr=alfPicturec[$x_C$+x, $y_C$+y] (8-1286)
The array of cross component filter coefficients f[j] is derived as follows with j=0..13:
    f[ij]=CcAlfCoeff[j] (8-1287)
The variable sum is derived as follows:
sum=f[0] *recPicture$_L$[$h_x$, $v_{y+yM2}$]+
    f[1] *recPicture$_L$[$h_{x+xM1}$, $v_{y+yM1}$]+
    f[2] *recPicture$_L$[$h_x$, $v_{y+yM1}$]+
    f[3] *recPicture$_L$[$h_{x+xp1}$, $v_{y+yM1}$]+
    f[4] *recPicture$_L$[$h_{x+xM2}$, $v_y$]+
    f[5] *recPicture$_L$[$h_{x+xm1}$, $v_y$]+
    f[6] *recPicture$_L$[$h_x$, $v_y$]+
    f[7] *recPicture$_L$[$h_{x+xp1}$, $v_y$]+
    f[4] *recPicture$_L$[$h_{x+xP2}$, $v_y$]+(8-1289)
    f[4] *recPicture$_L$[$h_{x+xM2}$, $v_{y+yP1}$]+
    f[8] *recPicture$_L$[$h_{x+xm1}$, $v_{y+yP1}$]+
    f[9] *recPicture$_L$[$h_x$, $v_{y+yP1}$]+
    f[10] *recPicture$_L$[$h_{x+Xp1}$, $v_{y+yP1}$]+
    f[4] *recPicture$_L$[$h_{x+xP2}$, $v_{y+yP1}$]+
    f[11] *recPicture$_L$[$h_{x+xM1}$, $v_{y+yP2}$]+
    f[12] *recPicture$_L$[$h_x$, $v_{y+yP2}$]+
    f[13] *recPicture$_L$[$h_{x+xp1}$, $v_{y+yP2}$]+
    f[0] *recPicture$_L$[$h_x$, $v_{y+yP3}$]
    sum=curr+(sum+64)>>7) (8-1290)
The modified filtered reconstructed chroma picture sample array ccAlfPicture[$x_C$+x][$y_C$+y] is derived as follows:

ccAlfPicture[$x_C$+x][$y_C$+y]=Clip3(0,(1<<BitDepthc)−1,sum)    (8-1291)

TABLE 2-6

Specification of yM1, yM2, yP1, yP2 and yP3 according to the vertical luma sample position yL, clipTopPos and clipBottomPos

| Condition | yM2 | yM1 | yP1 | yP2 | yP3 |
|---|---|---|---|---|---|
| yL = = clipTopPos + 1 | −1 | −1 | 1 | 2 | 3 |
| yL = = clipTopPos | 0 | 0 | 1 | 2 | 3 |
| yL = = clipBottomPos − 1 | −2 | −1 | 0 | 0 | 0 |
| yL = = clipBottomPos − 2 | −2 | −1 | 1 | 1 | 1 |
| yL = = clipBottomPos − 3 | −2 | −1 | 1 | 2 | 2 |
| Otherwise | −2 | −1 | 1 | 2 | 3 |

TABLE 2-7

Specification of xM1, xM2, xP1, and xP2 according to the horizontal luma sample position xL, clipLeftPos and clipRightPos

| Condition | xM2 | xM1 | xP1 | xP2 |
|---|---|---|---|---|
| xL = = clipLeftPos + 1 | −1 | −1 | 1 | 2 |
| xL = = clipLeftPos | 0 | 0 | 1 | 2 |
| xL = = clipRightPos − 1 | −2 | −1 | 0 | 0 |
| xL = = clipRightPos − 2 | −2 | −1 | 1 | 1 |
| Otherwise | −2 | −1 | 1 | 2 |

2.8.2. Padding Method at Virtual Boundary in JVET-P0080

Figure 22:
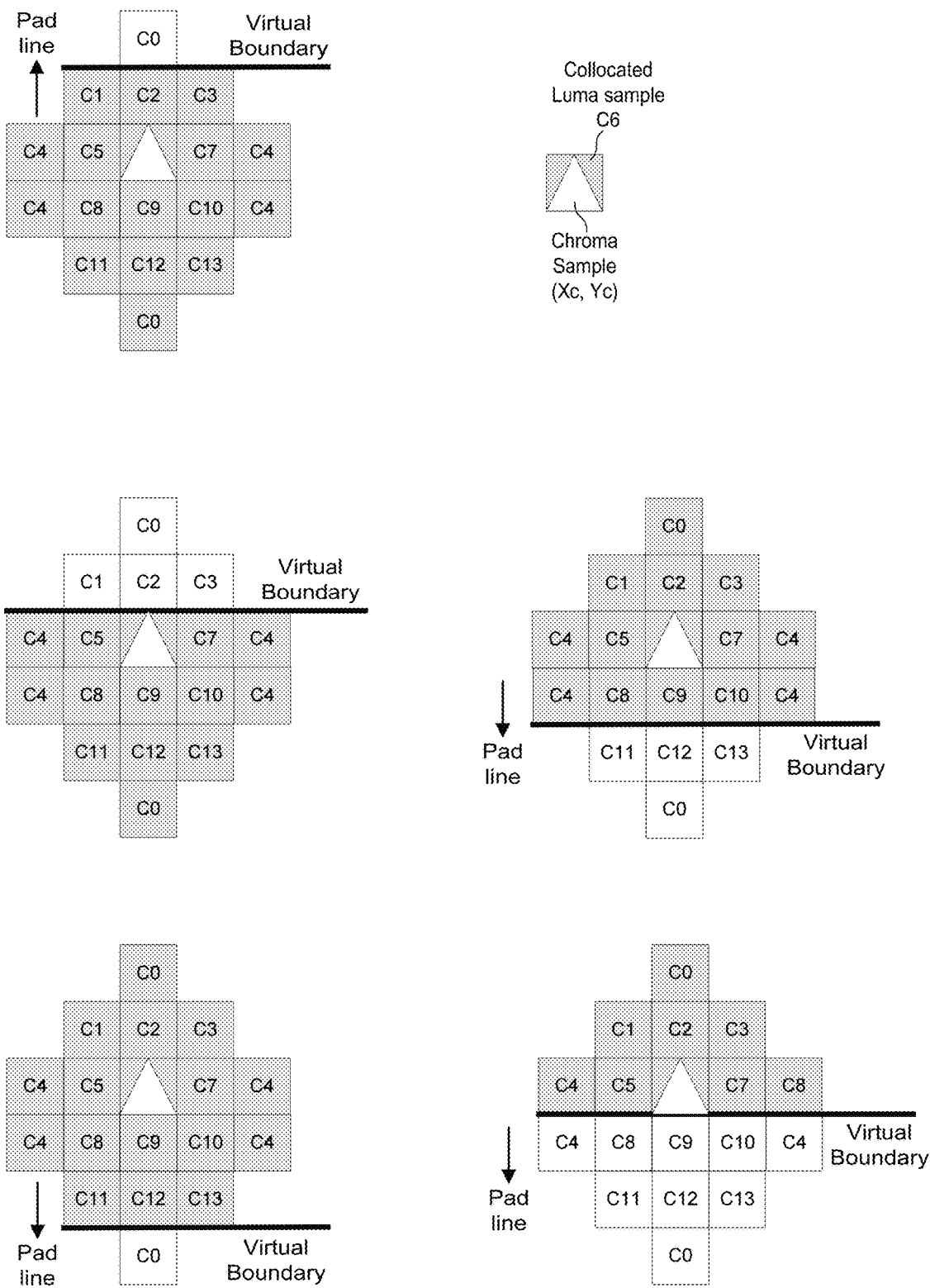
FIG. 22 shows an example of repetitive padding at ALF virtual boundary for CC-ALF in JVET-P0080.

Similar to luma ALF/chroma ALF, repetitive padding is utilized at ALF virtual boundary for CC-ALF in JVET-P0080. As shown in FIG. 22, if the luma samples above or below the ALF virtual boundary are unavailable, the nearest sample line is utilized for padding. The detailed padding method is also shown in Table 2-6.

2.9. JVET-P1008: CE5-Related: On the Design of CC-ALF

In JVET-O0636 [1] and CE5-2.1 [2], the Cross Component Adaptive Loop Filter (CC-ALF) was introduced and studied. The filter uses a linear filter to filter luma sample values and generate a residual correction for the chroma channels from the co-located filtered output. The filter is designed to operate in parallel with the existing luma ALF.

Figure 23:
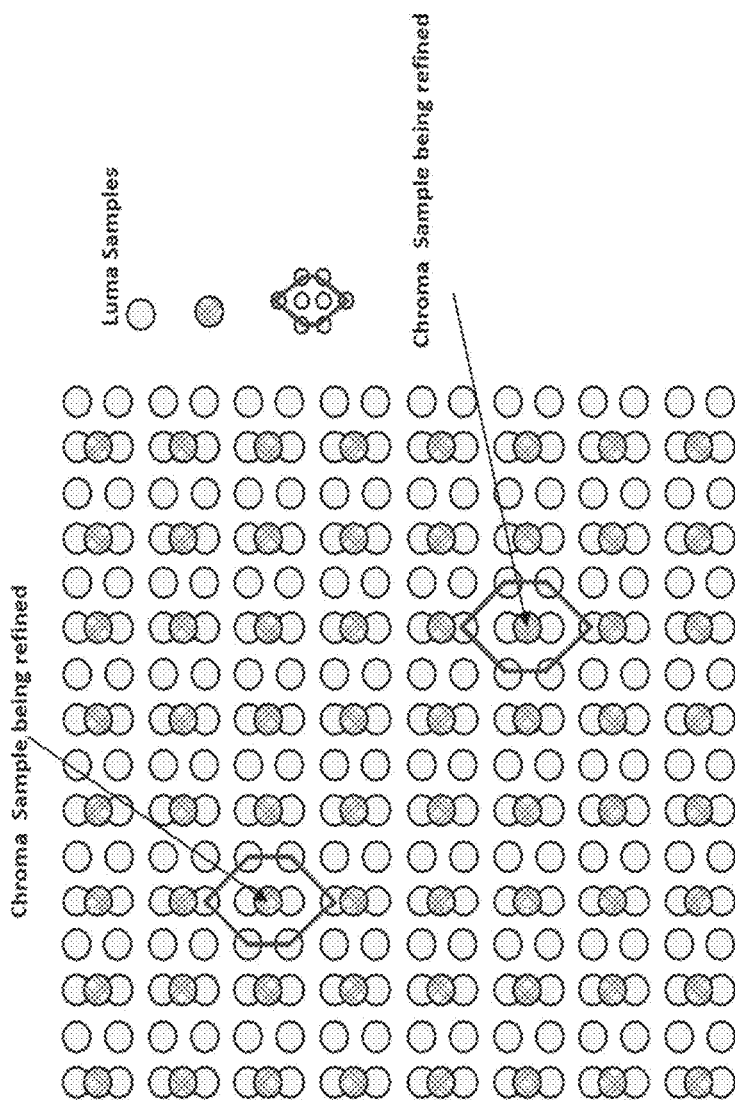
FIG. 23 shows a 3×4 Diamond Shape Filter with 8 unique coefficients.

A CC-ALF design is proposed that is asserted to be both simplified and better aligned with the existing ALF. The design uses a 3×4 diamond shape with 8 unique coefficients. This reduces the number of multiplies by 43% compared to the 5×6 design studied in CE5-2.1. When a restriction is placed that enables either chroma ALF or CC-ALF for chroma component of a CTU we limit the per-pixel multiplier count to 16 (current ALF is 15). The filter coefficient dynamic range is limited to 6-bit signed. An illustration of the filters for both the proposed and CE5-2.1 solution are shown in FIG. 23.

To be better aligned with the existing ALF design, the filter coefficients are signaled in the APS. Up to four filters are supported, and filter selection is indicated at the CTU-level. Symmetric line selection is used at the virtual boundary to further harmonize with ALF. Finally, to limit the amount of storage needed by the correction output, the CC-ALF residual output is clipped to $-2^{BitDepthC-1}$ to $2^{BitDepthC-1}-1$, inclusive.

Specification on CC-ALF in JVET-P1008.

x.x.x.x Cross component filtering process for block of chroma samples

Inputs of this process are:
    a reconstructed luma picture sample array recPicture$_L$ prior to the luma adaptive loop filtering process,
    a filtered reconstructed chroma picture sample array alfPicturec,
    a chroma location (xCtbC, yCtbC) specifying the top-left sample of the current chroma coding tree block relative to the top left sample of the current picture,
    a width ccAlfWidth of block of chroma samples
    a height ccAlfHeight of block of chroma samples
    cross component filter coefficients CcAlfCoeff[j], with j=0..7

Output of this process is the modified filtered reconstructed chroma picture sample array ccAlfPicture.

The coding tree block luma location (xCtb, yCtb) is derived as follows:

xCtb=(((xCtbC*SubWidthC)>>*Ctb* Log2SizeY)
    <<*Ctb* Log2SizeY)     (8-1229)

yCtb=(((yCtbC*SubHeightC)>>*Ctb* Log2SizeY)
    <<*Ctb* Log2SizeY)     (8-1229)

For the derivation of the filtered reconstructed chroma samples ccAlfPicture[xCtbC+x][yCtbC+y], each reconstructed chroma sample inside the current chroma block of samples alfPicturec[xCtbC+x][yCtbC+y] with x=0..ccAlfWidth−1, y=0..ccAlfHeight−1, is filtered as follows:

The luma location (xL, yL) corresponding to the current chroma sample at chroma location (xCtbC+x, yCtbC+y) is set equal to ((xCtbC+x)*SubWidthC, (yCtbC+y)*SubHeightC)

The luma locations ($h_{xL+i}$, $v_{yL+j}$) with i=−1..1, j=−1..2 inside the array recPicture$_L$ are derived as follows:

If pps_loop_filter_across_virtual_boundaries_disabled flag is equal to 1, and PpsVirtualBoundariesPosX[n] % CtbSizeY is not equal to 0, and xL−PpsVirtualBoundariesPosX[n] is greater than or equal to 0 and less than 3 for any n=0..pps_num_ver_virtual_boundaries−1, the following applies:

$h_{xL+i}$=Clip3(PpsVirtualBoundariesPosX[n], pic_width_in_luma_samples−1, xL+i) (8-1229)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0..pps_num_ver_virtual_boundaries−1, the following applies:

$h_{x+i}$=Clip3(0, PpsVirtualBoundariesPosX[n]−1, xL+i) (8-1230)

Otherwise, the following applies:

$h_{x+i}$=Clip3(0, pic_width_in_luma_samples−1, xL+i) (8-1231)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0..pps_num_hor_virtual_boundaries−1, the following applies:

$v_{y+j}$=Clip3(PpsVirtualBoundariesPosY[n], pic_height_in_luma_samples−1, yL+j) (8-1232)

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0..pps_num_hor_virtual_boundaries−1, the following applies:

$v_{y+j}$=Clip3(0, PpsVirtualBoundariesPosY[n]−1, yL+j) (8-1233)

Otherwise, the following applies:

$v_{y+j}$=Clip3(0, pic_height_in_luma_samples−1, yL+j) (8-1234)

The variables clipLeftPos, clipRightPos, clipTopPos and clipBottomPos are derived by invoking the ALF boundary position derivation process as specified in clause 8.8.5.5 with (xCtb, yCtb) and (xL−xCtb, yL−yCtb) as inputs.

The vertical sample position offsets yM1, yP1 and yP2 are specified in Table 2-8 according to the vertical luma sample position yL, clipLeftPos and clipRightPos.

The horizontal sample position offsets xM1 and xP1 are specified in Table 2-9 according to the horizontal luma sample position xL, clipLeftPos and clipRightPos.

The variable curr is derived as follows:

curr=alfPicturec[xCtbC+x, yCtbC+y] (8-1286)

The array of cross component filter coefficients f[j] is derived as follows with j=0..7:

f[ij]=CcAlfCoeff[j] (8-1287)

The variable sum is derived as follows:

sum=f[0] *recPicture$_L$[$h_x$, $v_{y+yM1}$]+ f[1] *recPicture$_L$[$h_{x+xm1}$, $v_y$]+ f[2] *recPicture$_L$[$h_x$, $v_y$]+ f[3] *recPicture$_L$[$h_{x+xp1}$, $v_y$]+(8-1289)

f[4] *recPicture$_L$[$h_{x+xm1}$, $v_{y+yr1}$]+ f[5] *recPicture$_L$[$h_x$, $v_{y+yP1}$]+ f[6] *recPicture$_L$[$h_{x+xp1}$, $v_{y+yP1}$]+ f[7] *recPicture$_L$[$h_x$, $v_{y+yP2}$]

sum=Clip3(−(1<<(BitDepthc−1)), (1<<(BitDepthc−1))−1, sum) (8-1290)

sum=curr+(sum+64)>>(7+(BitDepthy−BitDepthc)) (8-1290)

The modified filtered reconstructed chroma picture sample array ccAlfPicture[xCtbC+x][yCtbC+y] is derived as follows:

ccAlfPicture[xCtbC+x][yCtbC+y]=Clip3(0, (1<<BitDepthc)−1, sum)(8-1291)

TABLE 2-8

Specification of yM1, yP1 and yP2 according to the vertical luma sample position yL, clipTopPos and clipBottomPos

| Condition | yM1 | yP1 | yP2 |
|---|---|---|---|
| yL = = clipTopPos + 1 | −1 | 1 | 1 |
| yL = = clipTopPos | 0 | 0 | 1 |
| yL = = clipBottomPos − 1 | 0 | 0 | 1 |
| yL = = clipBottomPos − 2 | −1 | 1 | 1 |
| Otherwise | −1 | 1 | 2 |

TABLE 2-9

Specification of xM1 and xP1 according to the horizontal luma sample position xL, clipLeftPos and clipRightPos

| Condition | xM1 | xP1 |
|---|---|---|
| xL = = clipLeftPos | 0 | 0 |
| xL = = clipRightPos − 1 | 0 | 0 |
| xL = = clipRightPos − 2 | −1 | 1 |
| Otherwise | −1 | 1 |

2.9.1. Padding Method at Virtual Boundary in JVET-P1008

Figure 24:
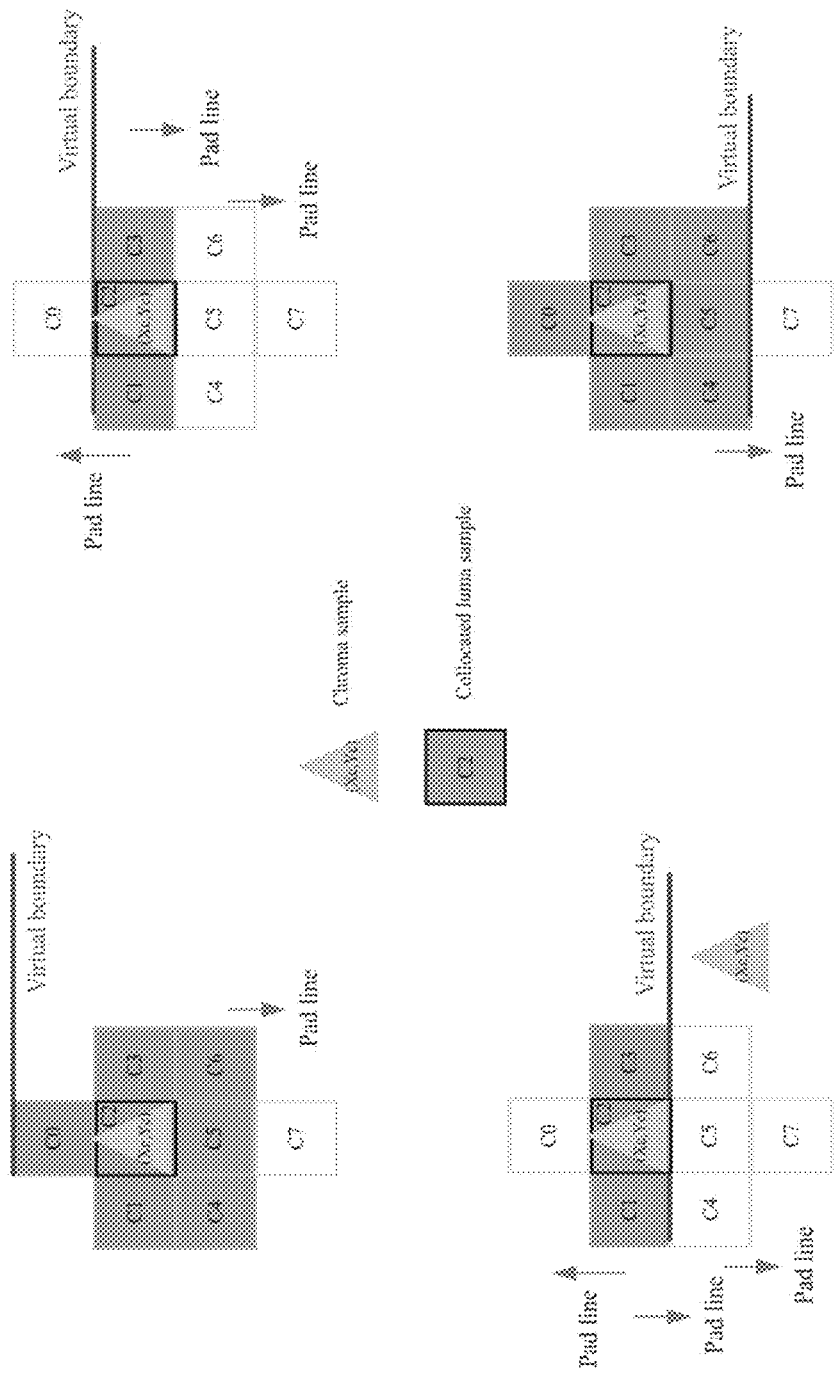
FIG. 24 is an example of repetitive padding at ALF virtual boundary for CC-ALF in JVET-P1008.

Mirrored (symmetric) padding is utilized at ALF virtual boundary for CC-ALF in JVET-P1008. As shown in FIG. 24, if the luma samples above or below the ALF virtual boundary are unavailable, the nearest sample line is utilized for padding, and the corresponding samples also need to be padded. The detailed padding method is also shown in Table 2-9.

2.10. Simplified Methods of CC-ALF in JVET-P2025
2.10.1. Alternative Filter Shapes The CC-ALF filter shape is modified to have 8 or 6 coefficients as shown in the figure below.

Figure 25:
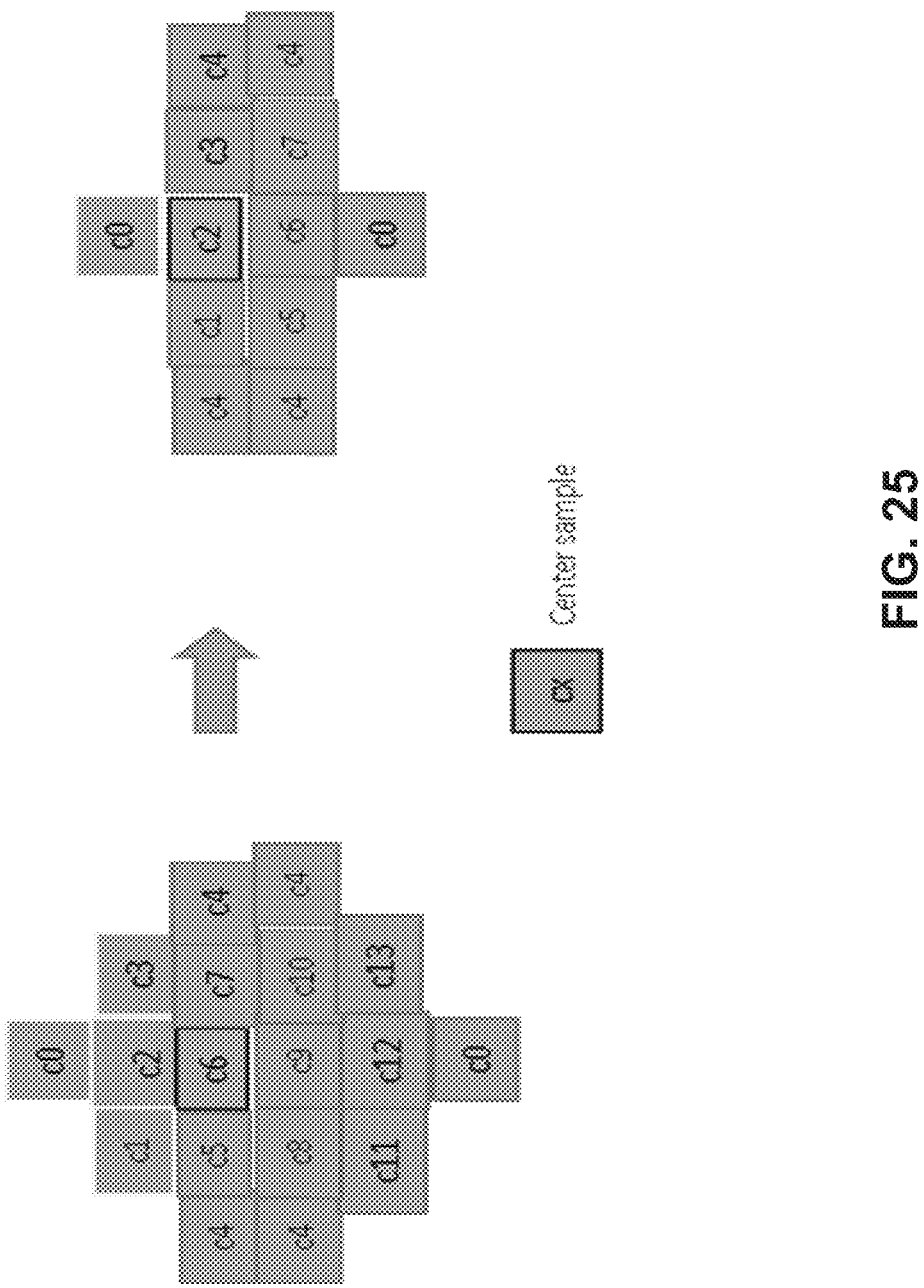
FIG. 25 shows CC-ALF filter shape of 8 coefficients in JVET-P0106.

FIG. 25 shows CC-ALF filter shape of 8 coefficients in JVET-P0106.

Figure 26:
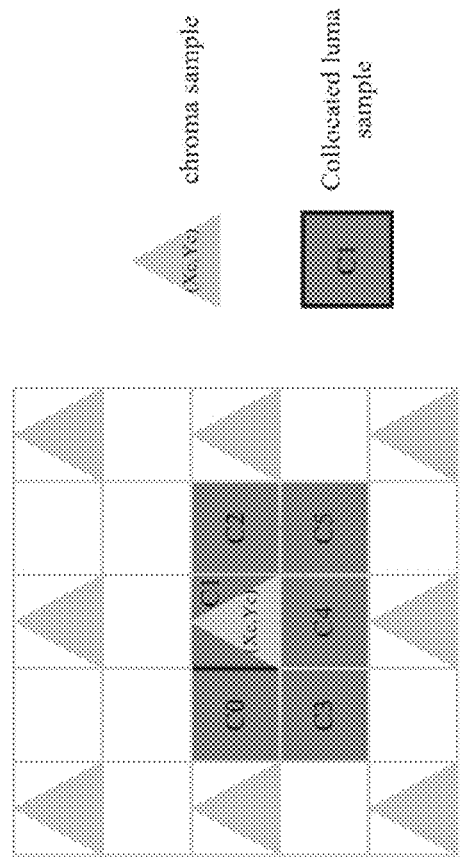
FIG. 26 shows CC-ALF filter shape of 6 coefficients in JVET-P0173.

FIG. 26 shows CC-ALF filter shape of 6 coefficients in JVET-P0173.

FIG. 27 shows CC-ALF filter shape of 6 coefficients in JVET-P0251.

2.10.2. Joint Chroma Cross-Component Adaptive Filtering

Joint Chroma Cross-Component Adaptive Loop Filter (JC-CCALF) uses only one set of CCALF filter coefficients trained at the encoder to generate one filtered output as the refinement signal, which will be added directly to the Cb component, and be properly weighted and then added to the Cr component. Filters are indicated at the CTU-level or indicated with a block size, which is signalled per slice.

The supported such chroma block sizes range from the minimum chroma CTU size to the current chroma CTU size. The minimum chroma CTU size is the minimum between the smallest possible width and height of a chroma CTU, i.e. Min(32/SubWidthC, 32/SubHeightC), while the current chroma CTU size is the minimum between the width and height of the current chroma CTU, i.e. Min(CtbWidthC, CtbHeightC). For example, if CTU size is set to the maximal 128×128, the JC-CCALF chroma block size of a slice will be one from 32×32, 64×64 and 128×128 for 4:4:4 video, or one from 16×16, 32×32 and 64×64 for 4:2:0 and 4:2:2 video.

Figure 28:
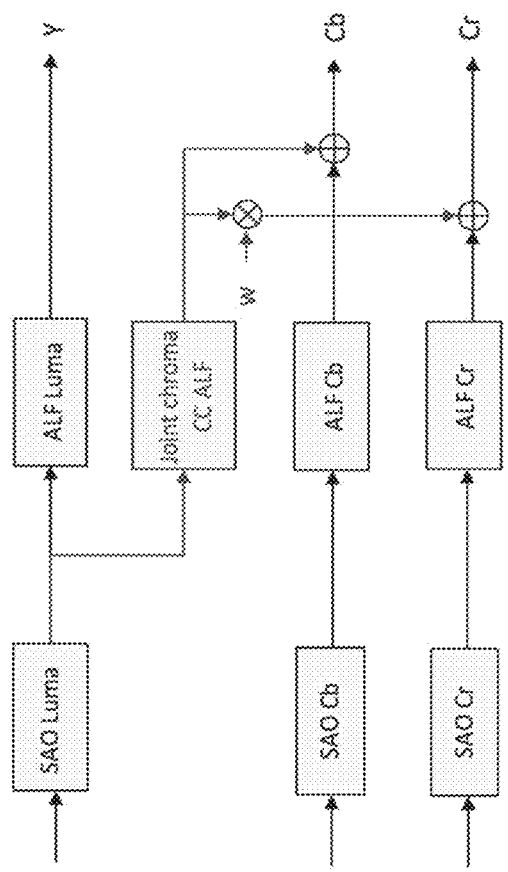
FIG. 28 shows an example of a JC-CCALF workflow.

FIG. 28 shows a JC-CCALF workflow.

3. Technical Problems Solved by Technical Solutions Described Herein

The current design of boundary padding for CC-ALF has the following problems:
1. The padding method at ALF virtual boundary in CC-ALF may be sub-optimal, since padded samples are utilized which may be less efficient.
2. Different ways for handling ALF virtual boundary and video unit boundary (e.g., picture/subpicture/slice/tile boundary) and 360-degree virtual boundary, i.e., different padding methods are existing.
3. In ALF, the mirror padding is applied wherein the distance to the current sample is calculated to determine which corresponding sample needs to be padded. However, in CC-ALF, especially, for 4:2:0, to filter one chroma sample, multiple luma samples are involved. How to determine which corresponding sample needs to be padded is unknown.

4. Example Listing of Techniques and Embodiments

The listing below should be considered as examples to explain general concepts. These items should not be interpreted in a narrow way. Furthermore, these items can be combined in any manner.

In some embodiments described in this disclosure, the term 'CC-ALF' represents a coding tool that utilizes the sample values in a second color component (e.g., Y) or multiple color components (e.g., both Y and Cr) to refine the samples in a first color component (e.g., Cb). It is not limited to the CC-ALF technologies described in [1]-[4]. "corresponding filtering sample set" may be used to represent those samples included in a filter support, e.g., for CC-ALF, the "corresponding filtering sample set" may be used to represent the collocated luma sample and neighboring luma samples of the collocated luma sample of a chroma sample which are utilized to derive the refinement/offset of the chroma sample.

The padding method used for ALF virtual boundaries may be denoted as 'Mirrored Padding' wherein for a first unavailable sample located at (i, j), is padded, and a second sample, defined by 'corresponding sample of the first sample' in the filter support (e.g., the corresponding sample located at (m, n) which share the same distance from the current luma sample) in ALF is also padded even if the second sample is available.

In one example, vertical padding is utilized, such as the sample to be padded located at (x, y1) is set equal to the sample located at (x, y2), wherein y1 denotes the y-coordinate of the sample or the corresponding sample and y2 denotes the y-coordinate of the sample utilized for padding.

In one example, horizontal padding is utilized, such as the sample to be padded located at (x1, y) is set equal to the sample located at (x2, y), wherein x1 denotes the x-coordinate of the sample or the corresponding sample and x2 denotes the x-coordinate of the sample utilized for padding.

The padding method used for picture/subpicture/slice/tile boundaries/360-degree video virtual boundaries, normal boundaries (e.g, top and bottom boundaries) may be denoted as 'Repetitive Padding' wherein if one sample to be used is outside the boundaries, it is copied from an available one inside the boundary.

In the disclosure, a neighbouring (adjacent or non-adjacent) sample is "unavailable" if it is located in a different video processing unit (e.g., out of: the current picture, or current subpicture, or current tile, or current slice, or current brick, or current CTU, or current processing unit (such as ALF processing unit or narrow ALF processing unit), or any other current video unit) or not reconstructed or cross-filtering video processing unit is disallowed.

"ALF boundary" locations are used to define where clipped samples are obtained from, which are used in ALF sample padding process. When one sample used in ALF (e.g., in the filtering process or/and classification process) crosses the top/bottom/left/right boundary, the sample will be clipped to not cross the top/bottom/left/right boundary. "ALF boundary" includes "luma ALF boundary" and "chroma ALF boundary". When deriving the "chroma ALF boundary", a "luma ALF boundary" is first derived and then mapped to the "chroma ALF boundary" according to the color format.

Figure 29:
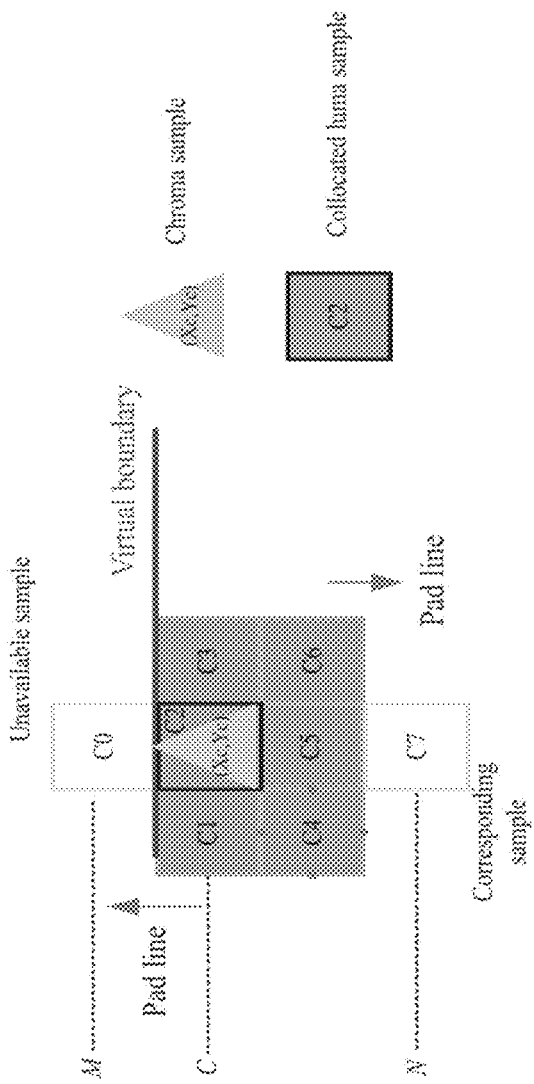
FIG. 29 shows example locations of samples to be padded for the CC-ALF filtering method with 8-tap 4×3 filter shape.
Figure 30:
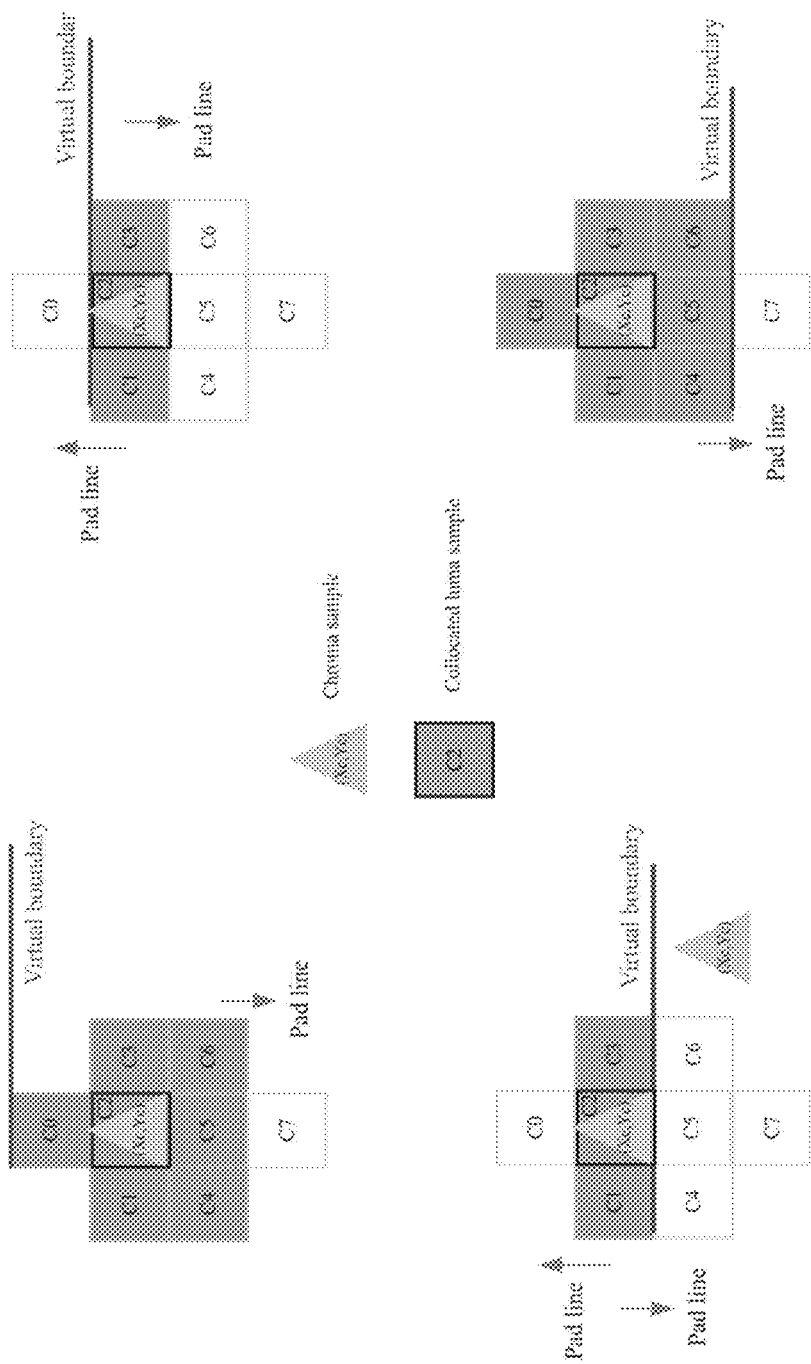
FIG. 30 shows an example of mirrored padding method 1.
Figure 31:
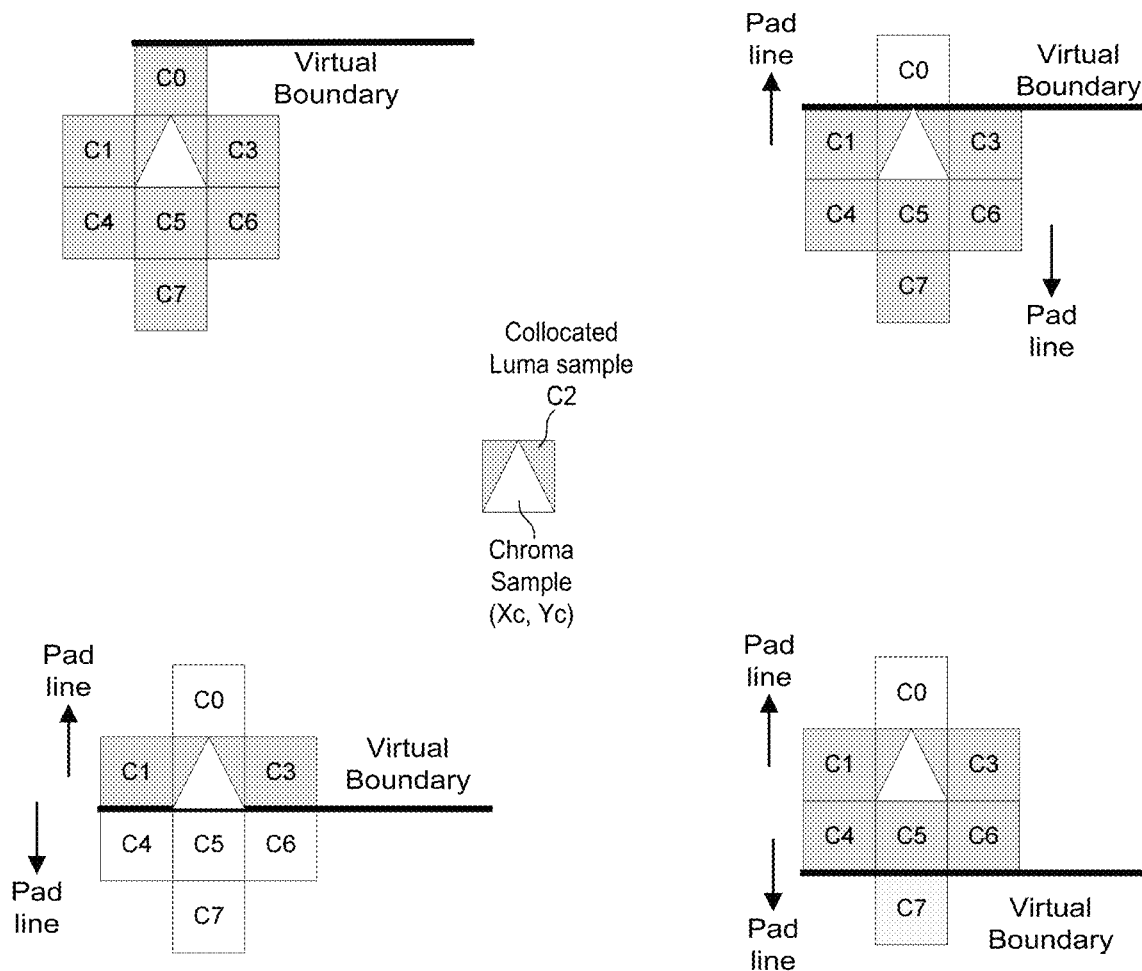
FIG. 31 shows an example of mirrored padding method 2.

Handling ALF Virtual Boundary for CC-ALF
1. For an unavailable luma sample to be padded at the ALF virtual boundary, mirrored padding may be utilized to derive the unavailable luma sample and one or multiple corresponding luma samples of the unavailable luma sample, for filtering in CC-ALF. That is, at least one corresponding luma sample of the unavailable sample needs to be padded as well even it is available.
   a. In one example, a luma sample that is determined as a corresponding sample of an unavailable luma sample may be padded using the mirrored padding method.
   b. In one example, whether a luma sample (in the corresponding filtering sample set) is determined as a corresponding sample of an unavailable sample may be dependent on the distance of the sample relative to a representative luma sample or/and the distance of the unavailable sample relative to the representative luma sample. Denote the center row wherein the representative luma sample is located by C. Suppose K×L filter shape which makes use of K rows of samples and L columns of samples is used in CC-ALF.

i. In one example, the representative luma sample is defined as the collocated luma sample of current chroma sample to be filtered.
   1) In one example, the position of the collocated luma sample of current chroma sample may depend on the color format.
      a) In one example, the collocated luma sample of a chroma sample located at (x, y) is defined as the one located at (2x, 2y) in 4:2:0 chroma format.
      b) In one example, the collocated luma sample of a chroma sample located at (x, y) is defined as the one located at (2x, y) in 4:2:2 chroma format.
      c) In one example, the collocated luma sample of a chroma sample located at (x, y) is defined as the one located at (x, y) in 4:4:4 chroma format.
ii. In one example, the distance may refer to the vertical distance between a row containing a luma sample and the row containing the representative luma sample. For example, the distance may be calculated as the absolute y-coordinate difference between a luma sample and the representative luma sample.
   1) As shown in FIG. 29, denote the center row wherein the representative luma sample is located, the row of an unavailable sample, and the row of the corresponding samples as C, M, and N respectively, and M is not equal to N. Deonte d(x, y) as the absolute y-coordinate difference between x and y, meaning that the distance between row x and row y.
iii. In one example, the determination of the corresponding samples to be padded in mirrored padding may be dependent on how many rows of samples would be utilized by the filter shape.
iv. In one example, if the unavailable sample is located at row M (e.g., M<C<N or M>C>N), then samples located at row N are determined as the corresponding samples to be padded, when d(C, M)=d(N, C).
   1) In one example, If the value K (e.g., K×L CC-ALF filter shape) is odd, the mirrored padding method for ALF (e.g., FIG. 16) may be utilized for CC-ALF wherein the center luma sample is selected as the representative luma sample.
      a) In one example, suppose K=5 and denote yM2=−2, yM1=−1, yL=0, yP1=1, yP2=2 as the y-coordinator of the five sample rows respectively, shown in Table 4-5. The ALF virtual boundary is equal to CtbSizeY −4.
         i. In one example, when the ALF virtual boundary is above the representative luma sample, the unavailable samples may be padded using the nearest row below the ALF virtual boundary. Meanwhile, the corresponding samples may be padded using the nearest row above the row where the corresponding samples are located at.
            1. In one example, when yL is equal to CtbSizeY −3 and the row yM2 is unavailable, the samples (x, yM2) at the row yM2 may be padded using samples (x, yM1) at the row yM1. Meanwhile, the samples (x, yP2) at the corresponding row yP2 may be padded using samples (x, yP1) at the row yP1.
            2. In one example, when yL is equal to CtbSizeY −4 and the rows yM2 and yM1 are unavailable, the samples (x, yM2) and (x, yM1) at the row yM2 and yM1 may be padded using samples (x, yL) at the row yL. Meanwhile, the samples (x, yP2) and (x, yP1) at the corresponding row yP2 and yP1 may be padded using samples (x, yL) at the row yL.
         ii. In one example, when the ALF virtual boundary is below the representative luma sample, the unavailable samples may be padded using the nearest row above the ALF virtual boundary. Meanwhile, the corresponding samples may be padded using the nearest row below the row where the corresponding samples are located at.
            1. In one example, when yL is equal to CtbSizeY −6 and the row yP2 is unavailable, the samples (x, yP2) at the row yP2 may be padded using samples (x, yP1) at the row yP1. Meanwhile, the samples (x, yM2) at the corresponding row yM2 may be padded using samples(x, yM1) ath the row yM1.
            2. In one example, when yL is equal to CtbSizeY −5 and the rows yP2 and yP1 are unavailable, the samples (x, yP2) and (x, yP1) at the row yP2 and yP1 may be padded using samples (x, yL) at the row yL. Meanwhile, the samples (x, yM2) and (x, yM1) at the corresponding row yM2 and yM1 may be padded using samples (x, yL) at the row yL.
   2) In one example, If the value K (e.g., K×L CC-ALF filter shape) is even, the mirrored padding method defined in FIG. 30 may be utilized. When the unavailable samples located at row M (N) above (below) the ALF virtual boundary and they are padded from the nearest sample row below (above) the ALF virtual boundary. It is proposed that the corresponding samples located at row N (M) below (above) the ALF virtual boundary may be padded from the nearest sample row above (below) row N (M).
      a) In one example, suppose K=2 and denote yL=0 and yP1=1 as the y-coordinator of the two sample rows, shown in Table 4-1. The ALF virtual boundary is equal to CtbSizeY −4.
         i. In one example, when the ALF virtual boundary is above the representative luma sample, the unavailable samples may be padded using the nearest row below the ALF virtual boundary. Meanwhile, the corresponding samples may be padded using the nearest row above the row where the corresponding samples are located at.
            1. In one example, when yL is equal to CtbSizeY −4 and the row above yL is unavailable, the samples (x, yP1) at the corresponding row yP1 may be padded using samples (x, yL) at the row yL.
         ii. In one example, when the ALF virtual boundary is below the representative luma sample, the unavailable samples may be padded using the nearest row above the ALF virtual boundary. Meanwhile, the corresponding samples may be padded using the nearest row below the row where the corresponding samples are located at.
            1. In one example, when yL is equal to CtbSizeY −5 and the row yP1 is unavailable, the samples (x, yP1) at the row yP1 may be padded using samples (x, yL) at the row yL.
      b) In one example, suppose K=4 and denote yM1=−1, yL=0, yP1=1, yP2=2 as the y-coordinator of the four sample rows respectively, shown in Table 4-3. The ALF virtual boundary is equal to CtbSizeY −4.
  i. In one example, when the ALF virtual boundary is above the representative luma sample, the unavailable samples may be padded using the nearest row below the ALF virtual boundary. Meanwhile, the corresponding samples may be padded using the nearest row above the row where the corresponding samples are located at.
    1. In one example, when yL is equal to Ctb-SizeY −3 and the row above yM1 is unavailable, the samples (x, yP2) at the corresponding row yP2 may be padded using samples (x, yP1) at the row yP1.
    2. In one example, when yL is equal to Ctb-SizeY −4 and the row above yM1 and yM1 are unavailable, the samples (x, yM1) at the row yM1 may be padded using samples (x, yL) at the row yL. Meanwhile, the samples (x, yP2) and (x, yP1) at the corresponding row yP2 and yP1 may be padded using samples (x, yL) at the row yL.
  ii. In one example, when the ALF virtual boundary is below the representative luma sample, the unavailable samples may be padded using the nearest row above the ALF virtual boundary. Meanwhile, the corresponding samples may be padded using the nearest row below the row where the corresponding samples are located at.
    1. In one example, when yL is equal to Ctb-SizeY −6 and the row yP2 is unavailable, the samples (x, yP2) at the row yP2 may be padded using samples (x, yP1) at the row yP1.
    2. In one example, when yL is equal to Ctb-SizeY −5 and the rows yP2 and yP1 are unavailable, the samples (x, yP2) and (x, yP1) at the row yP2 and yP1 may be padded using samples (x, yL) at the row yL. Meanwhile, the samples (x, yM1) at the corresponding row yM1 may be padded using samples (x, yL) at the row yL.
c) In one example, suppose K=6 and denote yM2=−2, yM1=−1, yL=0, yP1=1, yP2=2, yP3=3 as the y-coordinator of the six sample rows respectively, shown in Table 4-6. The ALF virtual boundary is equal to CtbSizeY −4.
  i. In one example, when the ALF virtual boundary is above the representative luma sample, the unavailable samples may be padded using the nearest row below the ALF virtual boundary. Meanwhile, the corresponding samples may be padded using the nearest row above the row where the corresponding samples are located at.
    1. In one example, when yL is equal to Ctb-SizeY −2 and the row above yM2 is unavailable, the samples (x, yP3) at the corresponding row yP3 may be padded using samples (x, yP2) at the row yP2.
    2. In one example, when yL is equal to Ctb-SizeY −3 and the row above yM2 and yM2 are unavailable, the samples (x, yM2) at the row yM2 may be padded using samples (x, yM1) at the row yM1. Meanwhile, the samples (x, yP3) and (x, yP2) at the corresponding row yP3 and yP2 may be padded using samples (x, yP1) at the row yP1.
    3. In one example, when yL is equal to Ctb-SizeY −4 and the row above yM2, yM2, and yM1 are unavailable, the samples (x, yM2) and (x, yM1) at the row yM2 and yM1 may be padded using samples (x, yL) at the row yL. Meanwhile, the samples (x, yP3), (x, yP2) and (x, yP1) at the corresponding row yP3, yP2 and yP1 may be padded using samples (x, yL) at the row yL.
  ii. In one example, when the ALF virtual boundary is below the representative luma sample, the unavailable samples may be padded using the nearest row above the ALF virtual boundary. Meanwhile, the corresponding samples may be padded using the nearest row below the row where the corresponding samples are located at.
    1. In one example, when yL is equal to Ctb-SizeY −7 and the row yP3 is unavailable, the samples (x, yP3) at the row yP3 may be padded using samples (x, yP2) at the row yP2.
    2. In one example, when yL is equal to Ctb-SizeY −6 and the rows yP3 and yP2 are unavailable, the samples (x, yP3) and (x, yP2) at the row yP3 and yP2 may be padded using samples (x, yP1) at the row. Meanwhile, the samples (x, yM2) at the corresponding row yM2 may be padded using samples (x, yM1) at the row yM1.
    3. In one example, when yL is equal to Ctb-SizeY −5 and the rows yP3, yP2 and yP1 are unavailable, the samples (x, yP3), (x, yP2) and (x, yP1) at the row yP3, yP2 and yP1 may be padded using samples(x, yL) at the row yL. Meanwhile, the samples (x, yM2) and (x, yM1) at the corresponding row yM2 and yM1 may be padded using samples(x, yL) at the row.
v. In one example, if the unavailable sample is located at row M (e.g., M<C), then samples located at row N are determined as the corresponding samples to be padded, when d(C, M)=d(N, C) −offset (wherein offset is an integer value, e.g., equal to 1) or d(C, M)<d(N, C).
  1) In one example, if the unavailable sample is located at row M (e.g., M>C), then samples located at row N are treated as the corresponding samples to be padded, when d(M, C)=d(C, N) −offset (wherein offset is an integer value, e.g., equal to 1) or d(C, M)<d(N, C).
  2) In one example, the mirrored padding method defined in FIG. 31 may be utilized. When the unavailable samples located at row M (N) above (below) the ALF virtual boundary and they are padded from the nearest sample row below (above) the ALF virtual boundary. It is proposed that the corresponding samples located row N (M) below (above) the ALF virtual boundary may be padded from the nearest sample row above (below) row N (M).
    a) In one example, suppose K=2 and denote yL=0 and yP1=1 as the y-coordinator of the two sample rows, shown in Table 4-2. The ALF virtual boundary is equal to CtbSizeY −4.
      i. In one example, when the ALF virtual boundary is below the representative luma sample, the unavailable samples may be padded using the nearest row above the ALF virtual boundary. Meanwhile, the corresponding samples may be padded using the nearest row below the row where the corresponding samples are located at.

1. In one example, when yL is equal to CtbSizeY −5 and the row yP1 is unavailable, the samples (x, yP1) at the row yP1 may be padded using samples (x, yL) at the row yL.

b) In one example, suppose K=4 and denote yM1=−1, yL=0, yP1=1, yP2=2 as the y-coordinator of the four sample rows respectively, shown in Table 4-4. The ALF virtual boundary is equal to CtbSizeY −4.

i. In one example, when the ALF virtual boundary is above the representative luma sample, the unavailable samples may be padded using the nearest row below the ALF virtual boundary. Meanwhile, the corresponding samples may be padded using the nearest row above the row where the corresponding samples are located at.

1. In one example, when yL is equal to CtbSizeY −4 and the row above yM1 and yM1 are unavailable, the samples (x, yM1) at the row yM1 may be padded using samples (x, yL) at the row yL. Meanwhile, the samples (x, yP2) at the corresponding row yP2 may be padded using samples (x, yP1) at the row yP1.

ii. In one example, when the ALF virtual boundary is below the representative luma sample, the unavailable samples may be padded using the nearest row above the ALF virtual boundary. Meanwhile, the corresponding samples may be padded using the nearest row below the row where the corresponding samples are located at.

1. In one example, when yL is equal to CtbSizeY −6 and the row yP2 is unavailable, the samples (x, yP2) at the row yP2 may be padded using samples (x, yP1) at the row yP1.

2. In one example, when yL is equal to CtbSizeY −5 and the rows yP2 and yP1 are unavailable, the samples (x, yP2) and (x, yP1) at the row yP2 and yP1 may be padded using samples (x, yL) at the row yL. Meanwhile, the samples (x, yM1) at the corresponding row yM1 may be padded using samples (x, yL) at the row yL.

c) In one example, suppose K=6 and denote yM2=−2, yM1=−1, yL=0, yP1=1, yP2=2, yP3=3 as the y-coordinator of the six sample rows respectively, shown in Table 4-7. The ALF virtual boundary is equal to CtbSizeY −4.

i. In one example, when the ALF virtual boundary is above the representative luma sample, the unavailable samples may be padded using the nearest row below the ALF virtual boundary. Meanwhile, the corresponding samples may be padded using the nearest row above the row where the corresponding samples are located at.

1. In one example, when yL is equal to CtbSizeY −3 and the row above yM2 and yM2 are unavailable, the samples (x, yM2) at the row yM2 may be padded using samples (x, yM1) at the row yM1. Meanwhile, the samples (x, yP3) at the corresponding row yP3 may be padded using samples (x, yP2) at the row yP2.

2. In one example, when yL is equal to CtbSizeY −4 and the row above yM2, yM2, and yM1 are unavailable, the samples (x, yM2) and (x, yM1) at the row yM2 and yM1 may be padded using samples (x, yL) at the row yL. Meanwhile, the samples (x, yP3) and (x, yP2) at the corresponding row yP3 and yP2 may be padded using samples (x, yP1) at the row yP1.

ii. In one example, when the ALF virtual boundary is below the representative luma sample, the unavailable samples may be padded using the nearest row above the ALF virtual boundary. Meanwhile, the corresponding samples may be padded using the nearest row below the row where the corresponding samples are located at.

1. In one example, when yL is equal to CtbSizeY −7 and the row yP3 is unavailable, the samples (x, yP3) at the row yP3 may be padded using samples (x, yP2) at the row yP2. Meanwhile, the samples (x, yM2) at the corresponding row yM2 may be padded using samples (x, yM1) at the row yM1.

2. In one example, when yL is equal to CtbSizeY −6 and the rows yP3 and yP2 are unavailable, the samples (x, yP3) and (x, yP2) at the row yP3 and yP2 may be padded using samples (x, yP1) at the row yP1. Meanwhile, the samples (x, yM2) and (x, yM1) at the corresponding row yM2 and yM1 may be padded using samples (x, yL) at the row yL.

3. In one example, when yL is equal to CtbSizeY −5 and the rows yP3, yP2 and yP1 are unavailable, the samples (x, yP3), (x, yP2) and (x, yP1) at the row yP3, yP2 and yP1 may be padded using samples (x, yL) at the yL. Meanwhile, the samples (x, yM2) and (x, yM1) at the corresponding row yM2 and yM1 may be padded using samples (x, yL) at the yL.

c. FIG. 29 depicts an example of the location of an unavailable sample (above the ALF virtual boundary, denoted by C0) and its corresponding sample (denoted by C7) when filtering current chroma sample located at ($X_c$, $Y_c$).

d. In one example, whether to enable or disable mirrored padding at ALF virtual boundary for CC-ALF/chroma ALF/luma ALF/other kinds of filtering methods may be signalled at sequence level/picture level/slice level/tile group level, such as in sequence header/picture header/SPSNPS/DPS/PPS/APS/slice header/tile group header.

e. In one example, whether to enable or disable repetitive padding and/or mirrored padding at ALF virtual boundary may be dependent on coded information.

i. In one example, the coded information may refer to block size, such as CTU/CTB size.

1) In one example, mirrored padding may be utilized at ALF virtual boundary when the CTU/CTB size is larger than or equal to T, such as T=32/64/128.

2) In one example, repetitive padding may be utilized at ALF virtual boundary when the CTU/CTB size is smaller than or equal to T, such as T=4/8/16.

2. In above bullet, the vertical padding may be replaced by horizontal padding.

a. Alternatively, furthermore, which padding direction (vertical or horizontal) to be used may depend on whether the boundary is a horizontal boundary or vertical boundary.

b. Alternatively, furthermore, the vertical distance may be replaced by the horizontal distance.

3. The mirrored padding method in Bullet 1 may be utilized for picture/subpicture/slice/tile boundary and/or 360-degree boundary.

In Terms of how ALF Boundary Locations are Defined
4. A first "luma ALF boundary" may be derived for the luma component and a second "luma ALF boundary" may be derived for a chroma component and then mapped to a "chroma ALF boundary", wherein the first "luma ALF boundary" may be different from the second "luma ALF boundary".
   a. In one example, the first "luma ALF boundary" may be derived and used for luma ALF or/and CC-ALF.
      i. In one example, during the derivation of the first "luma ALF boundary", CC-ALF may be treated as luma ALF.
   b. In one example, the second "luma ALF boundary" may be derived and used for chroma ALF.
   c. In one example, the second "luma ALF boundary" may depend on the color format or/and the filtering methods.
      i. For example, the second "luma ALF boundary" may be derived differently in chroma ALF for 4:2:0 color format and chroma ALF for 4:2:2/4:4:4 color format.
      ii. For example, the second "luma ALF boundary" in chroma ALF for 4:2:0 color format may be derived same as the first "luma ALF boundary".
      iii. For example, during the derivation of the second "luma ALF boundary", chroma ALF for 4:2:0 color format may be treated as luma ALF.
      iv. For example, during the derivation of the second "luma ALF boundary", chroma ALF for 4:2:0 color format may be treated as CC-ALF.
      v. For example, the second "luma ALF boundary" in chroma ALF for 4:2:2/4:4:4 color format may be derived differently from the first "luma ALF boundary" in luma ALF.
      vi. For example, the second "luma ALF boundary" in chroma ALF for 4:2:2/4:4:4 color format may be derived differently from the first "luma ALF boundary" in CC-ALF.
   d. The "luma ALF boundary" location may refer to top boundary location (position), or/and bottom boundary location, or/and left boundary location, or/and right boundary location.
   e. In one example, the derivation of "luma ALF boundary" location may be dependent on a variable vbOffset specifying the offset for ALF virtual boundary (or the distance between ALF virtual boundary and the bottom boundary of current CTU), or/and a variable M specifying the offset from the top boundary of current CTU. Denote the luma location of current sample relative to the top-left sample of current luma CTB as $(x, y)$. the luma location of the top-left sample of the current luma CTB relative to the top left sample of the current picture as $(xCtb, yCtb)$, the size of current luma CTB as CtbSizeY.
      i. In one example, when $y-(CtbSizeY-vbOffset)$ is greater than or equal to 0, the top boundary position may be set equal to $yCtb+CtbSizeY-vbOffset$.
      ii. In one example, if the top boundary of the current CTB is the top boundary of tile/slice/subpicture and loop filter across tile/slice/subpicture is disabled, when y is less than M, the top boundary position may be set equal to yCtb.
      iii. In one example, when $CtbSizeY-vbOffset-y$ is greater than 0 and is less than N, the bottom boundary position may be set equal to $yCtb+CtbSizeY-vbOffset$.
      iv. In one example, if the bottom boundary of the current CTB is the bottom boundary of tile/slice/subpicture and loop filter across tile/slice/subpicture is disabled, when $CtbSizeY-y$ is less than L, the bottom boundary position may be set equal to $yCtb+CtbSizeY$.
   f In one example, the first "ALF luma boundary" in CC-ALF is derived same as the first "ALF luma boundary" in luma ALF.
      i. In one example, during the derivation of top boundary position or/and bottom boundary position, the same value of vbOffset may be used for CC-ALF and luma ALF.
      ii. In one example, during the derivation of top boundary position or/and bottom boundary position, the same value of M, N, L may be used for CC-ALF and luma ALF.
   g. In one example, the second "ALF luma boundary" used in chroma ALF with 4:2:0 format is derived same as the first "ALF luma boundary".
      i. In one example, when chroma format is 4:2:0, during the derivation of top boundary position or/and bottom boundary position, the same value of vbOffset may be used for chroma ALF and luma ALF.
         1) In one example, vbOffset is an integer, such as 4.
      ii. In one example, when chroma format is 4:2:0, during the derivation of top boundary position or/and bottom boundary position, the same value of M, N, L may be used for chroma ALF and luma ALF.
         1) In one example, M, N, L are integer, such as M=3, N=5, L=5.
   h. In one example, the second "ALF luma boundary" used in chroma ALF with 4:2:2/4:4:4 chroma format is derived differently from the first "ALF luma boundary".
      i. In one example, when chroma format is 4:2:2/4:4:4, during the derivation of top boundary position or/and bottom boundary position, different values of vbOffset may be used for chroma ALF and luma ALF.
         1) In one example, vbOffset1 is used for chroma ALF andvbOffset2 is used for luma ALF. vbOffset1 may be not equal to vbOffset2, such as vbOffset1=2 and vbOffset2=4.
      ii. In one example, when chroma format is 4:2:2/4:4:4, during the derivation of top boundary position or/and bottom boundary position, different values of vbOffset may be used for chroma ALF and chroma ALF with 4:2:0 chroma format.
      iii. In one example, when chroma format is 4:2:2/4:4:4, during the derivation of top boundary position or/and bottom boundary position, different values of M, N, L may be used for chroma ALF and luma ALF.
         1) In one example, M1, N1, L1 are used for chroma ALF with 4:2:2/4:4:4 chroma format, and M2, N2, L2 are used for luma ALF, where M1 may be not equal to M2, N1 may be not equal to N2, L1 may be not equal to L2.
            a) In one example, M1=2, N1=3, L1=3, and M2=3, N2=5, L2=5.
      iv. In one example, when chroma format is 4:2:2/4:4:4, during the derivation of top boundary position or/and bottom boundary position, different values of M, N, L may be used for chroma ALF and chroma ALF with 4:2:0 chroma format.
   i. In one example, the second "ALF luma boundary" used in chroma ALF with 4:2:2/4:4:4 chroma format is derived differently from the first "ALF luma boundary" used in CC-ALF.

i. In one example, when chroma format is 4:2:2/4:4:4, during the derivation of top boundary position or/and bottom boundary position, different values of vbOffset may be used for chroma ALF and CC-ALF.
  1) In one example, vbOffset3i is used for chroma ALF andvbOffset2 is used for CC-ALF. vbOffset1 may be not equal to vbOffset2, such as vbOffset1=2 and vbOffset2=4.
ii. In one example, when chroma format is 4:2:2/4:4:4, during the derivation of top boundary position or/and bottom boundary position, different values of M, N, L may be used for chroma ALF and CC-ALF.
  1) In one example, M1, N1, L1 are used for chroma ALF with 4:2:2/4:4:4 chroma format, and M2, N2, L2 are used for CC-ALF, where M1 may be not equal to M2, N1 may be not equal to N2, L1 may be not equal to L2.
    a) In one example, M1=2, N1=3, L1=3, and M2=3, N2=5, L2=5.
j. The above proposed methods may be applied to 360 boundaries.

General Concepts

5. Whether to and/or how to apply the disclosed methods above may be signalled at sequence level/picture level/slice level/tile group level, such as in sequence header/picture header/SPSNPS/DPS/PPS/APS/slice header/tile group header.

6. Whether to and/or how to apply the disclosed methods above may be dependent on coded information, such as color format, single/dual tree partitioning, the position of a sample (e.g., relative to a CU/CTU).

TABLE 4-1

Specification of yP1 according to the vertical luma sample position yL and applyAlfLineBufBoundary

| Condition | yP1 |
|---|---|
| ( yL = = CtbSizeY − 4 ) && ( applyAlfLineBufBoundary = = 1 ) | 0 |
| ( yL = = CtbSizeY − 5 ) && ( applyAlfLineBufBoundary = = 1 ) | 0 |
| Otherwise | 1 |

TABLE 4-2

Specification of yP1 according to the vertical luma sample position yL and applyAlfLineBufBoundary

| Condition | yP1 |
|---|---|
| ( yL = = CtbSizeY − 4 ) && ( applyAlfLineBufBoundary = = 1 ) | 1 |
| ( yL = = CtbSizeY − 5 ) && ( applyAlfLineBufBoundary = = 1 ) | 0 |
| Otherwise | 1 |

TABLE 4-3

Specification of yM1, yP1 and yP2 according to the vertical luma sample position yL and applyAlfLineBufBoundary

| Condition | yM1 | yP1 | yP2 |
|---|---|---|---|
| ( yL = = CtbSizeY − 3 ) && ( applyAlfLineBufBoundary = = 1 ) | −1 | 1 | 1 |
| ( yL = = CtbSizeY − 4 ) && ( applyAlfLineBufBoundary = = 1 ) | 0 | 0 | 0 |
| ( yL = = CtbSizeY − 5 ) && ( applyAlfLineBufBoundary = = 1 ) | 0 | 0 | 0 |
| ( yL = = CtbSizeY − 6 ) && ( applyAlfLineBufBoundary = = 1 ) | −1 | 1 | 1 |
| Otherwise | −1 | 1 | 2 |

TABLE 4-4

Specification of yM1, yP1 and yP2 according to the vertical luma sample position yL and applyAlfLineBufBoundary

| Condition | yM1 | yP1 | yP2 |
|---|---|---|---|
| ( yL = = CtbSizeY − 4 ) && ( applyAlfLineBufBoundary = = 1 ) | 0 | 1 | 1 |
| ( yL = = CtbSizeY − 5 ) && ( applyAlfLineBufBoundary = = 1 ) | 0 | 0 | 0 |
| ( yL = = CtbSizeY − 6 ) && ( applyAlfLineBufBoundary = = 1 ) | 0 | 1 | 1 |
| Otherwise | −1 | 1 | 2 |

TABLE 4-5

Specification of yM2, yM1, yP1 and yP2 according to the vertical luma sample position yL and applyAlfLineBufBoundary

| Condition | yM2 | yM1 | yP1 | yP2 |
|---|---|---|---|---|
| ( yL = = CtbSizeY − 3 ) && ( applyAlfLineBufBoundary = = 1 ) | −1 | −1 | 1 | 1 |
| ( yL = = CtbSizeY − 4 ) && ( applyAlfLineBufBoundary = = 1 ) | 0 | 0 | 0 | 0 |
| ( yL = = CtbSizeY − 5 ) && ( applyAlfLineBufBoundary = = 1 ) | 0 | 0 | 0 | 0 |
| ( yL = = CtbSizeY − 6 ) && ( applyAlfLineBufBoundary = = 1 ) | −1 | −1 | 1 | 1 |
| Otherwise | −2 | −1 | 1 | 2 |

TABLE 4-6

Specification of yM2, yM1, yP1, yP2, and yP3 according to the vertical luma sample position yL and applyAlfLineBufBoundary

| Condition | yM2 | yM1 | yP1 | yP2 | yP3 |
|---|---|---|---|---|---|
| ( yL = = CtbSizeY − 2 ) && ( applyAlfLineBufBoundary = = 1 ) | −2 | −1 | 1 | 2 | 2 |
| ( yL = = CtbSizeY − 3 ) && ( applyAlfLineBufBoundary = = 1 ) | −1 | −1 | 1 | 1 | 1 |
| ( yL = = CtbSizeY − 4 ) && ( applyAlfLineBufBoundary = = 1 ) | 0 | 0 | 0 | 0 | 0 |
| ( yL = = CtbSizeY − 5 ) && ( applyAlfLineBufBoundary = = 1 ) | 0 | 0 | 0 | 0 | 0 |
| ( yL = = CtbSizeY − 6 ) && ( applyAlfLineBufBoundary = = 1 ) | −1 | −1 | 1 | 1 | 1 |
| ( yL = = CtbSizeY − 7 ) && ( applyAlfLineBufBoundary = = 1 ) | −2 | −1 | 1 | 2 | 2 |
| Otherwise | −2 | −1 | 1 | 2 | 3 |

TABLE 4-7

Specification of yM2, yM1, yP1, yP2, and yP3 according to the vertical luma sample position yL and applyAlfLineBufBoundary

| Condition | yM2 | yM1 | yP1 | yP2 | yP3 |
|---|---|---|---|---|---|
| ( yL = = CtbSizeY − 3 ) && ( applyAlfLineBufBoundary = = 1 ) | −1 | −1 | 1 | 2 | 2 |
| ( yL = = CtbSizeY − 4 ) && ( applyAlfLineBufBoundary = = 1 ) | 0 | 0 | 1 | 1 | 1 |
| ( yL = = CtbSizeY − 5 ) && ( applyAlfLineBufBoundary = = 1 ) | 0 | 0 | 0 | 0 | 0 |
| ( yL = = CtbSizeY − 6 ) && ( applyAlfLineBufBoundary = = 1 ) | 0 | 0 | 1 | 1 | 1 |
| ( yL = = CtbSizeY − 7 ) && ( applyAlfLineBufBoundary = = 1 ) | −1 | −1 | 1 | 2 | 2 |
| Otherwise | −2 | −1 | 1 | 2 | 3 |

5. Embodiments

The changes are highlighted by showing deletion and additions.

5.1. Embodiment #1

The working draft specified in JVET-P0080 may be changed as below.
x.x.x.x Cross component filtering process for block of chroma samples
Inputs of this Process are:
- a reconstructed luma picture sample array recPicture$_L$ prior to the luma adaptive loop filtering process,
- a filtered reconstructed chroma picture sample array alfPicturec,
- a chroma location (xC, yC) specifying the top left sample of the current block of chroma samples relative to the top left sample of the current picture,
- a width ccAlfWidth of block of chroma samples
- a height ccAlfHeight of block of chroma samples
- cross component filter coefficients CcAlfCoeff[j], with j=0..13

Output of this process is the modified filtered reconstructed chroma picture sample array ccAlfPicture.
The coding tree block luma location (xCtb, yCtb) is derived as follows:

$$xCtb=(((xC*SubWidthC)>>Ctb\ Log2SizeY)<<Ctb\ Log2SizeY) \quad (8\text{-}1229)$$

$$yCtb=(((yC*SubHeightC)>>Ctb\ Log2SizeY)<<Ctb\ Log2SizeY) \quad (8\text{-}1229)$$

For the derivation of the filtered reconstructed chroma samples ccAlfPicture[xC+x] [yC+y], each reconstructed chroma sample inside the current chroma block of samples alfPicturec[xC+x] [yC+y] with x=0..ccAlfWidth−1, y=0..ccAlfHeight−1, is filtered as follows:
- The luma location (xL, yL) corresponding to the current chroma sample at chroma location (xC+x, yC+y) is set equal to ((xC+x)*SubWidthC, (yC+y)*SubHeightC)
- The luma locations ($h_{xL+i}$, $v_{yL+j}$) with i=−2..2, j=−2..3 inside the array recPicture$_L$ are derived as follows:
  - If pps_loop_filter_across_virtual_boundaries_disabled_flag is equal to 1, and PpsVirtualBoundariesPosX[n] % CtbSizeY is not equal to 0, and xL−PpsVirtualBoundariesPosX[n] is greater than or equal to 0 and less than 3 for any n=0..pps_num_ver_virtual_boundaries−1, the following applies:
    $h_{xL+i}$=Clip3(PpsVirtualBoundariesPosX[n], pic_width_in_luma_samples−1, xL+i) (8-1229)
  - Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0..pps_num_ver_virtual_boundaries−1, the following applies:
    $h_{x+i}$=Clip3(0, PpsVirtualBoundariesPosX[n]−1, xL+i) (8-1230)
  - Otherwise, the following applies:
    $h_{x+i}$=Clip3(0, pic_width_in_luma_samples−1, xL+i) (8-1231)
- If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0..pps_num_hor_virtual_boundaries−1, the following applies:
  $v_{y+j}$=Clip3(PpsVirtualBoundariesPosY[n], pic_height_in_luma_samples−1, yL+j) (8-1232)
- Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0..pps_num_hor_virtual_boundaries−1, the following applies:
  $v_{y+j}$=Clip3(0, PpsVirtualBoundariesPosY[n]−1, yL+j) (8-1233)
- Otherwise, the following applies:
  $v_{y+j}$=Clip3(0, pic_height_in_luma_samples−1, yL+j) (8-1234)

The variables clipLeftPos, clipRightPos, clipTopPos and clipBottomPos are derived by invoking the ALF boundary position derivation process as specified in clause 8.8.5.5 with (xCtb, yCtb) and (xL−xCtb, yL−yCtb) as inputs.

The vertical sample position offsets yM2, yM1, yP1, yP2 and yP3 are specified in Table 4-1. Specification of yP1 according to the vertical luma sample position yL and applyAlfLineBufBoundary

| Condition | yP1 |
|---|---|
| ( yL = = CtbSizeY − 4 ) && ( applyAlfLineBufBoundary = = 1 ) | 0 |
| ( yL = = CtbSizeY − 5 ) && ( applyAlfLineBufBoundary = = 1 ) | 0 |
| Otherwise | 1 |

TABLE 4-2

Specification of yP1 according to the vertical luma sample position yL and applyAlfLineBufBoundary

| Condition | yP1 |
|---|---|
| ( yL = = CtbSizeY − 4 ) && ( applyAlfLineBufBoundary = = 1 ) | 1 |
| ( yL = = CtbSizeY − 5 ) && ( applyAlfLineBufBoundary = = 1 ) | 0 |
| Otherwise | 1 | according to the vertical luma sample position yL, clipLeftPos and clipRightPos.

The horizontal sample position offsets xM1, xM2, xP1 and xP2 are specified in Table y yyyy$_o$ yy according to the horizontal luma sample position xL, clipLeftPos and clipRightPos.

The variable curr is derived as follows:

$$curr=alfPicture_C[xC+x, yC+y] \quad (8\text{-}1286)$$

The array of cross component filter coefficients f[j] is derived as follows with j=0..13:

$$f[j]=CcAlfCoeff[j] \quad (8\text{-}1287)$$

The variable sum is derived as follows:
sum=f[0] *recPicture$_L$[h$_x$, v$_{y+y\_M2}$]+
   f[1] *recPicture$_L$[h$_{x+xm1}$, v$_{y+yM1}$]+
   f[2] *recPicture$_L$[h$_x$, v$_{y+y\_M1}$]+
   f[3] *recPicture$_L$[h$_{x+xp1}$, v$_{y+y\_M1}$]+
   f[4] *recPicture$_L$[h$_{x+xM2}$, v$_y$]+
   f[5] *recPicture$_L$[h$_{x+xm1}$, v$_y$]+
   f[6] *recPicture$_L$[h$_x$, v$_y$]+
   f[7] *recPicture$_L$[h$_{x+xp1}$, v$_y$]+
   f[4] *recPicture$_L$[h$_{x+xP2}$, v$_y$]+(8-1289)
   f[4] *recPicture$_L$[h$_{x+xM2}$, v$_{y+y1}$]+
   f[8] *recPicture$_L$[h$_{x+xm1}$, v$_{y+y1}$]+
   f[9] *recPicture$_L$[h$_x$, v$_{y+yr1}$]+
   f[10] *recPicture$_L$[h$_{x+xp1}$, v$_{y+yP1}$]+
   f[4] *recPicture$_L$[h$_{x+xP2}$, v$_{y+yP1}$]+
   f[11] *recPicture$_L$[h$_{x+xM1}$, v$_{y+yP2}$]+
   f[12] *recPicture$_L$[h$_x$, v$_{y+yP2}$]+
   f[13] *recPicture$_L$[h$_{x+xp1}$, v$_{y+yP2}$]+
   f[0] *recPicture$_L$[h$_x$, v$_{y-+yP3}$]+
sum=curr+(sum+64)>>7) (8-1290)

The modified filtered reconstructed chroma picture sample array ccAlfPicture[xC+x][yC+y] is derived as follows:

$$ccAlfPicture[xC+x][yC+y]=Clip3(0,(1<<BitDepth_C)-1,sum) \quad (8\text{-}1291)$$

TABLE x-xx

Specification of yM1, yM2, yP1, yP2 and yP3 according to the vertical luma sample position yL, clipTopPos and clipBottomPos Delete the following table:

| Condition | yM2 | yM1 | yP1 | yP2 | yP3 |
|---|---|---|---|---|---|
| yL = = clipTopPos + 1 | −1 | −1 | 1 | 2 | 3 |
| yL = = clipTopPos | 0 | 0 | 1 | 2 | 3 |
| yL = = clipBottomPos − 1 | −2 | −1 | 0 | 0 | 0 |
| yL = = clipBottomPos − 2 | −2 | −1 | 1 | 1 | 1 |
| yL = = clipBottomPos − 3 | −2 | −1 | 1 | 2 | 2 |
| Otherwise | −2 | −1 | 1 | 2 | 3 |

Add the following table instead of the above table:

| Condition | yM2 | yM1 | yP1 | yP2 | yP3 |
|---|---|---|---|---|---|
| yL = = clip TopPos + 1 | −1 | −1 | 1 | 2 | 2 |
| yL = = clip TopPos | 0 | 0 | 1 | 1 | 1 |
| yL = = clipBottomPos − 1 | 0 | 0 | 0 | 0 | 0 |
| yL = = clipBottomPos − 2 | 0 | 0 | 1 | 1 | 1 |
| yL = = clipBottomPos − 3 | −1 | −1 | 1 | 2 | 2 |
| Otherwise | −2 | −1 | 1 | 2 | 3 |

TABLE y-yy

Specification of xM1, xM2, xP1, and xP2 according to the horizontal luma sample position xL, clipLeftPos and clipRightPos

| Condition | xM2 | xM1 | xP1 | xP2 |
|---|---|---|---|---|
| xL = = clipLeftPos + 1 | −1 | −1 | 1 | 2 |
| xL = = clipLeftPos | 0 | 0 | 1 | 2 |
| xL = = clipRightPos − 1 | −2 | −1 | 0 | 0 |
| xL = = clipRightPos − 2 | −2 | −1 | 1 | 1 |
| Otherwise | −2 | −1 | 1 | 2 |

5.2. Embodiment #2

The working draft specified in JVET-P0080 may be changed as below.

x.x.x.x Cross component filtering process for block of chroma samples

Inputs of this process are:
   a reconstructed luma picture sample array recPicture$_L$ prior to the luma adaptive loop filtering process,
   a filtered reconstructed chroma picture sample array alfPicture$_C$,
   a chroma location (xC, yC) specifying the top left sample of the current block of chroma samples relative to the top left sample of the current picture,
   a width ccAlfWidth of block of chroma samples
   a height ccAlfHeight of block of chroma samples
   cross component filter coefficients CcAlfCoeff[j], with j=0..13

Output of this process is the modified filtered reconstructed chroma picture sample array ccAlfPicture.

The coding tree block luma location (xCtb, yCtb) is derived as follows:

$$xCtb=(((xC*SubWidthC)>>Ctb\ Log2SizeY)<<Ctb\ Log2SizeY) \quad (8\text{-}1229)$$

$$yCtb=(((yC*SubHeightC)>>Ctb\ Log2SizeY)<<Ctb\ Log2SizeY) \quad (8\text{-}1229)$$

For the derivation of the filtered reconstructed chroma samples ccAlfPicture[xC+x] [yC+y], each reconstructed chroma sample inside the current chroma block of samples alfPicture$_C$[xC+x][yC+y] with x=0..ccAlfWidth−1, y=0..ccAlfHeight−1, is filtered as follows:

The luma location (xL, yL) corresponding to the current chroma sample at chroma location (xC+x, yC+y) is set equal to ((xC+x)*SubWidthC, (yC+y)*SubHeightC)

The luma locations (h$_{xL+i}$, v$_{yL+j}$) with i=−2..2, j=−2..3 inside the array recPicture$_L$ are derived as follows:

If pps_loop_filter_across_virtual_boundaries_disabled flag is equal to 1, and PpsVirtualBoundariesPosX[n] % CtbSizeY is not equal to 0, and xL−PpsVirtualBoundariesPosX[n] is greater than or equal to 0 and less than 3 for any n=0..pps_num_ver_virtual_boundaries−1, the following applies:

$$h_{xL+i}=Clip3(PpsVirtualBoundariesPosX[n], pic\_width\_in\_luma\_samples-1, xL+i) \quad (8\text{-}1229)$$

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0..pps_num_ver_virtual_boundaries−1, the following applies:

$$h_{x+i}=Clip3(0, PpsVirtualBoundariesPosX[n]-1, xL+i) \quad (8\text{-}1230)$$

Otherwise, the following applies:

$h_{x+i}$=Clip3(0, pic_width_in_luma_samples−1, xL+i) (8-1231)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0..pps_num_hor_virtual_boundaries−1, the following applies:

$v_{y+j}$=Clip3(PpsVirtualBoundariesPosY[n], pic_height_in_luma_samples−1, yL+j) (8-1232)

Otherwise, if pps_loop_filter_across_virtual_boundaries_disabled flag is equal to 1, and PpsVirtualBoundariesPosY[n] % CtbSizeY is not equal to 0, and PpsVirtualBoundariesPosY[n]−yL is greater than 0 and less than 4 for any n=0..pps_num_hor_virtual_boundaries−1, the following applies:

$v_{y+j}$=Clip3(0, PpsVirtualBoundariesPosY[n]−1, yL+j) (8-1233)

Otherwise, the following applies:

$v_{y+j}$=Clip3(0, pic_height_in_luma_samples−1, yL+j) (8-1234)

The variables clipLeftPos, clipRightPos, clipTopPos and clipBottomPos are derived by invoking the ALF boundary position derivation process as specified in clause 8.8.5.5 with (xCtb, yCtb) and (xL−xCtb, yL−yCtb) as inputs.

The vertical sample position offsets yM2, yM1, yP1, yP2 and yP3 are specified in Table 4-1. Specification of yP1 according to the vertical luma sample position yL and applyAlfLineBufBoundary

| Condition | yP1 |
| --- | --- |
| ( yL = = CtbSizeY − 4 ) && ( applyAlfLineBufBoundary = = 1 ) | 0 |
| ( yL = = CtbSizeY − 5 ) && ( applyAlfLineBufBoundary = = 1 ) | 0 |
| Otherwise | 1 |

TABLE 4-2

Specification of yP1 according to the vertical luma sample position yL and applyAlfLineBufBoundary

| Condition | yP1 |
| --- | --- |
| ( yL = = CtbSizeY − 4 ) && ( applyAlfLineBufBoundary = = 1 ) | 1 |
| ( yL = = CtbSizeY − 5 ) && ( applyAlfLineBufBoundary = = 1 ) | 0 |
| Otherwise | 1 | according to the vertical luma sample position yL, clipLeftPos and clipRightPos.

The horizontal sample position offsets xM1, xM2, xP1 and xP2 are specified in Table y yyyy$_o$ yy according to the horizontal luma sample position xL, clipLeftPos and clipRightPos.

The variable curr is derived as follows:

curr=alfPicturec[xC+x,yC+y] (8-1286)

The array of cross component filter coefficients f[j] is derived as follows with j=0..13:

f[j]=CcAlfCoeff[j] (8-1287)

The variable sum is derived as follows:

sum=f[0] *recPicture$_L$[h$_x$, v$_{y+y\,M2}$]+
f[1] *recPicture$_L$[h$_{x+xM1}$, v$_{y+yM1}$]+
f[2] *recPicture$_L$[h$_x$, v$_{y+y\,M1}$]+
f[3] *recPicture$_L$[h$_{x+xP1}$, v$_{y+yM1}$]+
f[4] *recPicture$_L$[h$_{x+xM1}$, v$_y$]+
f[5] *recPicture$_L$[h$_{x+xM1}$, v$_y$]+
f[6] *recPicture$_L$[h$_x$, v$_y$]+
f[7] *recPicture$_L$[h$_{x+xP1}$, v$_y$]+
f[4] *recPicture$_L$[h$_{x+xP2}$, v$_y$]+(8-1289)
f[4] *recPicture$_L$[h$_{x+xM1}$, v$_{y+y1}$]+
f[8] *recPicture$_L$[h$_{x+xM1}$, v$_{y+y1}$]+
f[9] *recPicture$_L$[h$_x$, v$_{y+yP1}$]+
f[10] *recPicture$_L$[h$_{x+xP1}$, v$_{y+yP1}$]+
f[4] *recPicture$_L$[h$_{x+xP2}$, v$_{y+yP1}$]+
f[11] *recPicture$_L$[h$_{x+xM1}$, v$_{y+yP2}$]+
f[12] *recPicture$_L$[h$_x$, v$_{y+yP2}$]+
f[13] *recPicture$_L$[h$_{x+xP1}$, v$_{y+yP2}$]+
f[0] *recPicture$_L$[h$_x$, v$_{y+yP3}$]+
sum=curr+(sum+64)>>7) (8-1290)

The modified filtered reconstructed chroma picture sample array ccAlfPicture[xC+x][yC+y] is derived as follows:

ccAlfPicture[xC+x][yC+y]=Clip3(0,(1<<BitDepthc)−1,sum) (8-1291)

Table x-xx—Specification of yM1, yM2, yP1, yP2 and yP3 according to the vertical luma sample position yL, clipTopPos and clipBottomPos Delete the following table:

| Condition | yM2 | yM1 | yP1 | yP2 | yP3 |
| --- | --- | --- | --- | --- | --- |
| yL = = clipTopPos + 1 | −1 | −1 | 1 | 2 | 3 |
| yL = = clipTopPos | 0 | 0 | 1 | 2 | 3 |
| yL = = clipBottomPos − 1 | −2 | −1 | 0 | 0 | 0 |
| yL = = clipBottomPos − 2 | −2 | −1 | 1 | 1 | 1 |
| yL = = clipBottomPos − 3 | −2 | −1 | 1 | 2 | 2 |
| Otherwise | −2 | −1 | 1 | 2 | 3 |

Add the following table

| Condition | yM2 | yM1 | yP1 | yP2 | yP3 |
| --- | --- | --- | --- | --- | --- |
| yL = = clipTopPos + 2 | −2 | −1 | 1 | 2 | 2 |
| yL = = clipTopPos + 1 | −1 | −1 | 1 | 1 | 1 |
| yL = = clip TopPos | 0 | 0 | 0 | 0 | 0 |
| yL = = clipBottomPos − 1 | 0 | 0 | 0 | 0 | 0 |
| yL = = clip BottomPos − 2 | 0 | −1 | 1 | 1 | 1 |
| yL = = clipBottomPos − 3 | −2 | −1 | 1 | 2 | 2 |
| Otherwise | −2 | −1 | 1 | 2 | 3 |

TABLE y-yy

Specification of xM1, xM2, xP1, and xP2 according to the horizontal luma sample position xL, clipLeftPos and clipRightPos

| Condition | xM2 | xM1 | xP1 | xP2 |
|---|---|---|---|---|
| xL = = clipLeftPos + 1 | −1 | −1 | 1 | 2 |
| xL = = clipLeftPos | 0 | 0 | 1 | 2 |
| xL = = clipRightPos − 1 | −2 | −1 | 0 | 0 |
| xL = = clipRightPos − 2 | −2 | −1 | 1 | 1 |
| Otherwise | −2 | −1 | 1 | 2 |

5.3. Embodiment #3

The working draft specified in JVET-P1008 may be changed as below.

x.x.x.x Cross component filtering process for block of chroma samples

Inputs of this Process are:
- a reconstructed luma picture sample array recPicture$_L$ prior to the luma adaptive loop filtering process,
- a filtered reconstructed chroma picture sample array alfPicture$_C$,
- a chroma location (xCtbC, yCtbC) specifying the top-left sample of the current chroma coding tree block relative to the top left sample of the current picture,
- a width ccAlfWidth of block of chroma samples
- a height ccAlfHeight of block of chroma samples
- cross component filter coefficients CcAlfCoeff[j], with j=0..7 Output of this process is the modified filtered reconstructed chroma picture sample array ccAlfPicture.

The coding tree block luma location (xCtb, yCtb) is derived as follows:

xCtb=(((xCtbC*SubWidthC)>>*Ctb* Log2SizeY)
    <<*Ctb* Log2SizeY (8-1229)

yCtb=(((yCtbC*SubHeightC)>>*Ctb* Log2SizeY)
    <<*Ctb* Log2SizeY (8-1229)

For the derivation of the filtered reconstructed chroma samples ccAlfPicture[xCtbC+x][yCtbC+y], each reconstructed chroma sample inside the current chroma block of samples alfPicturec[xCtbC+x][yCtbC+y] with x=0..ccAlfWidth−1, y=0..ccAlfHeight−1, is filtered as follows:

The luma location (xL, yL) corresponding to the current chroma sample at chroma location (xCtbC+x, yCtbC+y) is set equal to ((xCtbC+x)*SubWidthC, (yCtbC+y)*SubHeightC)

The luma locations ($h_{xL+i}$, $v_{yL+j}$) with i=−1..1, j=−1..2 inside the array recPicture$_L$ are derived as follows:

If pps_loop_filter_across_virtual_boundaries_disabled flag is equal to 1, and PpsVirtualBoundariesPosX[n] % CtbSizeY is not equal to 0, and xL−PpsVirtualBoundariesPosX[n] is greater than or equal to 0 and less than 3 for any n=0..pps_num_ver_virtual_boundaries−1, the following applies:

$h_{xL+i}$=Clip3(PpsVirtualBoundariesPosX[n], pic_width_in_luma_samples−1, xL+i) (8-1229)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0..pps_num_ver_virtual_boundaries−1, the following applies:

$h_{x+i}$=Clip3(0, PpsVirtualBoundariesPosX[n]−1, xL+i) (8-1230)

Otherwise, the following applies:

$h_{x+i}$=Clip3(0, pic_width_in_luma_samples−1, xL+i) (8-1231)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0..pps_num_hor_virtual_boundaries−1, the following applies:

$v_{y+j}$=Clip3(PpsVirtualBoundariesPosY[n], pic_height_in_luma_samples−1, yL+j) (8-1232)

Otherwise, if pps_loop_filter_across_virtual_boundaries_disabled flag is equal to 1, and PpsVirtualBoundariesPosY[n] % CtbSizeY is not equal to 0, and PpsVirtualBoundariesPosY[n]−yL is greater than 0 and less than 4 for any n=0..pps_num_hor_virtual_boundaries−1, the following applies:

$v_{y+j}$=Clip3(0, PpsVirtualBoundariesPosY[n]−1, yL+j) (8-1233)

Otherwise, the following applies:

$v_{y+j}$=Clip3(0, pic_height_in_luma_samples−1, yL+j) (8-1234)

The variables clipLeftPos, clipRightPos, clipTopPos and clipBottomPos are derived by invoking the ALF boundary position derivation process as specified in clause 8.8.5.5 with (xCtb, yCtb) and (xL−xCtb, yL−yCtb) as inputs.

The vertical sample position offsets yM1, yP1 and yP2 are specified in Table 4-1. Specification of yP1 according to the vertical luma sample position yL and applyAlfLineBufBoundary

| Condition | yP1 |
|---|---|
| ( yL = = CtbSizeY − 4 ) && ( applyAlfLineBufBoundary = = 1 ) | 0 |
| ( yL = = CtbSizeY − 5 ) && ( applyAlfLineBufBoundary = = 1 ) | 0 |
| Otherwise | 1 |

TABLE 4-2

Specification of yP1 according to the vertical luma
sample position yL and applyAlfLineBufBoundary

| Condition | yP1 |
|---|---|
| ( yL = = CtbSizeY − 4 ) && ( applyAlfLineBufBoundary = = 1 ) | 1 |
| ( yL = = CtbSizeY − 5 ) && ( applyAlfLineBufBoundary = = 1 ) | 0 |
| Otherwise | 1 | according to the vertical luma sample position yL, clipLeftPos and clipRightPos.

The horizontal sample position offsets xM1 and xP1 are specified in Table y yyyy$_o$ yy according to the horizontal luma sample position xL, clipLeftPos and clipRightPos.

The variable curr is derived as follows:

curr=alfPicturec[xCtbC+x, yCtbC+y]   (8-1286)

The array of cross component filter coefficients f[j] is derived as follows with j=0..7:

f[ij]=CcAlfCoeff[j]   (8-1287)

The variable sum is derived as follows:

sum=f[0] *recPicture$_L$[h$_x$, v$_{y+yM1}$]+
 f[1] *recPicture$_L$[h$_{x+xM1}$, v$_y$]+
 f[2] *recPicture$_L$[h$_x$, v$_y$]+
 f[3] *recPicture$_L$[h$_{x+xp1}$, v$_y$]+(8-1289)
 f[4] *recPicture$_L$[h$_{x+xM1}$, v$_{y+yP1}$]+
 f[5] *recPicture$_L$[h$_x$, v$_{y+yP1}$]+
 f[6] *recPicture$_L$[h$_{x+xp1}$, v$_{y+yP1}$]+
 f[7] *recPicture$_L$[h$_x$, v$_{y+yP2}$]
sum=Clip3(−(1<<(BitDepthc−1)), (1<<(BitDepthc−1))−1, sum) (8-1290)
sum=curr+(sum+64)>>(7+(BitDepthy−BitDepthc)) (8-1290)

The modified filtered reconstructed chroma picture sample array ccAlfPicture[xCtbC+x][yCtbC+y] is derived as follows:

ccAlfPicture[xCtbC+x][yCtbC+y]=Clip3(0, (1<<BitDepthc)−1, sum)(8-1291)

Table x-xx—Specification of yM1, yP1 and yP2 according to the vertical luma sample position yL, clipTopPos and clipBottomPos Delete the following table:

| Condition | yM1 | yP1 | yP2 |
|---|---|---|---|
| yL = = clipTopPos + 1 | −1 | 1 | 1 |
| yL = = clip TopPos | 0 | 0 | 1 |
| yL = = clipBottomPos − 1 | 0 | 0 | 1 |
| yL = = clipBottomPos − 2 | −1 | 1 | 1 |
| Otherwise | −1 | 1 | 2 |

Add the following table

| Condition | yM1 | yP1 | yP2 |
|---|---|---|---|
| yL = = clipTopPos | 0 | 1 | 1 |
| yL = = clipBottomPos − 1 | 0 | 0 | 0 |
| yL = = clip BottomPos − 2 | 0 | 1 | 1 |
| Otherwise | −1 | 1 | 2 |

TABLE y-yy

Specification of xM1 and xP1 according to the horizontal luma
sample position xL, clipLeftPos and clipRightPos

| Condition | xM1 | xP1 |
|---|---|---|
| xL = = clipLeftPos | 0 | 0 |
| xL = = clipRightPos − 1 | 0 | 0 |
| xL = = clipRightPos − 2 | −1 | 1 |
| Otherwise | −1 | 1 |

5.4. Embodiment #4

The working draft specified in JVET-P1008 may be changed as below. The changes are highlighted in bold and italic and deleted texts are marked with double brackets (e.g., [[a]] denotes the deletion of the character "a").

x.x.x.x Cross component filtering process for block of chroma samples

Inputs of this Process are:
 a reconstructed luma picture sample array recPicture$_L$ prior to the luma adaptive loop filtering process,
 a filtered reconstructed chroma picture sample array alfPicturec,
 a chroma location (xCtbC, yCtbC) specifying the top-left sample of the current chroma coding tree block relative to the top left sample of the current picture,
 a width ccAlfWidth of block of chroma samples
 a height ccAlfHeight of block of chroma samples
 cross component filter coefficients CcAlfCoeff[j], with j=0..7

Output of this process is the modified filtered reconstructed chroma picture sample array ccAlfPicture.

The coding tree block luma location (xCtb, yCtb) is derived as follows:

xCtb=(((xCtbC*SubWidthC)>>*Ctb* Log2SizeY)
  <<*Ctb* Log2SizeY)   (8-1229)

yCtb=(((yCtbC*SubHeightC)>>*Ctb* Log2SizeY)
  <<*Ctb* Log2SizeY)   (8-1229)

For the derivation of the filtered reconstructed chroma samples ccAlfPicture[xCtbC+x][yCtbC+y], each reconstructed chroma sample inside the current chroma block of samples alfPicturec[xCtbC+x][yCtbC+y] with x=0..ccAlfWidth−1, y=0..ccAlfHeight−1, is filtered as follows:

The luma location (xL, yL) corresponding to the current chroma sample at chroma location (xCtbC+x, yCtbC+y) is set equal to ((xCtbC+x)*SubWidthC, (yCtbC+y)*SubHeightC)

The luma locations (h$_{xL+i}$, v$_{yL+j}$) with i=−1..1, j=−1..2 inside the array recPicture$_L$ are derived as follows:

If pps_loop_filter_across_virtual_boundaries_disabled flag is equal to 1, and PpsVirtualBoundariesPosX[n] % CtbSizeY is not equal to 0, and xL−PpsVirtual- BoundariesPosX[n] is greater than or equal to 0 and less than 3 for any n=0..pps_num_ver_virtual_boundaries−1, the following applies:

$h_{xL+i}$=Clip3(PpsVirtualBoundariesPosX[n], pic_width_in_luma_samples−1, xL+i) (8-1229)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0..pps_num_ver_virtual_boundaries−1, the following applies:

$h_{x+i}$=Clip3(0, PpsVirtualBoundariesPosX[n]−1, xL+i) (8-1230)

Otherwise, the following applies:

$h_{x+i}$=Clip3(0, pic_width_in_luma_samples−1, xL+i) (8-1231)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0..pps_num_hor_virtual_boundaries−1, the following applies:

$v_{y+j}$=Clip3(PpsVirtualBoundariesPosY[n], pic_height_in_luma_samples−1, yL+j) (8-1232)

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0..pps_num_hor_virtual_boundaries−1, the following applies:

$v_{y+j}$=Clip3(0, PpsVirtualBoundariesPosY[n]−1, yL+j) (8-1233)

Otherwise, the following applies:

$v_{y+j}$=Clip3(0, pic_height_in_luma_samples−1, yL+j) (8-1234)

The variables clipLeftPos, clipRightPos, clipTopPos and clipBottomPos are derived by invoking the ALF boundary position derivation process as specified in clause 8.8.5.5 with (xCtb, yCtb) and (xL−xCtb, yL−yCtb) as inputs.

The vertical sample position offsets yM1, yP1 and yP2 are specified in Table 4-1. Specification of yP1 according to the vertical luma sample position yL and applyAlfLineBufBoundary

| Condition | yP1 |
| --- | --- |
| ( yL == CtbSizeY − 4 ) && ( applyAlfLineBufBoundary == 1) | 0 |
| ( yL == CtbSizeY − 5 ) && ( applyAlfLineBufBoundary == 1) | 0 |
| Otherwise | 1 |

TABLE 4-2

Specification of yP1 according to the vertical luma sample position yL and applyAlfLineBufBoundary

| Condition | yP1 |
| --- | --- |
| ( yL == CtbSizeY − 4 ) && ( applyAlfLineBufBoundary == 1 ) | 1 |
| ( yL == CtbSizeY − 5 ) && ( applyAlfLineBufBoundary == 1 ) | 0 |
| Otherwise | 1 | according to the vertical luma sample position yL, clipLeftPos and clipRightPos.

The horizontal sample position offsets xM1 and xP1 are specified in Table y yyyy according to the horizontal luma sample position xL, clipLeftPos and clipRightPos.

The variable curr is derived as follows:
curr=alfPicture<sub>C</sub>[xCtbC+x, yCtbC+y] (8-1286)

The array of cross component filter coefficients f[j] is derived as follows with j=0..7:

$$f[j]=CcAlfCoeff[j] \qquad (8\text{-}1287)$$

The variable sum is derived as follows:
sum=f[0] *recPicture$_L$[h$_x$, v$_{y+yM1}$]+
   f[1] *recPicture$_L$[h$_{x+xM1}$, v$_y$]+
   f[2] *recPicture$_L$[h$_x$, v$_y$]+
   f[3] *recPicture$_L$[h$_{x+Xp1}$, v$_y$]+(8-1289)
   f[4] *recPicture$_L$[h$_{x+xM1}$, v$_{y+yP1}$]+
   f[5] *recPicture$_L$[h$_x$, v$_{y+yP1}$]+
   f[6] *recPicture$_L$[h$_{x+xp1}$, v$_{y+yP1}$]+
   f[7] *recPicture$_L$[h$_x$, v$_{y+yP2}$]
sum=Clip3(−(1<<(BitDepthc−1)), (1<<(BitDepthc−1))−1, sum) (8-1290)
sum=curr+(sum+64)>>(7+(BitDepthy−BitDepthc)) (8-1290)

The modified filtered reconstructed chroma picture sample array ccAlfPicture[xCtbC+x][yCtbC+y] is derived as follows:
ccAlfPicture[xCtbC+x][yCtbC+y]=Clip3(0, (1<<BitDepthc)−1, sum)(8-1291)

Table x-xx—Specification of yM1, yP1 and yP2 according to the vertical luma sample position yL, clipTopPos and clipBottomPos Delete the following table:

| Condition | yM1 | yP1 | yP2 |
|---|---|---|---|
| yL = = clipTopPos + 1 | −1 | 1 | 1 |
| yL = = clip TopPos | 0 | 0 | 1 |
| yL = = clipBottomPos − 1 | 0 | 0 | 1 |
| yL = = clip BottomPos − 2 | −1 | 1 | 1 |
| Otherwise | −1 | 1 | 2 |

Add the following table:

| Condition | yM1 | yP1 | yP2 |
|---|---|---|---|
| yL = = clipTopPos + 1 | −1 | 1 | 1 |
| yL = = clip TopPos | 0 | 0 | 0 |
| yL = = clipBottomPos − 1 | 0 | 0 | 0 |
| yL = = clip BottomPos − 2 | −1 | 1 | 1 |
| Otherwise | −1 | 1 | 2 |

TABLE y-yy

Specification of xM1 and xP1 according to the horizontal luma sample position xL, clipLeftPos and clipRightPos

| Condition | xM1 | xP1 |
|---|---|---|
| xL = = clipLeftPos | 0 | 0 |
| xL = = clipRightPos − 1 | 0 | 0 |
| xL = = clipRightPos − 2 | −1 | 1 |
| Otherwise | −1 | 1 |

5.5. Embodiment #5

The working draft specified in JVET-S2001-v5 may be changed as below.
8.8.5 Adaptive Loop Filter Process
8.8.5.2 Coding Tree Block Filtering Process for Luma Samples
  The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtb, yCtb) [[and]], (x, y) and the variable vbOffset set equal to 4 as inputs.
  The variables h$_{x+i}$ and v$_{y+j}$ are modified by invoking the ALF sample padding process as specified in clause 8.8.5.6 with (xCtb, yCtb), (h$_{x+i}$, v$_{y+j}$), 0, clipLeftPos, clipRightPos, clipTopPos, clipBottomPos, clipTopLeftFlag and clipBotRightFlag as input.
8.8.5.3 Derivation Process for ALF Transpose and Filter Index for Luma Samples
  The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtb, yCtb) [[and]], (x4, y4) and the variable vbOffset set equal to 4 as inputs.
8.8.5.4 Coding Tree Block Filtering Process for Chroma Samples
  The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) [[and]], (x*SubWidthC, y*SubHeightC) and the variable vbOffset set equal to 2*SubHeightC as inputs.
  The variables h$_{x+i}$ and v$_{y+j}$ are modified by invoking the ALF sample padding process as specified in clause 8.8.5.6 with (xCtbC*SubWidthC, yCtbC*SubHeightC), (h$_{x+i}$, v$_{y+j}$), the variable is Chroma set equal to 1, clipLeftPos, clipRightPos, clipTopPos, clipBottomPos, clipTopLeftFlag and clipBotRightFlag as input.
8.8.5.5 ALF Boundary Position Derivation Process
Inputs of this process are:
  a luma location (xCtb, yCtb) specifying the top-left sample of the current luma coding tree block relative to the top left sample of the current picture,
  a luma location (x, y) specifying the current sample relative to the top-left sample of the current luma coding tree block[[.]],
  a variable vbOffset specifying the offset for ALF virtual boundary.
The Variable clipTopPos is Modified as Follows:
  If y−(CtbSizeY−[[4]]vbOffset) is greater than or equal to 0, the variable clipTopPos is set equal to yCtb+CtbSizeY−[[4]]vbOffset.
  Otherwise, if VirtualBoundariesPresentFlag is equal to 1, and yCtb+y−VirtualBoundaryPosY[n] is greater than or equal to 0 and less than 3 for any n=0..NumHorVirtualBoundaries−1, the following applies:
    clipTopPos=VirtualBoundaryPosY[n] (1497)
  Otherwise, if y is less than 3 and one or more of the following conditions are true, the variable clipTopPos is set equal to yCtb:

The top boundary of the current coding tree block is the top boundary of the tile, and pps_loop_filter_across_tiles_enabled_flag is equal to 0.

The top boundary of the current coding tree block is the top boundary of the slice, and pps_loop_filter_across_slices_enabled_flag is equal to 0.

The top boundary of the current coding tree block is the top boundary of the subpicture, and sps_loop_filter_across_subpic_enabled_flag[CurrSubpicIdx] is equal to 0.

The Variable clipBottomPos is Modified as Follows:

If VirtualBoundariesPresentFlag is equal to 1, VirtualBoundaryPosY[n] is not equal to pps_pic_height_in_luma_samples−1 or 0, and VirtualBoundaryPosY[n]−yCtb−y is greater than 0 and less than 5 for any n=0..NumHorVirtualBoundaries−1, the following applies:

clipBottomPos=VirtualBoundaryPosY[n]   (1498)

Otherwise, if CtbSizeY−[[4]]vbOffset−y is greater than 0 and is less than 5, the variable clipBottomPos is set equal to yCtb+CtbSizeY−[[4]]vbOffset.

Otherwise, if CtbSizeY−y is less than 5, and one or more of the following conditions are true, the variable clipBottomPos is set equal to yCtb+CtbSizeY:

The bottom boundary of the current coding tree block is the bottom boundary of the tile, and pps_loop_filter_across_tiles_enabled_flag is equal to 0.

The bottom boundary of the current coding tree block is the bottom boundary of the slice, and pps_loop_filter_across_slices_enabled_flag is equal to 0.

The bottom boundary of the current coding tree block is the bottom boundary of the subpicture, and sps_loop_filter_across_subpic_enabled_flag[CurrSubpicIdx] is equal to 0.

8.8.5.6 ALF Sample Padding Process
Inputs of this process are:
  a [[luma]]sample location (xCtb, yCtb) specifying the top-left sample of the current luma coding tree block relative to the top left sample of the current picture,
  a luma location (x, y) specifying the neighbouring sample relative to the top-left sample of the current picture,
  a flag isChroma specifiying whether the colour componenet is chroma component or not,
  the left vertical boundary position clipLeftPos,
  the right vertical boundary position clipRightPos,
  the above horizontal boundary position clipTopPos,
  the below horizontal boundary position clipBottomPos,
  the top left boundary flag clipTopLeftFlag,
  the bottom right boundary flag clipBotRightFlag.
Outputs of this Process are:
  modified [[luma]]sample location (x, y) specifying the neighbouring sample relative to the top-left sample of the current picture,
8.8.5.7 Cross-Component Filtering Process
  The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) [[and]] (x*SubWidthC, y*SubHeightC) and the variable vbOffset set equal to 4 as inputs.
  The variables $h_{x+i}$ and $v_{y+j}$ are modified by invoking the ALF sample padding process as specified in clause 8.8.5.6 with (xCtbC*SubWidthC, yCtbC*SubHeightC), ($h_{x+i}$, $v_{y+j}$), the variable isChroma set equal to 0, clipLeftPos, clipRightPos, clipTopPos, clipBottomPos, clipTopLeftFlag and clipBotRightFlag as input.

5.6. Embodiment #6

The working draft specified in JVET-S2001-v5 may be changed as below.
8.8.5 Adaptive Loop Filter Process
8.8.5.2 Coding Tree Block Filtering Process for Luma Samples
  The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtb, yCtb) [[and]], (x, y) and the variable vbOffset set equal to 4 as inputs.
  The variables $h_{x+i}$ and $v_{y+j}$ are modified by invoking the ALF sample padding process as specified in clause 8.8.5.6 with (xCtb, yCtb), ($h_{x+i}$, $v_{y+j}$), 0, clipLeftPos, clipRightPos, clipTopPos, clipBottomPos, clipTopLeftFlag and clipBotRightFlag as input.
8.8.5.3 Derivation Process for ALF Transpose and Filter Index for Luma Samples
  The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtb, yCtb) [[and]], (x4, y4) and the variable vbOffset set equal to 4 as inputs.
8.8.5.4 Coding Tree Block Filtering Process for Chroma Samples
  The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) [[and]], (x*SubWidthC, y*SubHeightC) and the variable vbOffset set equal to 2*SubHeightC as inputs.
  The variables $h_{x+i}$ and $v_{y+j}$ are modified by invoking the ALF sample padding process as specified in clause 8.8.5.6 with (xCtbC*SubWidthC, yCtbC*SubHeightC), ($h_{x+i}$, $v_{y+j}$), the variable isChroma set equal to 1, clipLeftPos, clipRightPos, clipTopPos, clipBottomPos, clipTopLeftFlag and clipBotRightFlag as input.
8.8.5.5 ALF Boundary Position Derivation Process
Inputs of this process are:
  a luma location (xCtb, yCtb) specifying the top-left sample of the current luma coding tree block relative to the top left sample of the current picture,
  a luma location (x, y) specifying the current sample relative to the top-left sample of the current luma coding tree block[[.]],
  a variable vbOffset specifying the offset for ALF virtual boundary.
The variable clipTopPos is modified as follows:
  If y−(CtbSizeY−[[4]]vbOffset) is greater than or equal to 0, the variable clipTopPos is set equal to yCtb+CtbSizeY−[[4]]vbOffset.
  Otherwise, if VirtualBoundariesPresentFlag is equal to 1, and yCtb+y−VirtualBoundaryPosY[n] is greater than or equal to 0 and less than 3 for any n=0..NumHorVirtualBoundaries−1, the following applies:

clipTopPos=VirtualBoundaryPosY[n] (1497)

Otherwise, if y is less than [[3]](vbOffset>>1)+1 and one or more of the following conditions are true, the variable clipTopPos is set equal to yCtb:

The top boundary of the current coding tree block is the top boundary of the tile, and pps_loop_filter_across_tiles_enabled_flag is equal to 0.

The top boundary of the current coding tree block is the top boundary of the slice, and pps_loop_filter_across_slices_enabled_flag is equal to 0.

The top boundary of the current coding tree block is the top boundary of the subpicture, and sps_loop_filter_across_subpic_enabled_flag[CurrSubpicIdx] is equal to 0.

The variable clipBottomPos is modified as follows:

If VirtualBoundariesPresentFlag is equal to 1, VirtualBoundaryPosY[n] is not equal to pps_pic_height_in_luma_samples−1 or 0, and VirtualBoundaryPosY[n]−yCtb−y is greater than 0 and less than 5 for any n=0..NumHorVirtualBoundaries−1, the following applies:

clipBottomPos=VirtualBoundaryPosY[n] (1498)

Otherwise, if CtbSizeY−[[4]]vbOffset−y is greater than 0 and is less than [[5]]vbOffset+1, the variable clipBottomPos is set equal to yCtb+CtbSizeY−[[4]]vbOffset.

Otherwise, if CtbSizeY−y is less than [[5]]vbOffset+1, and one or more of the following conditions are true, the variable clipBottomPos is set equal to yCtb+CtbSizeY:

The bottom boundary of the current coding tree block is the bottom boundary of the tile, and pps_loop_filter_across_tiles_enabled_flag is equal to 0.

The bottom boundary of the current coding tree block is the bottom boundary of the slice, and pps_loop_filter_across_slices_enabled_flag is equal to 0.

The bottom boundary of the current coding tree block is the bottom boundary of the subpicture, and sps_loop_filter_across_subpic_enabled_flag[CurrSubpicIdx] is equal to 0.

8.8.5.6 ALF Sample Padding Process

Inputs of this process are:

a [[luma]]sample location (xCtb, yCtb) specifying the top-left sample of the current luma coding tree block relative to the top left sample of the current picture, a luma location (x, y) specifying the neighbouring sample relative to the top-left sample of the current picture, a flag isChroma specifiying whether the colour componenet is chroma component or not, the left vertical boundary position clipLeftPos, the right vertical boundary position clipRightPos, the above horizontal boundary position clipTopPos, the below horizontal boundary position clipBottomPos, the top left boundary flag clipTopLeftFlag, the bottom right boundary flag clipBotRightFlag.

Outputs of this process are:

modified [[luma]]sample location (x, y) specifying the neighbouring sample relative to the top-left sample of the current picture, 8.8.5.7 Cross-Component Filtering Process The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) [[and]] (x*SubWidthC, y*SubHeightC) and the variable vbOffset set equal to 4 as inputs.

The variables $h_{x+i}$ and $v_{y+j}$ are modified by invoking the ALF sample padding process as specified in clause 8.8.5.6 with (xCtbC*SubWidthC, yCtbC*SubHeightC), ($h_{x+i}$, $v_{y+j}$), the variable isChroma set equal to 0, clipLeftPos, clipRightPos, clipTopPos, clipBottomPos, clipTopLeftFlag and clipBotRightFlag as input.

5.7. Embodiment #7

The working draft specified in JVET-S2001-v5 may be changed as below.

8.8.5 Adaptive Loop Filter Process 8.8.5.2 Coding Tree Block Filtering Process for Luma Samples The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtb, yCtb) [[and]], (x, y) and the variable vbOffset set equal to 4 as inputs.

The variables $h_{x+i}$ and $v_{y+j}$ are modified by invoking the ALF sample padding process as specified in clause 8.8.5.6 with (xCtb, yCtb), ($h_{x+i}$, $v_{y+j}$), 0, clipLeftPos, clipRightPos, clipTopPos, clipBottomPos, clipTopLeftFlag and clipBotRightFlag as input.

8.8.5.3 Derivation Process for ALF Transpose and Filter Index for Luma Samples

The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtb, yCtb) [[and]], (x4, y4) and the variable vbOffset set equal to 4 as inputs.

8.8.5.4 Coding Tree Block Filtering Process for Chroma Samples

The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) [[and]], (x*SubWidthC, y*SubHeightC) and the variable vbOffset set equal to 2*SubHeightC as inputs.

The variables $h_{x+i}$ and $v_{y+j}$ are modified by invoking the ALF sample padding process as specified in clause 8.8.5.6 with (xCtbC*SubWidthC, yCtbC*SubHeightC), ($h_{x+i}$, $v_{y+j}$), the variable isChroma set equal to 1, clipLeftPos, clipRightPos, clipTopPos, clipBottomPos, clipTopLeftFlag and clipBotRightFlag as input.

8.8.5.5 ALF Boundary Position Derivation Process

Inputs of this process are:

a luma location (xCtb, yCtb) specifying the top-left sample of the current luma coding tree block relative to the top left sample of the current picture, a luma location (x, y) specifying the current sample relative to the top-left sample of the current luma coding tree block[[.]], a variable vbOffset specifying the offset for ALF virtual boundary.

The variable clipTopPos is modified as follows:

If y−(CtbSizeY−[[4]]vbOffset) is greater than or equal to 0, the variable clipTopPos is set equal to yCtb+CtbSizeY−[[4]]vbOffset.

Otherwise, if VirtualBoundariesPresentFlag is equal to 1, and yCtb+y−VirtualBoundaryPosY[n] is greater than or equal to 0 and less than [[3]](vbOffset>>1)+1 for any n=0..NumHorVirtualBoundaries−1, the following applies:

clipTopPos=VirtualBoundaryPosY[n] (1497)

Otherwise, if y is less than [[3]](vbOffset>>1)+1 and one or more of the following conditions are true, the variable clipTopPos is set equal to yCtb:

The top boundary of the current coding tree block is the top boundary of the tile, and pps_loop_filter_across_tiles_enabled_flag is equal to 0.

The top boundary of the current coding tree block is the top boundary of the slice, and pps_loop_filter_across_slices_enabled_flag is equal to 0.

The top boundary of the current coding tree block is the top boundary of the subpicture, and sps_loop_filter_across_subpic_enabled_flag[CurrSubpicIdx] is equal to 0.

The variable clipBottomPos is modified as follows:

If VirtualBoundariesPresentFlag is equal to 1, VirtualBoundaryPosY[n] is not equal to pps_pic_height_in_luma_samples−1 or 0, and VirtualBoundaryPosY[n]−yCtb−y is greater than 0 and less than 5vbOffset+1 for any n=0..NumHorVirtualBoundaries−1, the following applies:

clipBottomPos=VirtualBoundaryPosY[n] (1498)

Otherwise, if CtbSizeY−[[4]]vbOffset−y is greater than 0 and is less than [[5]]vbOffset+1, the variable clipBottomPos is set equal to yCtb+CtbSizeY−[[4]]vbOffset.

Otherwise, if CtbSizeY−y is less than [[5]]vbOffset+1, and one or more of the following conditions are true, the variable clipBottomPos is set equal to yCtb+CtbSizeY:

The bottom boundary of the current coding tree block is the bottom boundary of the tile, and pps_loop_filter_across_tiles_enabled_flag is equal to 0.

The bottom boundary of the current coding tree block is the bottom boundary of the slice, and pps_loop_filter_across_slices_enabled_flag is equal to 0.

The bottom boundary of the current coding tree block is the bottom boundary of the subpicture, and sps_loop_filter_across_subpic_enabled_flag[CurrSubpicIdx] is equal to 0.

8.8.5.6 ALF Sample Padding Process

Inputs of this process are:

a [[luma]]sample location (xCtb, yCtb) specifying the top-left sample of the current luma coding tree block relative to the top left sample of the current picture, a luma location (x, y) specifying the neighbouring sample relative to the top-left sample of the current picture, a flag isChroma specifiying whether the colour componenet is chroma component or not, the left vertical boundary position clipLeftPos, the right vertical boundary position clipRightPos, the above horizontal boundary position clipTopPos, the below horizontal boundary position clipBottomPos, the top left boundary flag clipTopLeftFlag, the bottom right boundary flag clipBotRightFlag.

Outputs of this process are:

modified [[luma]]sample location (x, y) specifying the neighbouring sample relative to the top-left sample of the current picture, 8.8.5.7 Cross-Component Filtering Process The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) [[and]] (x*SubWidthC, y*SubHeightC) and the variable vbOffset set equal to 4 as inputs.

The variables $h_{x+i}$ and $v_{y+j}$ are modified by invoking the ALF sample padding process as specified in clause 8.8.5.6 with (xCtbC*SubWidthC, yCtbC*SubHeightC), ($h_{x+i}$, $v_{y+j}$), the variable isChroma set equal to 0, clipLeftPos, clipRightPos, clipTopPos, clipBottomPos, clipTopLeftFlag and clipBotRightFlag as input.

Figure 32:
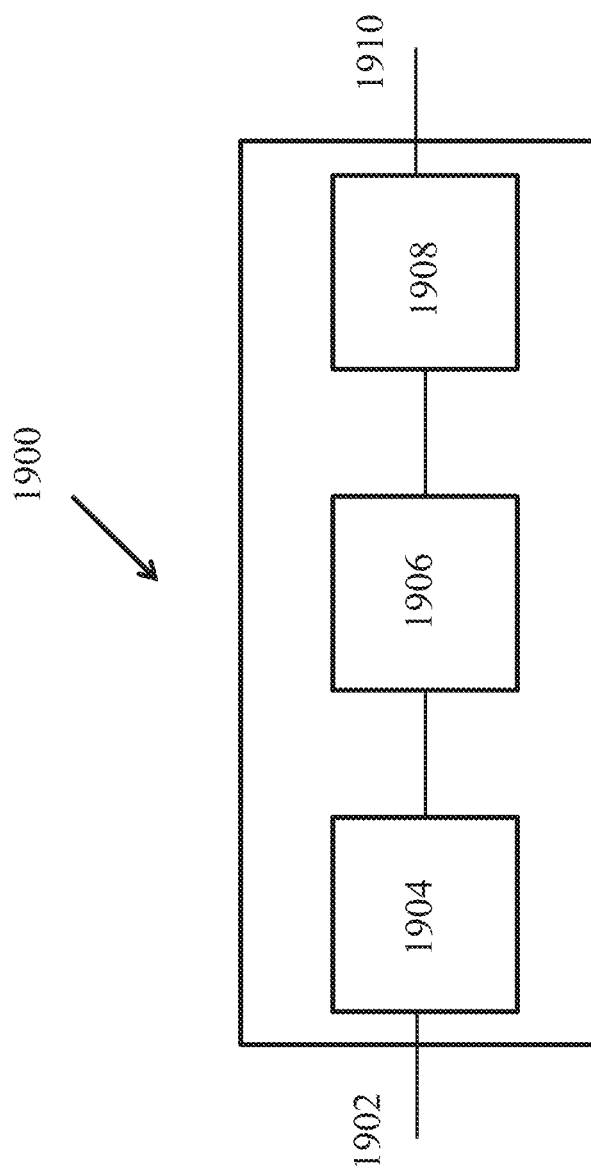
FIG. 32 is a block diagram of an example video processing system in which disclosed techniques may be implemented.

FIG. 32 FIG. is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 33:
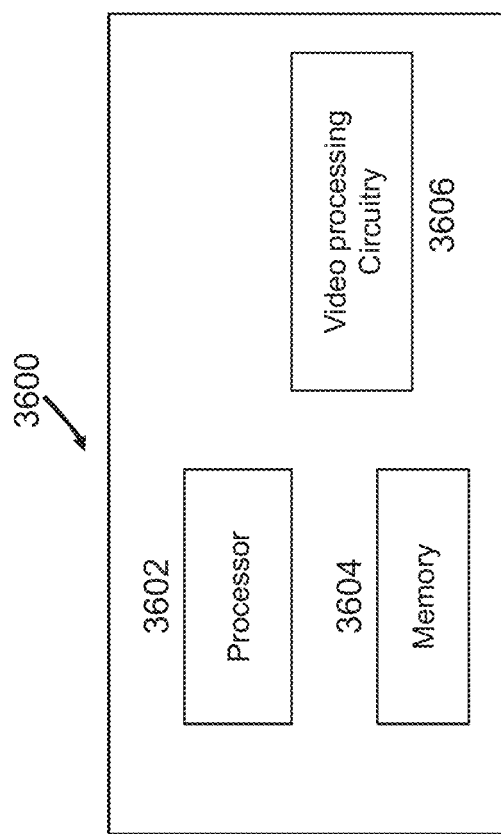
FIG. 33 is a block diagram of an example hardware platform used for video processing.

FIG. 33 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein.

The video processing hardware 3606 may be used to implement, in hardware circuitry, some techniques described in the present document.

Figure 35:
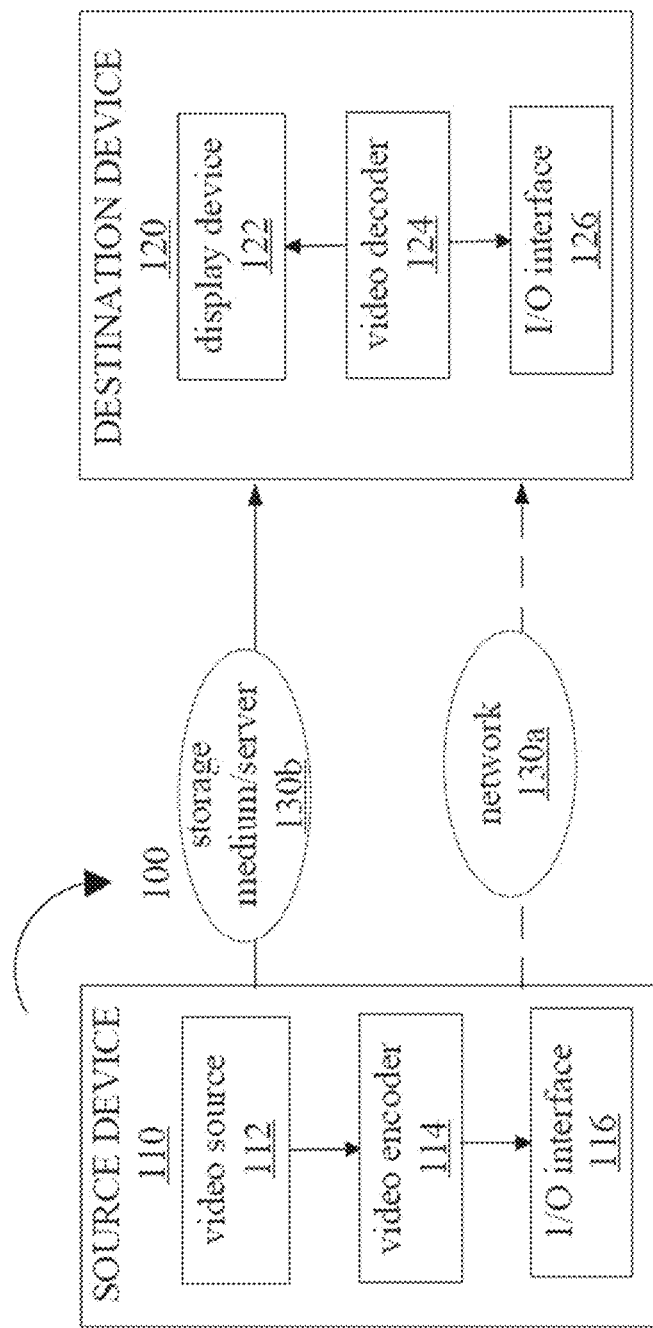
FIG. 35 is a block diagram that illustrates a video coding system in accordance with some embodiments of the present disclosure.

FIG. 35 is a block diagram that illustrates an example video coding system 100 that may utilize the techniques of this disclosure.

As shown in FIG. 35, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 36:
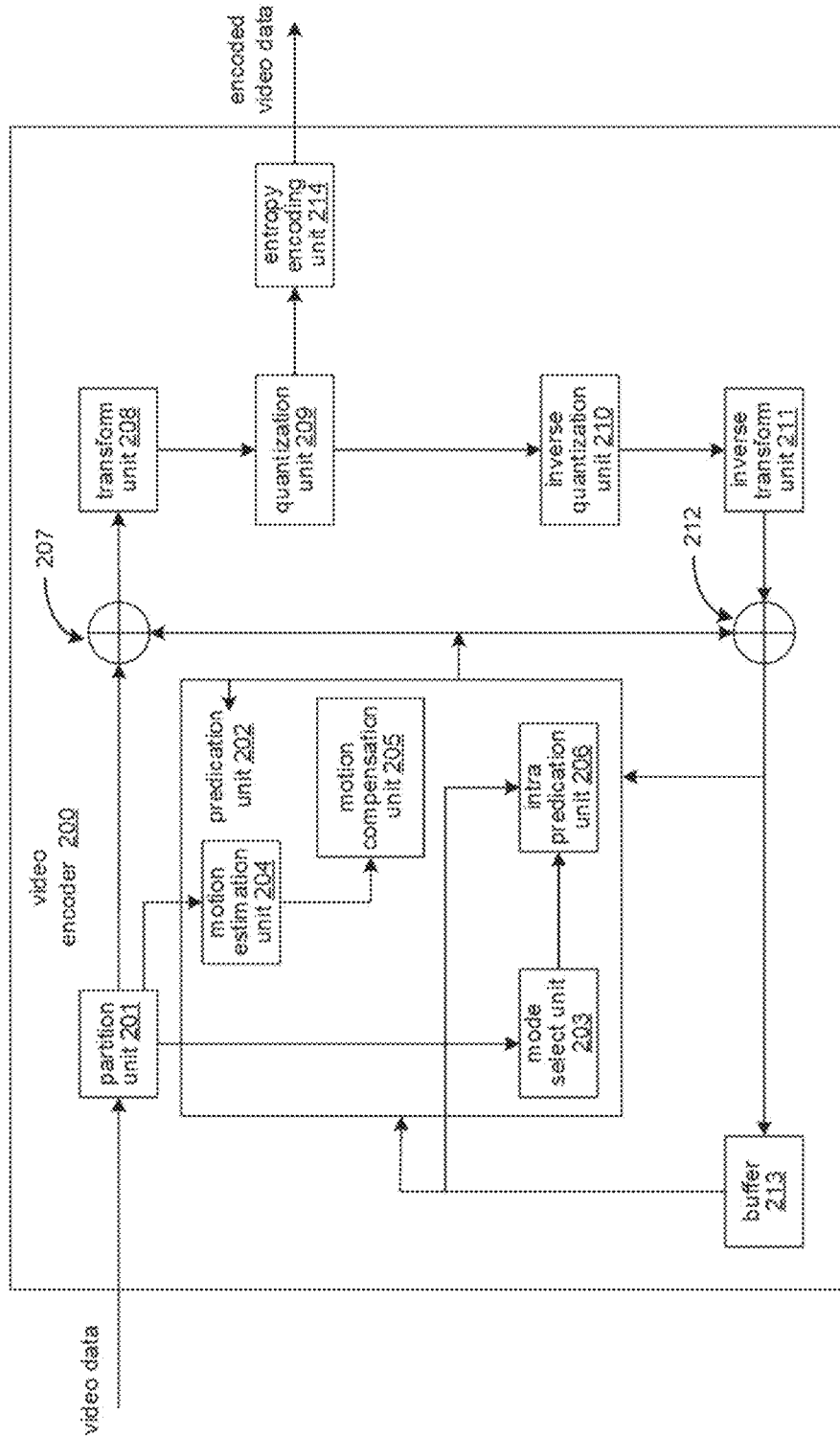
FIG. 36 is a block diagram that illustrates an encoder in accordance with some embodiments of the present disclosure.

FIG. 36 is a block diagram illustrating an example of video encoder 200, which may be video encoder 114 in the system 100 illustrated in FIG. 35.

Video encoder 200 may be configured to perform any or all of the techniques of this disclosure. In the example of FIG. 36, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy(IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 36 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 37:
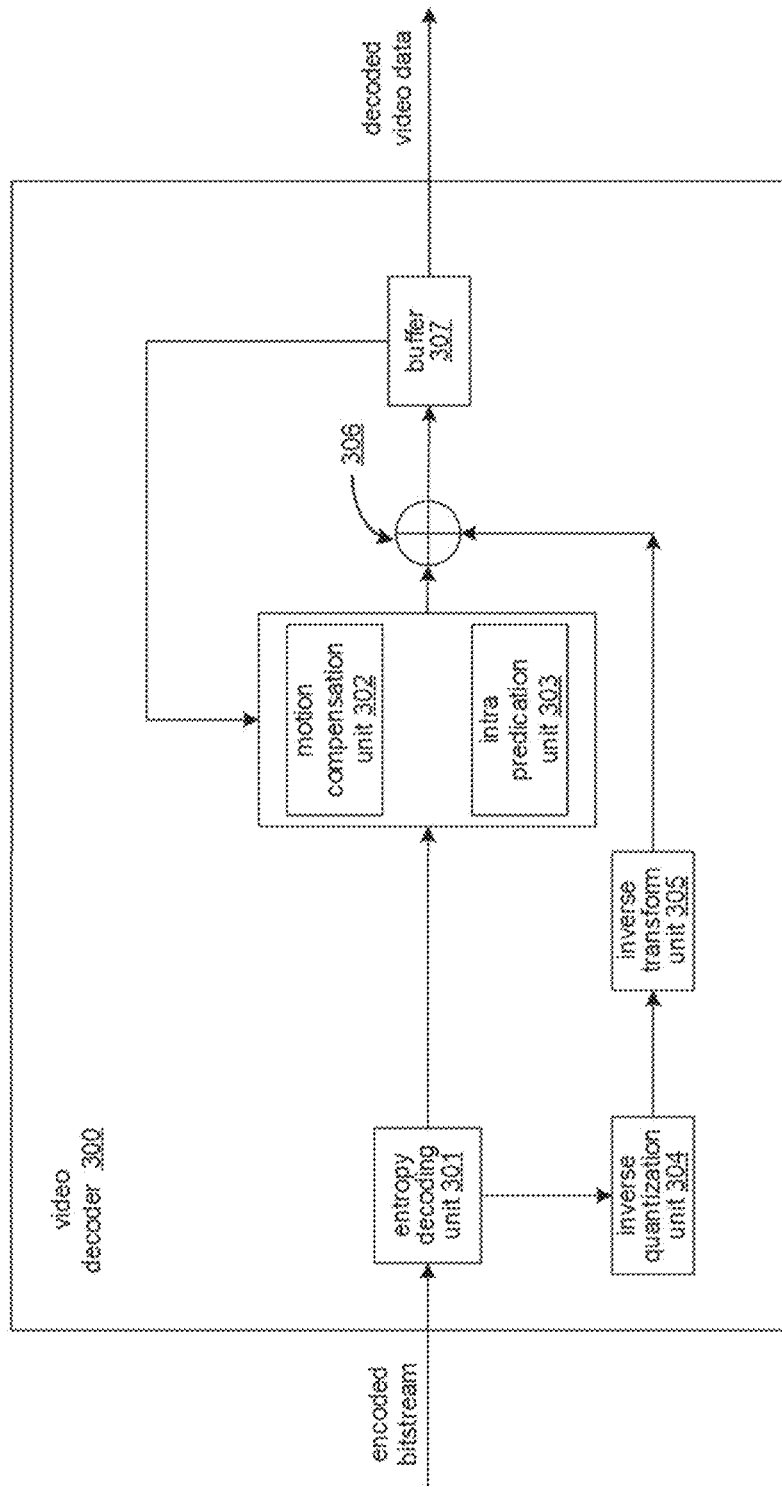
FIG. 37 is a block diagram that illustrates a decoder in accordance with some embodiments of the present disclosure.

FIG. 37 is a block diagram illustrating an example of video decoder 300 which may be video decoder 114 in the system 100 illustrated in FIG. 35.

The video decoder 300 may be configured to perform any or all of the techniques of this disclosure. In the example of FIG. 37, the video decoder 300 includes a plurality of functional components. The techniques described in this disclosure may be shared among the various components of the video decoder 300. In some examples, a processor may be configured to perform any or all of the techniques described in this disclosure.

In the example of FIG. 37, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 36).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

A first set of solutions is provided below. The following solutions show example embodiments of techniques discussed in the previous section (e.g., item 1).

Figure 34:
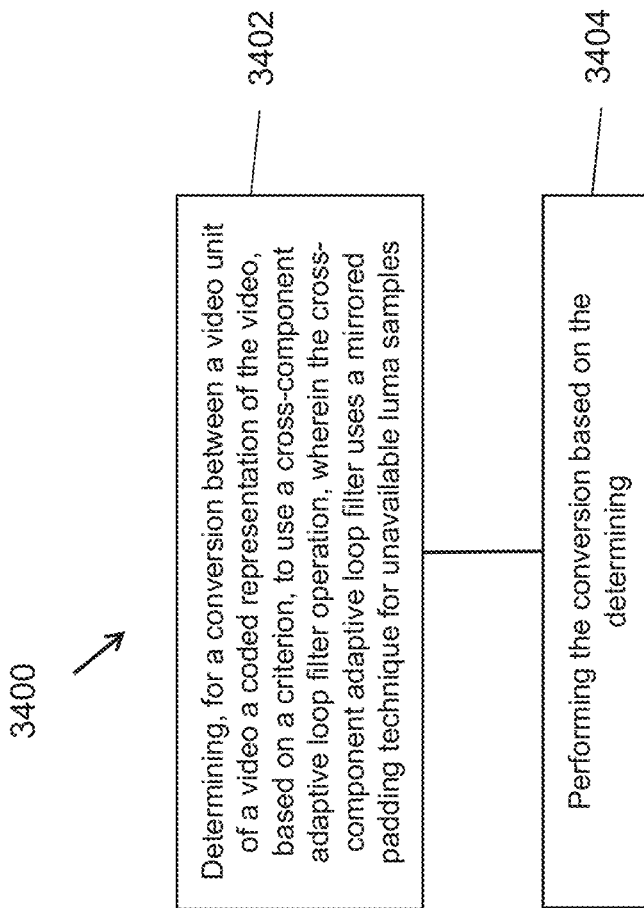
FIG. 34 is a flowchart for an example method of video processing based on some implementations of the disclosed technology.

1. A method of video processing (e.g., method 3400 of FIG. 34), comprising: determining (3402), for a conversion between a video unit of a video a coded representation of the video, based on a criterion, to use a cross-component adaptive loop filter operation, wherein the cross-component adaptive loop filter uses a mirrored padding technique for unavailable luma samples; and performing (3404) the conversion based on the determining. The present document discloses various embodiments of a cross-component adaptive loop filter and its operation and mirrored padding techniques, and also their relationship with a virtual buffer boundary.

2. The method of solution 1, wherein the mirrored padding technique is further used for deriving one or more corresponding luma samples of the unavailable luma sample.

3. The method of solution 2, wherein the one or more corresponding luma samples are determined based on a distance of the one or more corresponding luma samples from a representative luma sample or a distance of the unavailable sample from the representative luma sample.

4. The method of solution 3, wherein the representative luma sample corresponds to a position of a chroma sample for which the cross-component adaptive loop filtering technique is used.

5. The method of solution 3, wherein a position of the representative luma sample depends on a color format of the video.

6. The method of any of solutions 3-4, wherein the distance corresponds to a distance in a first direction between a pixel line along a second direction containing the one or more luma samples and a row containing the representative sample.

7. The method of solution 6, wherein C represents a center line along the second direction where the representative luma sample is located, M represents a line along the second direction where the unavailable sample is located and N represents a line along the second direction in which the one ore more luma samples are located, where C, M and N are positive integers and M is not equal to N, then the mirrored padding technique is applied based on a size and shape of the cross-component adaptive loop filter.

8. The method of solution 1, wherein the cross-component adaptive loop filter has a KxL filter shape, where K is an even number and L is positive integer, and wherein the mirrored padding technique comprises padding unavailable samples located at a line along a second direction M or N away from a virtual boundary of the cross-component adaptive loop filter are padded from the nearest sample line near the virtual boundary.

9. The method of solution 3, wherein, in case that a virtual boundary of the cross-component adaptive loop filter is below in the second direction the representative luma sample, then padding the unavailable samples using a nearest line in the second direction above the virtual boundary.

10. The method of solution 3, wherein, in case that an unavailable sample is located in row M, wherein M is an integer less than C, wherein C is an integer indicative of a center line along the second direction of the representative luma sample, then a sample located in line N in the second direction is determined to be the corresponding samples when $d(C, M)=d(N, C)$ −offset, wherein offset is an integer value, or $d(C, M)<d(N, C)$, where $d(\ )$ is a distance function.

The following solutions show example embodiments of techniques discussed in the previous section (e.g., item 2).

11. The method of any of solutions 1-10, wherein the first direction is a vertical direction and the second direction is a horizontal direction.

12. The method of any of solutions 1-10, wherein the first direction is a horizontal direction and the second direction is a vertical direction.

13. The method of any of solutions 11-12, wherein an orientation of the first direction and the second direction depends on an orientation of a boundary of the virtual buffer.

The following solutions show example embodiments of techniques discussed in the previous section (e.g., item 3).

14. The method of any of solutions 1-13, wherein the video unit comprises a video picture, a video subpicture, a video slice, a video tile or a 360-degree boundary of video.

15. The method of any of solutions 1-14, wherein the performing the conversion comprising encoding the video to generate the coded representation.

16. The method of any of solutions 1-14, wherein the performing the conversion comprises parsing and decoding the coded representation to generate the video.

In the above-disclosed solutions, the orientation may be horizontal or vertical and correspondingly the first direction and the second direction may be vertical or horizontal directions referred to by pixel columns and pixel rows.

17. A video decoding apparatus comprising a processor configured to implement a method recited in one or more of solutions 1 to 16.

18. A video encoding apparatus comprising a processor configured to implement a method recited in one or more of solutions 1 to 16.

19. A computer program product having computer code stored thereon, the code, when executed by a processor, causes the processor to implement a method recited in any of solutions 1 to 16.

20. A method, apparatus or system described in the present document.

A second set of solutions show example embodiments of techniques discussed in the previous section (e.g., item 4).

Figure 38:
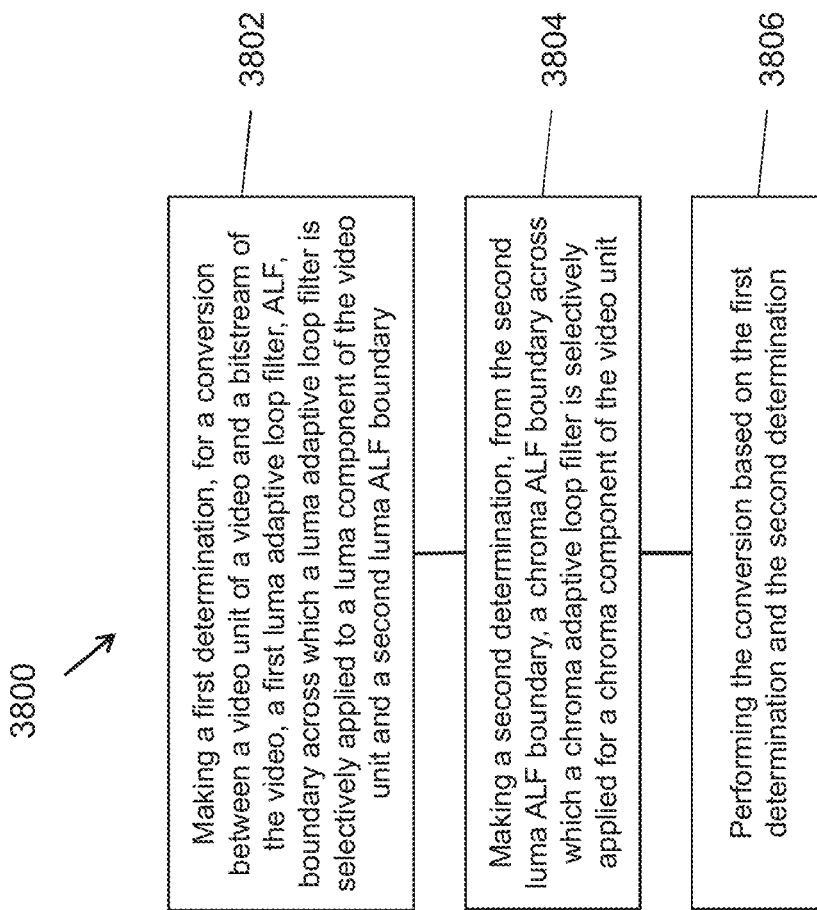
FIG. 38 shows a flowchart for an example method of video processing based on some implementations of the disclosed technology.

1. A method of video processing (e.g., method 3800 as shown in FIG. 38A), comprising: making 3802 a first determination, for a conversion between a video unit of a video and a bitstream of the video, a first luma adaptive loop filter, ALF, boundary across which a luma adaptive loop filter is selectively applied to a luma component of the video unit and a second luma ALF boundary; making 3804 a second determination, from the second luma ALF boundary, a chroma ALF boundary across which a chroma adaptive loop filter is selectively applied for a chroma component of the video unit; and performing 3806 the conversion based on the first determination and the second determination.

2. The method of solution 1, wherein the second luma ALF boundary is different from the first luma ALF boundary.

3. The method of solution 1, wherein the first luma ALF boundary is used for a cross-component ALF (CC-ALF) and/or a luma ALF.

4. The method of solution 3, wherein, during the making of the first determination, the CC-ALF is treated as the luma ALF.

5. The method of solution 1, wherein the second luma ALF boundary is used for a chroma ALF.

6. The method of solution 1, wherein the second luma ALF boundary is determined based on a color format and/or filtering methods.

7. The method of solution 1, wherein the second luma ALF boundary in a chroma ALF for 4:2:0 color format is determined to be same as the first luma ALF boundary.

8. The method of solution 1, wherein, during the making of the first determination, a chroma ALF for 4:2:0 color format is treated as a luma ALF or a cross-component ALF (CC-ALF).

9. The method of solution 1, wherein the second luma ALF boundary in a chroma ALF for 4:2:2 or 4:4:4 color format is determined differently from the first luma ALF boundary in a luma ALF or the CC-ALF.

10. The method of solution 1, wherein the first luma ALF boundary and/or the second luma ALF boundary refers to a top boundary position, a bottom boundary position, a left boundary position, or a right boundary position.

11. The method of solution 10, wherein the first luma ALF boundary and/or the second luma ALF boundary is based on i) a first variable, vbOffset, that specifies an offset for an ALF virtual boundary or a distance between the ALF virtual boundary and a bottom boundary of a current coding tree unit (CTU), or/and ii) a second variable, M, specifying an offset from a top boundary of the current CTU.

12. The method of solution 11, wherein (x, y) refers to a luma location of a current sample relative to a top-left sample of a current luma coding tree block (CTB), (xCtb, yCtb) refers to a luma location of a top-left sample of the current luma CTB relative to a top left sample of a current picture, and CtbSizeY refers to a size of the current luma CTB.

13. The method of solution 12, wherein, in a case that y−(CtbSizeY−vbOffset) is greater than or equal to 0, the top boundary position is set equal to yCtb+CtbSizeY−vbOffset.

14. The method of solution 12, wherein, in a case that i) a top boundary of the current luma CTB is a top boundary of a tile, a slice, or a subpicture, ii) the adaptive loop filtering across the tile, the slice, or the subpicture is disabled, and iii) y is less than the second variable, M, the top boundary position is set equal to yCtb.

15. The method of solution 12, wherein, in a case that CtbSizeY−vbOffset−y is greater than 0 and is less than a third variable, N, the bottom boundary position is set equal to yCtb+CtbSizeY−vbOffset.

16. The method of solution 15, wherein the third variable, N, is an integer.

17. The method of solution 15, wherein the third variable, N, is equal to 3 or 5.

18. The method of solution 12, wherein, in a case that i) a bottom boundary of the current luma CTB is a bottom boundary of a tile, a slice, or a subpicture and ii) the adaptive loop filtering across the tile, the slice, or the subpicture is disabled, and iiii) CtbSizeY−y is less than a fourth variable, L, the bottom boundary position is set equal to yCtb+CtbSizeY.

19. The method of solution 18, wherein the fourth variable, L, is an integer.

20. The method of solution 18, wherein the fourth variable, L, is equal to 3 or 5.

21. The method of any of solutions 11-20, wherein the first luma ALF boundary is determined same for a cross-component ALF (CC-ALF) or a luma ALF.

22. The method of solution 21, wherein the first variable, vbOffset, is same for the cross-component ALF (CC-ALF) and the luma ALF.

23. The method of solution 21, wherein the second variable, M, is same for the CC-ALF and the luma ALF.

24. The method of solution 21, wherein the third variable, N, is same for the CC-ALF and the luma ALF.

25. The method of solution 21, wherein the fourth variable, L, is same for the CC-ALF and the luma ALF.

26. The method of any of solutions 11-20, wherein the second luma ALF boundary used in a chroma ALF is determined based on a color format of the chroma ALF.

27. The method of solution 26, wherein, for the color format that is 4:2:0, the second luma ALF boundary is determined to be same as the first luma ALF boundary.

28. The method of solution 26 or 27, wherein, for the color format that is 4:2:0, the first variable, vbOffset, is same for a chroma ALF and a luma ALF.

29. The method of solution 28, wherein the first variable, vbOffset, is an integer.

30. The method of solution 28, wherein the first variable, vboffset, is 4.

31. The method of solution 26 or 27, wherein, for the color format that is 4:2:0, the second variable, M, is same for a chroma ALF and a luma ALF.

32. The method of solution 31, wherein the variable, M, is an integer.

33. The method of solution 31, wherein the variable, M, is 3.

34. The method of solution 26 or 27, wherein the third variable, N, is same for a chroma ALF and a luma ALF.

35. The method of solution 26 or 27, wherein the fourth variable, L, is same for a chroma ALF and a luma ALF.

36. The method of solution 26, wherein, for the color format that is 4:2:2 or 4:4:4, the second luma ALF boundary is determined to be different from the first luma ALF boundary.

37. The method of solution 36, wherein, for the color format that is 4:2:2 or 4:4:4, the first variable, vbOffset, has different values for a chroma ALF and a luma ALF.

38. The method of solution 37, wherein vbOffset1 is used for the chroma ALF and vbOffset2 is used for the luma ALF and vbOffset1 is not equal to vbOffset2.

39. The method of solution 38, wherein vbOffset1=2 and vbOffset2=4.

40. The method of solution 36, wherein, the first variable, vbOffset, has different values depending on whether the color format is same or different from 4:2:0.

41. The method of solution 36, wherein, for the color format that is 4:2:2 or 4:4:4, each of the second variable, M, the third variable, N, and the fourth variable, L, has different values for a chroma ALF and a luma ALF.

42. The method of solution 41, wherein M1 is used for the chroma ALF and M2 is used for the luma ALF and M1 is not equal to M2.

43. The method of solution 42, wherein M1=2 and M2=3.

44. The method of solution 41, wherein N1 is used for the chroma ALF and N2 is used for the luma ALF and N1 is not equal to N2.

45. The method of solution 44, wherein N1=3 and N2=5.

46. The method of solution 41, wherein L1 is used for the chroma ALF and L2 is used for the luma ALF and L1 is not equal to L2.

47. The method of solution 46, wherein L1=3 and L2=5.

48. The method of solution 36, wherein, each of the second variable, M, the third variable, N, and the fourth variable, L, has different values depending on whether the color format is same or different from 4:2:0.

49. The method of solution 26, wherein, for the color format that is 4:2:2 or 4:4:4, the second luma ALF boundary is determined to be different from the first ALF luma boundary used in a cross-component ALF (CC-ALF).

50. The method of solution 49, wherein, for the color format that is 4:2:2 or 4:4:4, the first variable, vbOffset, has different values for a chroma ALF and the CC-ALF.

51. The method of solution 50, wherein vbOffset1 is used for the chroma ALF and vbOffset2 is used for the CC-ALF and the vbOffset1 is not equal to the vbOffset2.

52. The method of solution 51, wherein vbOffset1=2 and vbOffset2=4.

53. The method of solution 49, wherein, for the color format that is 4:2:2 or 4:4:4, the second variable, M, the third variable, N, and the fourth variable, L, has different values for a chroma ALF and the CC-ALF.

54. The method of solution 53, wherein M1 is used for the chroma ALF with 4:2:2 or 4:4:4 color format and M2 is used for the CC-ALF and M2 is not equal to M1.

55. The method of solution 54, wherein M1=2 and M2=3.

56. The method of solution 53, wherein N1 is used for the chroma ALF with 4:2:2 or 4:4:4 color format and N2 is used for the CC-ALF and N1 is not equal to N2.

57. The method of solution 56, wherein N1=3 and N2=5.

58. The method of solution 53, wherein L1 is used for the chroma ALF with 4:2:2 or 4:4:4 color format and L2 is used for the CC-ALF and L1 is not equal to L2.

59. The method of solution 58, wherein L1=3 and L2=5.

60. The method of any of above solutions, wherein the method is applied to 360 degree virtual boundaries.

61. The method of any of solutions 1 to 60, wherein the conversion includes encoding the video into the bitstream.

62. The method of any of solutions 1 to 60, wherein the conversion includes decoding the video from the bitstream.

63. The method of any of solutions 1 to 60, wherein the conversion includes generating the bitstream from the video, and the method further comprises: storing the bitstream in a non-transitory computer-readable recording medium.

64. A video processing apparatus comprising a processor configured to implement a method recited in any one or more of solutions 1 to 63.

65. A method of storing a bitstream of a video, comprising, a method recited in any one of solutions 1 to 63, and further including storing the bitstream to a non-transitory computer-readable recording medium.

66. A computer readable medium storing program code that, when executed, causes a processor to implement a method recited in any one or more of solutions 1 to 63.

67. A computer readable medium that stores a bitstream generated according to any of the above described methods.

68. A video processing apparatus for storing a bitstream, wherein the video processing apparatus is configured to implement a method recited in any one or more of solutions 1 to 63.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
    making a first determination, for a conversion between a video unit of a video and a bitstream of the video, a position of a first luma adaptive loop filter (ALF) boundary which is used for a luma adaptive loop filter that is selectively applied to a luma component of the video unit and a position of a second luma ALF boundary;
    making a second determination, from the position of the second luma ALF boundary, a position of a chroma ALF boundary which is used for a chroma adaptive loop filter that is selectively applied for a chroma component of the video unit; and
    performing the conversion based on the first determination and the second determination,
    wherein the position of the first luma ALF boundary or the position of the second luma ALF boundary is based on a first variable vbOffset that specifies an offset for an ALF virtual boundary or a distance between the ALF virtual boundary and a bottom boundary of a current coding tree unit (CTU),
    wherein (x, y) refers to a luma location of a current sample relative to a top-left sample of a current luma coding tree block (CTB), (xCtb, yCtb) refers to a luma location of a top-left sample of a current luma CTB relative to a top left sample of a current picture, and CtbSizeY refers to a size of the current luma CTB, and
    wherein, in a case that y−(CtbSizeY−vbOffset) is greater than or equal to 0, the position of the first luma ALF boundary or the position of the second luma ALF boundary, which refers to a top boundary position, is set equal to yCtb+CtbSizeY−vbOffset, or
    wherein, in a case that i) a top boundary of a current luma CTB is a top boundary of a tile, a slice, or a subpicture, ii) a adaptive loop filtering across the tile, the slice, or the subpicture is disabled, and iii) y is less than a second variable, M, the top boundary position is set equal to yCtb, whereby the second variable M is an integer.

2. The method of claim 1, wherein the position of the first luma ALF boundary is also used for a cross-component ALF (CC-ALF).

3. The method of claim 1, wherein the position of the second luma ALF boundary is determined based on a color format.

4. The method of claim 1, wherein the position of the second luma ALF boundary for 4:2:0 color format is determined to be same as the position of the first luma ALF boundary, or
    wherein the position of the second luma ALF boundary for 4:2:2 or 4:4:4: color format is determined differently from the position of the first luma ALF boundary.

5. The method of claim 1, wherein the position of the first luma ALF boundary or the position of the second luma ALF boundary refers to the top boundary position, a bottom boundary position, a left boundary position, or a right boundary position.

6. The method of claim 1, wherein the second variable M is equal to 3.

7. The method of claim 5, wherein, in a case that CtbSizeY−vbOffset−y is greater than 0 and is less than a third variable, N, the bottom boundary position is set equal to yCtb+CtbSizeY−vbOffset, whereby the third variable N is an integer, or
    wherein, in a case that i) a bottom boundary of the current luma CTB is a bottom boundary of a tile, a slice, or a subpicture and ii) the adaptive loop filtering across the tile, the slice, or the subpicture is disabled, and iiii) CtbSizeY−y is less than a fourth variable, L, the bottom boundary position is set equal to yCtb+CtbSizeY, whereby the fourth variable L is an integer.

8. The method of claim 7, wherein the third variable N and the fourth variable L are equal to 5.

9. The method of claim 1, wherein the first variable vbOffset is same for the cross-component ALF (CC-ALF) and the luma ALF.

10. The method of claim 1, wherein, for the color format that is 4:2:0, the first variable vbOffset is same for the position of the first luma ALF boundary and the position of the second luma ALF boundary and the first variable vbOffset is 4, or wherein, for the color format that is 4:2:2 or 4:4:4, the first variable vbOffset for the position of the second luma ALF boundary is determined to be different from the first variable vbOffset for the position of the first luma ALF boundary, the first variable vbOffset for the position of the second luma ALF boundary is equal to 2, the first variable vbOffset for the position of the first luma ALF boundary is equal to 4.

11. The method of claim 1, wherein the conversion includes encoding the video into the bitstream.

12. The method of claim 1, wherein the conversion includes decoding the video from the bitstream.

13. An apparatus for processing video data comprising a processor and a non-transitory memory with instructions thereon, wherein the instructions upon execution by the processor, cause the processor to:

make a first determination, for a conversion between a video unit of a video and a bitstream of the video, a position of a first luma adaptive loop filter, ALF, boundary which is used for a luma adaptive loop filter that is selectively applied to a luma component of the video unit and a position of a second luma ALF boundary;

make a second determination, from the position of the second luma ALF boundary, a position of a chroma ALF boundary which is used for a chroma adaptive loop filter that is selectively applied for a chroma component of the video unit; and perform the conversion based on the first determination and the second determination, wherein the position of the first luma ALF boundary or the position of the second luma ALF boundary is based on a first variable vbOffset that specifies an offset for an ALF virtual boundary or a distance between the ALF virtual boundary and a bottom boundary of a current coding tree unit (CTU), wherein (x, y) refers to a luma location of a current sample relative to a top-left sample of a current luma coding tree block (CTB), (xCtb, yCtb) refers to a luma location of a top-left sample of a current luma CTB relative to a top left sample of a current picture, and CtbSizeY refers to a size of the current luma CTB, and wherein, in a case that y−(CtbSizeY−vbOffset) is greater than or equal to 0, the position of the first luma ALF boundary or the position of the second luma ALF boundary, which refers to a top boundary position, is set equal to yCtb+CtbSizeY−vbOffset, or wherein, in a case that i) a top boundary of a current luma CTB is a top boundary of a tile, a slice, or a subpicture, ii) a adaptive loop filtering across the tile, the slice, or the subpicture is disabled, and iii) y is less than a second variable, M, the top boundary position is set equal to yCtb, whereby the second variable M is an integer.

14. The apparatus of claim 13, wherein the position of the first luma ALF boundary is also used for a cross-component ALF (CC-ALF), wherein the position of the second luma ALF boundary is determined based on a color format, wherein the position of the second luma ALF boundary for 4:2:0 color format is determined to be same as the position of the first luma ALF boundary, or wherein the position of the second luma ALF boundary for 4:2:2 or 4:4:4: color format is determined differently from the position of the first luma ALF boundary, wherein the position of the first luma ALF boundary or the position of the second luma ALF boundary refers to a top boundary position, a bottom boundary position, a left boundary position, or a right boundary position, wherein, in a case that CtbSizeY−vbOffset−y is greater than 0 and is less than a third variable, N, the bottom boundary position is set equal to yCtb+CtbSizeY−vbOffset, whereby the third variable N is an integer, or wherein, in a case that i) a bottom boundary of the current luma CTB is a bottom boundary of a tile, a slice, or a subpicture and ii) the adaptive loop filtering across the tile, the slice, or the subpicture is disabled, and iii) CtbSizeY−y is less than a fourth variable, L, the bottom boundary position is set equal to yCtb+CtbSizeY, whereby the fourth variable L is an integer, wherein the third variable N and the fourth variable L are equal to 5, and wherein the first variable vbOffset is same for the cross-component ALF (CC-ALF) and the luma ALF, or wherein, for the color format that is 4:2:0, the first variable vbOffset is same for the position of the first luma ALF boundary and the position of the second luma ALF boundary and the first variable vbOffset is 4, or wherein, for the color format that is 4:2:2 or 4:4:4, the first variable vbOffset for the position of the second luma ALF boundary is determined to be different from the first variable vbOffset for the position of the first luma ALF boundary, the first variable vbOffset for the position of the second luma ALF boundary is equal to 2, the first variable vbOffset for the position of the first luma ALF boundary is equal to 4.

15. A non-transitory computer-readable storage medium storing instructions that cause a processor to:

make a first determination, for a conversion between a video unit of a video and a bitstream of the video, a position of a first luma adaptive loop filter, ALF, boundary which is used for a luma adaptive loop filter that is selectively applied to a luma component of the video unit and a position of a second luma ALF boundary;

make a second determination, from the position of the second luma ALF boundary, a position of a chroma ALF boundary which is used for a chroma adaptive loop filter that is selectively applied for a chroma component of the video unit; and perform the conversion based on the first determination and the second determination, wherein the position of the first luma ALF boundary or the position of the second luma ALF boundary is based on a first variable vbOffset that specifies an offset for an ALF virtual boundary or a distance between the ALF virtual boundary and a bottom boundary of a current coding tree unit (CTU), wherein (x, y) refers to a luma location of a current sample relative to a top-left sample of a current luma coding tree block (CTB), (xCtb, yCtb) refers to a luma location of a top-left sample of a current luma CTB relative to a top left sample of a current picture, and CtbSizeY refers to a size of the current luma CTB, and wherein, in a case that y−(CtbSizeY−vbOffset) is greater than or equal to 0, the position of the first luma ALF boundary or the position of the second luma ALF boundary, which refers to a top boundary position, is set equal to yCtb+CtbSizeY−vbOffset, or wherein, in a case that i) a top boundary of a current luma CTB is a top boundary of a tile, a slice, or a subpicture, ii) a adaptive loop filtering across the tile, the slice, or the subpicture is disabled, and iii) y is less than a second variable, M, the top boundary position is set equal to yCtb, whereby the second variable M is an integer.

16. The non-transitory computer-readable storage medium of claim 15, wherein the position of the first luma ALF boundary is also used for a cross-component ALF (CC-ALF), wherein the position of the second luma ALF boundary is determined based on a color format, wherein the position of the second luma ALF boundary for 4:2:0 color format is determined to be same as the position of the first luma ALF boundary, or wherein the position of the second luma ALF boundary for 4:2:2 or 4:4:4: color format is determined differently from the position of the first luma ALF boundary, wherein the position of the first luma ALF boundary or the position of the second luma ALF boundary refers to a top boundary position, a bottom boundary position, a left boundary position, or a right boundary position, wherein, in a case that CtbSizeY−vbOffset−y is greater than 0 and is less than a third variable, N, the bottom boundary position is set equal to yCtb+CtbSizeY−vbOffset, whereby the third variable N is an integer, or wherein, in a case that i) a bottom boundary of the current luma CTB is a bottom boundary of a tile, a slice, or a subpicture and ii) the adaptive loop filtering across the tile, the slice, or the subpicture is disabled, and iiii) CtbSizeY−y is less than a fourth variable, L, the bottom boundary position is set equal to yCtb+CtbSizeY, whereby the fourth variable L is an integer, wherein the third variable N and the fourth variable L are equal to 5, and wherein the first variable vbOffset is same for the cross-component ALF (CC-ALF) and the luma ALF, or wherein, for the color format that is 4:2:0, the first variable vbOffset is same for the position of the first luma ALF boundary and the position of the second luma ALF boundary and the first variable vbOffset is 4, or wherein, for the color format that is 4:2:2 or 4:4:4, the first variable vbOffset for the position of the second luma ALF boundary is determined to be different from the first variable vbOffset for the position of the first luma ALF boundary, the first variable vbOffset for the position of the second luma ALF boundary is equal to 2, the first variable vbOffset for the position of the first luma ALF boundary is equal to 4.

17. A non-transitory computer-readable recording medium storing a bitstream of a video which is generated by a method performed by a video processing apparatus, wherein the method comprises:

making a first determination, for a video unit of the video and the bitstream of the video, a position of a first luma adaptive loop filter, ALF, boundary which is used for a luma adaptive loop filter that is selectively applied to a luma component of the video unit and a position of a second luma ALF boundary;

making a second determination, from the position of the second luma ALF boundary, a position of a chroma ALF boundary which is used for a chroma adaptive loop filter that is selectively applied for a chroma component of the video unit; and generating the bitstream based on the first determination and the second determination, wherein the position of the first luma ALF boundary or the position of the second luma ALF boundary is based on a first variable vbOffset that specifies an offset for an ALF virtual boundary or a distance between the ALF virtual boundary and a bottom boundary of a current coding tree unit (CTU), wherein (x, y) refers to a luma location of a current sample relative to a top-left sample of a current luma coding tree block (CTB), (xCtb, yCtb) refers to a luma location of a top-left sample of a current luma CTB relative to a top left sample of a current picture, and CtbSizeY refers to a size of the current luma CTB, and wherein, in a case that y−(CtbSizeY−vbOffset) is greater than or equal to 0, the position of the first luma ALF boundary or the position of the second luma ALF boundary, which refers to a top boundary position, is set equal to yCtb+CtbSizeY−vbOffset, or wherein, in a case that i) a top boundary of a current luma CTB is a top boundary of a tile, a slice, or a subpicture, ii) a adaptive loop filtering across the tile, the slice, or the subpicture is disabled, and iii) y is less than a second variable, M, the top boundary position is set equal to yCtb, whereby the second variable M is an integer.

18. The non-transitory computer-readable recording medium of claim 17, wherein the position of the first luma ALF boundary is also used for a cross-component ALF (CC-ALF), wherein the position of the second luma ALF boundary is determined based on a color format, wherein the position of the second luma ALF boundary for 4:2:0 color format is determined to be same as the position of the first luma ALF boundary, or wherein the position of the second luma ALF boundary for 4:2:2 or 4:4:4: color format is determined differently from the position of the first luma ALF boundary, wherein the position of the first luma ALF boundary or the position of the second luma ALF boundary refers to the top boundary position, a bottom boundary position, a left boundary position, or a right boundary position, wherein, in a case that CtbSizeY−vbOffset−y is greater than 0 and is less than a third variable, N, the bottom boundary position is set equal to yCtb+CtbSizeY−vbOffset, whereby the third variable N is an integer, or wherein, in a case that i) a bottom boundary of the current luma CTB is a bottom boundary of a tile, a slice, or a subpicture and ii) the adaptive loop filtering across the tile, the slice, or the subpicture is disabled, and iiii) CtbSizeY−y is less than a fourth variable, L, the bottom boundary position is set equal to yCtb+CtbSizeY, whereby the fourth variable L is an integer, wherein the third variable N and the fourth variable L are equal to 5, and wherein the first variable vbOffset is same for the cross-component ALF (CC-ALF) and the luma ALF, or wherein, for the color format that is 4:2:0, the first variable vbOffset is same for the position of the first luma ALF boundary and the position of the second luma ALF boundary and the first variable vbOffset is 4, or wherein, for the color format that is 4:2:2 or 4:4:4, the first variable vbOffset for the position of the second luma ALF boundary is determined to be different from the first variable vbOffset for the position of the first luma ALF boundary, the first variable vbOffset for the position of the second luma ALF boundary is equal to 2, the first variable vbOffset for the position of the first luma ALF boundary is equal to 4.

* * * * *